(12) United States Patent
Bullock et al.

(10) Patent No.: US 11,814,235 B2
(45) Date of Patent: Nov. 14, 2023

(54) CONTAINER AND METHOD OF FORMING A CONTAINER

(71) Applicant: YETI Coolers, LLC, Austin, TX (US)

(72) Inventors: Dustin Bullock, Austin, TX (US); Steve Charles Nichols, Austin, TX (US); Edward Abante, Austin, TX (US); Evan Goldberg, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 0 days.

(21) Appl. No.: 17/307,440

(22) Filed: May 4, 2021

(65) Prior Publication Data

US 2021/0253331 A1 Aug. 19, 2021

Related U.S. Application Data

(60) Division of application No. 16/163,153, filed on Oct. 17, 2018, now Pat. No. 11,034,505, which is a
(Continued)

(51) Int. Cl.
*B65D 81/38* (2006.01)
*A47J 41/00* (2006.01)
(Continued)

(52) U.S. Cl.
CPC ..... *B65D 81/3869* (2013.01); *A47G 19/2288* (2013.01); *A47J 41/0027* (2013.01);
(Continued)

(58) Field of Classification Search
CPC .......... B65D 41/0414; B65D 47/121; B65D 47/142; B65D 41/0421; B65D 41/28;
(Continued)

(56) References Cited

U.S. PATENT DOCUMENTS 459,253 A 9/1891 Metz
1,477,936 A 12/1923 Bott
(Continued)

FOREIGN PATENT DOCUMENTS

AU 2017280047 A1 1/2019
AU 2016368382 B2 2/2019
(Continued)

OTHER PUBLICATIONS

May 6, 2022—(CN) Second Office Action—App. No. 201780064159. 1.
(Continued)

*Primary Examiner* — Robert Poon
(74) *Attorney, Agent, or Firm* — Banner & Witcoff, Ltd.

(57) ABSTRACT

An insulating container can be configured to retain a volume of liquid, and include a canister having a first inner wall having a first end having an opening extending into an internal reservoir, and a second outer wall forming an outer shell. The opening can be sealed by a spout adapter, the spout adapter having a spout channel extending between the internal reservoir and a spout opening, smaller than the opening of the canister. The spout opening may be sealed with a cap having a magnetic top surface, and the spout adapter may be further removably coupled to a lid that may be used as a cup into which a volume of the liquid can be poured. In addition, spout adapter assembly with an adapter that releasably attaches to the canister and a plug that is received within the adapter that moves to place the spout adapter assembly into an open and a closed orientation. The plug may have a means to provide tactile feedback to a user that the spout adapter assembly is in an optimal pouring condition.

19 Claims, 39 Drawing Sheets

Related U.S. Application Data continuation-in-part of application No. 15/786,163, filed on Oct. 17, 2017, now Pat. No. 11,021,314.

(60) Provisional application No. 62/508,793, filed on May 19, 2017, provisional application No. 62/409,242, filed on Oct. 17, 2016.

(51) Int. Cl.
*B65D 47/14* (2006.01)
*A47G 19/22* (2006.01)
*B65D 41/04* (2006.01)
*A47J 41/02* (2006.01)

(52) U.S. Cl.
CPC ......... *A47J 41/0072* (2013.01); *A47J 41/022* (2013.01); *B65D 41/0414* (2013.01); *B65D 47/142* (2013.01)

(58) Field of Classification Search
CPC .............. B65D 81/3869; A47J 41/0005; A47J 41/0027; A47J 41/02; A47G 19/2288
USPC ........ 220/203.05, 203.06, 254.8, 288, 259.3, 220/259.4
See application file for complete search history.

(56) References Cited

U.S. PATENT DOCUMENTS

| | | |
|---|---|---|
| D101,575 S | 10/1936 | Windbiel |
| D105,256 S | 7/1937 | Amrine |
| D109,331 S | 4/1938 | McManus et al. |
| D154,378 S | 7/1949 | Fuller |
| 2,735,566 A | 2/1956 | Bramming |
| D177,761 S | 5/1956 | Reinhardt |
| 2,804,103 A | 8/1957 | Wall |
| 2,881,776 A | 4/1959 | Wrage |
| 2,957,596 A | 10/1960 | Rehborg |
| 2,963,187 A | 12/1960 | Bramming |
| 3,089,603 A | 5/1963 | Eslie-Smith |
| 3,140,799 A | 7/1964 | Mehr |
| 3,141,586 A | 7/1964 | Wetterek |
| 3,220,695 A | 11/1965 | Downey et al. |
| 3,239,090 A | 3/1966 | Bramming |
| 3,249,268 A | 5/1966 | Neuner |
| 3,285,453 A | 11/1966 | Wagner |
| 3,307,752 A | 3/1967 | Anderson |
| 3,439,843 A | 4/1969 | Corsette |
| 3,456,840 A | 7/1969 | McAlaster |
| 3,470,929 A | 10/1969 | Thornton |
| 3,592,349 A | 7/1971 | Baugh |
| 3,638,821 A | 2/1972 | Guala |
| D224,646 S | 8/1972 | Vollquartz |
| 3,752,347 A | 8/1973 | Bell |
| 3,776,433 A | 12/1973 | De Treitas |
| 3,785,539 A | 1/1974 | Wetterek |
| 3,842,790 A | 10/1974 | Clark |
| 3,863,798 A | 2/1975 | Kurihara et al. |
| 3,874,541 A | 4/1975 | Lagneaux et al. |
| D235,303 S | 6/1975 | Boucher |
| D248,373 S | 7/1978 | Allen |
| 4,190,173 A | 2/1980 | Mason et al. |
| D256,651 S | 9/1980 | Eung et al. |
| 4,358,024 A | 11/1982 | Underwood |
| 4,497,422 A | 2/1985 | Klees |
| D279,346 S | 6/1985 | Ruxton |
| D281,567 S | 12/1985 | Zimmermann |
| D286,604 S | 11/1986 | Bierlein et al. |
| D286,847 S | 11/1986 | Zimmermann |
| D287,211 S | 12/1986 | Weiss |
| D289,614 S | 5/1987 | Sanchez et al. |
| D292,492 S | 10/1987 | Ross et al. |
| 4,723,677 A | 2/1988 | Nagel, Jr. |
| 4,981,233 A | 1/1991 | Scheurer |
| D321,628 S | 11/1991 | Kobayashi et al. |
| D325,167 S | 4/1992 | Humfress |
| 5,105,975 A | 4/1992 | Patterson |
| D329,809 S | 9/1992 | Bloomfield |
| D332,379 S | 1/1993 | Murphy |
| 5,190,178 A | 3/1993 | Luch |
| 5,211,299 A | 5/1993 | Manfredonia |
| 5,232,112 A | 8/1993 | Howard |
| 5,249,703 A | 10/1993 | Karp |
| 5,251,788 A | 10/1993 | Moore |
| D341,319 S | 11/1993 | Morin |
| D354,915 S | 1/1995 | Schneider et al. |
| 5,392,967 A | 2/1995 | Satomi et al. |
| D361,265 S | 8/1995 | Doxey |
| 5,490,622 A | 2/1996 | Tardif |
| D368,224 S | 3/1996 | Arndt |
| 5,498,333 A | 3/1996 | Canther |
| D370,629 S | 6/1996 | Lynch |
| 5,605,241 A | 2/1997 | Imperioli |
| D384,280 S | 9/1997 | Kuczer |
| D394,184 S | 5/1998 | Demore |
| D398,193 S | 9/1998 | Sanchez |
| 5,813,557 A | 9/1998 | Oratz |
| 5,839,611 A | 11/1998 | Obadia et al. |
| D402,510 S | 12/1998 | Miller |
| D405,642 S | 2/1999 | Toriba |
| D405,650 S | 2/1999 | Meier |
| D407,211 S | 3/1999 | Diviak, Sr. |
| D407,273 S | 3/1999 | Moran |
| D410,175 S | 5/1999 | Moran |
| 5,909,820 A | 6/1999 | Yeh |
| D415,395 S | 10/1999 | Hunt et al. |
| D415,936 S | 11/1999 | Moran |
| D422,916 S | 4/2000 | Herrmann |
| 6,079,589 A | 6/2000 | Matsuyama et al. |
| 6,102,227 A | 8/2000 | Cochrane |
| 6,102,244 A | 8/2000 | Kuwano et al. |
| D437,528 S | 2/2001 | Kitamura et al. |
| 6,264,072 B1 | 7/2001 | Johannes |
| D447,410 S | 9/2001 | Malmborg |
| 6,321,924 B1 | 11/2001 | Yurkewicz et al. |
| 6,332,557 B1 | 12/2001 | Moran |
| 6,357,628 B1 | 3/2002 | Long, Jr. |
| D456,669 S | 5/2002 | Munari |
| D458,133 S | 6/2002 | Berish et al. |
| D458,134 S | 6/2002 | Berish et al. |
| D466,814 S | 12/2002 | Hurlburt |
| 6,530,496 B2 | 3/2003 | Moran |
| 6,536,618 B1 | 3/2003 | Hwang et al. |
| D475,924 S | 6/2003 | Haffner |
| D476,890 S | 7/2003 | Hirose |
| 6,601,740 B1 | 8/2003 | Clive |
| D479,800 S | 9/2003 | McRae |
| D479,995 S | 9/2003 | Duceppe |
| D482,607 S | 11/2003 | McRae |
| 6,648,158 B1 | 11/2003 | Lawrence |
| 6,651,838 B2 | 11/2003 | Bissell |
| 6,662,978 B2 | 12/2003 | Lin et al. |
| 6,675,998 B2 | 1/2004 | Forsman et al. |
| 6,702,138 B1 | 3/2004 | Bielecki et al. |
| D490,275 S | 5/2004 | Moran |
| D494,064 S | 8/2004 | Hook |
| D494,425 S | 8/2004 | Segura |
| 6,783,020 B2 | 8/2004 | Featherston et al. |
| 6,908,015 B2 | 6/2005 | Choi et al. |
| D507,495 S | 7/2005 | Williams et al. |
| D511,457 S | 11/2005 | Biesecker et al. |
| D521,314 S | 5/2006 | Ball |
| D524,909 S | 7/2006 | Bakke et al. |
| D525,518 S | 7/2006 | Baldwin |
| D530,141 S | 10/2006 | Wilgus et al. |
| D533,032 S | 12/2006 | Liu et al. |
| D533,396 S | 12/2006 | Lipson |
| D536,929 S | 2/2007 | Kingsley |
| D536,974 S | 2/2007 | Smith et al. |
| 7,172,101 B2 | 2/2007 | Find |
| D537,714 S | 3/2007 | Yerby et al. |
| D540,625 S | 4/2007 | Sandberg |
| D548,006 S | 8/2007 | Lapsker |
| D548,082 S | 8/2007 | Kingsley |

(56) References Cited

U.S. PATENT DOCUMENTS

| | | |
|---|---|---|
| D549,444 S | 8/2007 | Schnackenberg |
| 7,270,244 B1 | 9/2007 | Liu |
| D553,914 S | 10/2007 | Wahl |
| D554,000 S | 10/2007 | Walsh |
| 7,300,580 B2 | 11/2007 | Lindsey et al. |
| D557,994 S | 12/2007 | Wahl |
| D562,132 S | 2/2008 | LaMasney |
| D564,363 S | 3/2008 | Rhea |
| D567,007 S | 4/2008 | Bodum |
| D567,021 S | 4/2008 | Bach et al. |
| D569,195 S | 5/2008 | Kim |
| D572,585 S | 7/2008 | Perrin et al. |
| D574,237 S | 8/2008 | Yates, III |
| D581,211 S | 11/2008 | Lapsker |
| D582,206 S | 12/2008 | Fuller |
| D583,200 S | 12/2008 | Moran |
| 7,458,486 B2 | 12/2008 | Weist et al. |
| D584,623 S | 1/2009 | Chupak |
| D586,183 S | 2/2009 | Junkel |
| D587,533 S | 3/2009 | Carreno |
| D589,348 S | 3/2009 | Miller et al. |
| D594,346 S | 6/2009 | Mouquet |
| D599,616 S | 9/2009 | Cresswell et al. |
| D601,436 S | 10/2009 | Stephens et al. |
| D603,331 S | 11/2009 | Schupp |
| D603,722 S | 11/2009 | Reimer |
| D604,181 S | 11/2009 | Reimer |
| D604,561 S | 11/2009 | Chisholm |
| D605,040 S | 12/2009 | Fry et al. |
| D605,060 S | 12/2009 | Reimer |
| D605,942 S | 12/2009 | Miksovsky |
| D610,871 S | 3/2010 | Alviar et al. |
| D611,346 S | 3/2010 | Camomile |
| D612,197 S | 3/2010 | Chan |
| D612,235 S | 3/2010 | Cresswell et al. |
| D612,660 S | 3/2010 | Bodum |
| D614,918 S | 5/2010 | Chisholm |
| D614,955 S | 5/2010 | Cresswell et al. |
| D615,360 S | 5/2010 | Joy et al. |
| D615,361 S | 5/2010 | Goble |
| D615,816 S | 5/2010 | Joy et al. |
| D615,860 S | 5/2010 | Cero, Jr. |
| D616,703 S | 6/2010 | Joy et al. |
| D616,743 S | 6/2010 | Cresswell et al. |
| D616,744 S | 6/2010 | Cresswell et al. |
| D619,457 S | 7/2010 | Walsh |
| D619,458 S | 7/2010 | Walsh |
| D619,459 S | 7/2010 | Walsh |
| D620,798 S | 8/2010 | Cresswell et al. |
| D621,207 S | 8/2010 | Bodum |
| D621,257 S | 8/2010 | Gullickson et al. |
| D621,258 S | 8/2010 | Gullickson et al. |
| D621,648 S | 8/2010 | Lown et al. |
| D622,089 S | 8/2010 | Daniel et al. |
| D622,145 S | 8/2010 | Walsh |
| D623,475 S | 9/2010 | Aarnoudse et al. |
| D623,480 S | 9/2010 | Moran |
| D623,481 S | 9/2010 | Moran |
| D625,560 S | 10/2010 | Olson et al. |
| D626,414 S | 11/2010 | Cresswell et al. |
| D626,416 S | 11/2010 | Cresswell et al. |
| D627,601 S | 11/2010 | Eyal |
| D627,602 S | 11/2010 | Eyal |
| D627,604 S | 11/2010 | Eyal |
| D628,018 S | 11/2010 | Gilbert |
| D628,486 S | 12/2010 | Lane |
| D628,898 S | 12/2010 | Barnett et al. |
| D628,900 S | 12/2010 | Barnett et al. |
| D628,901 S | 12/2010 | Barnett et al. |
| D629,689 S | 12/2010 | Cresswell et al. |
| D629,690 S | 12/2010 | Cresswell et al. |
| D629,691 S | 12/2010 | Cresswell et al. |
| D630,474 S | 1/2011 | Gilbert |
| D630,475 S | 1/2011 | Lu |
| D631,349 S | 1/2011 | Arnell et al. |
| 7,870,968 B2 | 1/2011 | Hanson |
| D631,666 S | 2/2011 | Lim et al. |
| D633,338 S | 3/2011 | Rosbach et al. |
| D633,794 S | 3/2011 | Cresswell et al. |
| D633,795 S | 3/2011 | Cresswell et al. |
| D633,796 S | 3/2011 | Cresswell et al. |
| D633,797 S | 3/2011 | Cresswell et al. |
| D634,156 S | 3/2011 | Fuller et al. |
| D634,160 S | 3/2011 | Cetera |
| D634,192 S | 3/2011 | Mueller |
| D635,457 S | 4/2011 | Lane |
| D635,856 S | 4/2011 | Lauret |
| D638,695 S | 5/2011 | Woodrow et al. |
| D638,708 S | 5/2011 | Walsh |
| D639,164 S | 6/2011 | Walsh |
| D639,177 S | 6/2011 | Pape |
| D639,661 S | 6/2011 | Llerena |
| D639,663 S | 6/2011 | Llerena |
| D640,466 S | 6/2011 | Staton |
| D641,257 S | 7/2011 | Thiebaut et al. |
| D641,591 S | 7/2011 | Tsukida |
| D643,691 S | 8/2011 | Selina et al. |
| D643,693 S | 8/2011 | Jama |
| D645,709 S | 9/2011 | Endo |
| 8,011,535 B2 | 9/2011 | Tauber et al. |
| D648,984 S | 11/2011 | Gullickson et al. |
| D651,050 S | 12/2011 | Goshi |
| D651,847 S | 1/2012 | Gilbert |
| D652,255 S | 1/2012 | Carland |
| D652,682 S | 1/2012 | Eyal |
| D653,499 S | 2/2012 | Dietterle et al. |
| D654,762 S | 2/2012 | Gilbert |
| D655,134 S | 3/2012 | Gilbert |
| D655,581 S | 3/2012 | Kotani |
| D657,196 S | 4/2012 | Beyers, III |
| D658,064 S | 4/2012 | Barnes et al. |
| D658,431 S | 5/2012 | Gilbert |
| D658,445 S | 5/2012 | Carreno |
| D659,007 S | 5/2012 | Pape |
| D660,084 S | 5/2012 | Gilbert |
| 8,177,097 B2 | 5/2012 | Duran |
| D662,360 S | 6/2012 | George |
| 8,210,572 B2 | 7/2012 | Davis |
| 8,215,511 B1 | 7/2012 | Lin |
| D664,809 S | 8/2012 | Eyal |
| D665,621 S | 8/2012 | Eyal |
| 8,245,600 B2 | 8/2012 | Beard |
| 8,245,870 B2 | 8/2012 | McKinney et al. |
| 8,251,247 B1 | 8/2012 | Breckner |
| D666,908 S | 9/2012 | Dabah et al. |
| 8,256,631 B2 | 9/2012 | Hoffmann et al. |
| 8,272,532 B2 | 9/2012 | Michaelian et al. |
| D668,913 S | 10/2012 | Mayer |
| 8,292,133 B2 | 10/2012 | Baughman et al. |
| D670,137 S | 11/2012 | Gilbert |
| D671,372 S | 11/2012 | Zou |
| D672,238 S | 12/2012 | Aziz et al. |
| D672,609 S | 12/2012 | Aziz et al. |
| D673,459 S | 1/2013 | Moran, Sr. |
| D675,100 S | 1/2013 | Herbst |
| D675,865 S | 2/2013 | Wahl |
| D676,706 S | 2/2013 | Kern et al. |
| D676,764 S | 2/2013 | Moore et al. |
| D677,103 S | 3/2013 | Melzer |
| D677,119 S | 3/2013 | Ying |
| D678,729 S | 3/2013 | Peeters et al. |
| D678,772 S | 3/2013 | Johnson et al. |
| D679,185 S | 4/2013 | Brown et al. |
| D680,389 S | 4/2013 | Zemel et al. |
| D682,016 S | 5/2013 | Knight |
| D682,617 S | 5/2013 | Miksovsky et al. |
| 8,443,993 B1 | 5/2013 | Desselle |
| 8,443,994 B1 | 5/2013 | Desselle |
| D684,059 S | 6/2013 | Johnson et al. |
| 8,459,468 B2 | 6/2013 | Lin |
| D686,074 S | 7/2013 | Brinckerhoff et al. |
| D686,078 S | 7/2013 | Johnson et al. |
| D688,093 S | 8/2013 | Roth et al. |
| 8,505,760 B2 | 8/2013 | Ott |

(56) References Cited

U.S. PATENT DOCUMENTS

| | | |
|---|---|---|
| 8,505,787 B2 | 8/2013 | Fox et al. |
| D690,987 S | 10/2013 | Gallen |
| D690,988 S | 10/2013 | Audette |
| D691,848 S | 10/2013 | Trudeau et al. |
| 8,550,269 B2 | 10/2013 | Lane |
| D693,628 S | 11/2013 | Tavenner et al. |
| D693,698 S | 11/2013 | Miller, Jr. |
| 8,584,902 B2 | 11/2013 | Dejonge |
| D695,138 S | 12/2013 | Ball |
| 8,613,369 B2 | 12/2013 | Kitto |
| D696,945 S | 1/2014 | Newman |
| D697,404 S | 1/2014 | Johnson et al. |
| D697,802 S | 1/2014 | Lane |
| 8,622,229 B2 | 1/2014 | Lane |
| D698,668 S | 2/2014 | Vaughn |
| D701,464 S | 3/2014 | Ogata et al. |
| D702,092 S | 4/2014 | Mettler et al. |
| D702,506 S | 4/2014 | Mettler et al. |
| 8,695,822 B2 | 4/2014 | Kwon |
| 8,701,881 B2 | 4/2014 | Gibson et al. |
| 8,701,924 B2 | 4/2014 | Dalbec |
| 8,708,176 B2 | 4/2014 | Andis |
| D703,998 S | 5/2014 | Funnell et al. |
| 8,720,730 B2 | 5/2014 | Bodden, Jr. |
| 8,752,720 B1 | 6/2014 | Habig et al. |
| D708,484 S | 7/2014 | Bishop |
| D708,914 S | 7/2014 | Moran, Sr. |
| D708,954 S | 7/2014 | Barnes et al. |
| D709,734 S | 7/2014 | Kotani |
| 8,777,031 B2 | 7/2014 | Aneas |
| D712,254 S | 9/2014 | Geis et al. |
| D712,255 S | 9/2014 | Geis et al. |
| D713,268 S | 9/2014 | Jones et al. |
| D713,365 S | 9/2014 | Green |
| 8,833,586 B2 | 9/2014 | Meyers et al. |
| D714,584 S | 10/2014 | Boroski |
| D717,102 S | 11/2014 | Taketani et al. |
| D717,601 S | 11/2014 | Dixon |
| D719,780 S | 12/2014 | Sullivan |
| 8,905,252 B2 | 12/2014 | Latham et al. |
| D724,385 S | 3/2015 | Hurley et al. |
| D724,435 S | 3/2015 | Kaufman et al. |
| 8,967,414 B2 | 3/2015 | Lane |
| 8,985,406 B2 | 3/2015 | Tachi |
| D728,315 S | 5/2015 | Bo |
| D728,995 S | 5/2015 | Barberi |
| D729,579 S | 5/2015 | Molayem |
| D729,584 S | 5/2015 | Weston et al. |
| D732,402 S | 6/2015 | Jones et al. |
| D734,154 S | 7/2015 | Johnson et al. |
| D734,638 S | 7/2015 | Wahl |
| D735,033 S | 7/2015 | Lynd et al. |
| D735,038 S | 7/2015 | Tamarindo |
| D735,578 S | 8/2015 | Mazurkiewicz et al. |
| 9,113,698 B2 | 8/2015 | Blain et al. |
| D738,670 S | 9/2015 | Sands |
| 9,126,731 B2 | 9/2015 | Chen |
| D741,655 S | 10/2015 | Whelan et al. |
| D743,255 S | 11/2015 | Niggemyer |
| D743,742 S | 11/2015 | Rummel et al. |
| D744,781 S | 12/2015 | Rummel et al. |
| 9,205,445 B2 | 12/2015 | Fang et al. |
| 9,215,942 B2 * | 12/2015 | Bodum .............. A47G 19/2272 |
| D748,472 S | 2/2016 | Seybel et al. |
| D748,955 S | 2/2016 | Oliver |
| D751,345 S | 3/2016 | Lane et al. |
| D751,399 S | 3/2016 | Lynd et al. |
| D751,898 S | 3/2016 | D'Anglade |
| 9,272,822 B2 | 3/2016 | Samartgis |
| D754,472 S | 4/2016 | Munari |
| D755,561 S | 5/2016 | Eyal |
| D755,562 S | 5/2016 | Tindsay |
| D757,543 S | 5/2016 | Sorensen et al. |
| 9,346,591 B2 | 5/2016 | Martinengo |
| D758,136 S | 6/2016 | Liotta et al. |
| D758,790 S | 6/2016 | Boroski |
| D758,791 S | 6/2016 | Hanna et al. |
| D758,804 S | 6/2016 | Liotta et al. |
| D758,859 S | 6/2016 | Sorensen et al. |
| D759,487 S | 6/2016 | Jayakaran |
| 9,376,243 B2 | 6/2016 | Cerveny |
| D760,586 S | 7/2016 | Seiders et al. |
| D761,624 S | 7/2016 | McLean et al. |
| D762,418 S | 8/2016 | Sorensen et al. |
| D763,076 S | 8/2016 | Lane et al. |
| D764,916 S | 8/2016 | Mount, III et al. |
| D767,390 S | 9/2016 | Miksovsky et al. |
| D772,021 S | 11/2016 | Joy |
| D772,652 S | 11/2016 | Yao |
| D772,718 S | 11/2016 | Lee |
| 9,493,274 B2 | 11/2016 | Ledun et al. |
| 9,493,283 B2 | 11/2016 | Tuyn |
| D773,250 S | 12/2016 | Miller |
| D773,938 S | 12/2016 | Weber |
| D774,826 S | 12/2016 | Boroski |
| 9,522,770 B2 | 12/2016 | Pichrt |
| 9,532,671 B2 | 1/2017 | Lin |
| D778,117 S | 2/2017 | Du |
| D778,118 S | 2/2017 | Du |
| D778,725 S | 2/2017 | Sorensen et al. |
| 9,586,733 B2 | 3/2017 | Garza |
| D784,812 S | 4/2017 | Miller |
| D786,012 S | 5/2017 | Hein et al. |
| D787,893 S | 5/2017 | Seiders et al. |
| D790,913 S | 7/2017 | Stover et al. |
| D791,542 S | 7/2017 | Miksovsky et al. |
| D792,765 S | 7/2017 | Buck |
| 9,694,953 B2 | 7/2017 | Meyers et al. |
| 9,708,108 B2 | 7/2017 | Gregory et al. |
| D795,008 S | 8/2017 | Eyal |
| D795,705 S | 8/2017 | Huang |
| 9,745,110 B2 | 8/2017 | Boyer et al. |
| D797,557 S | 9/2017 | Ziccardi |
| 9,771,189 B2 | 9/2017 | Miksovsky et al. |
| D799,269 S | 10/2017 | Vargo |
| D799,909 S | 10/2017 | Partridge |
| D799,963 S | 10/2017 | Akiyama |
| 9,801,969 B2 | 10/2017 | Griffis |
| D802,375 S | 11/2017 | Kao |
| D802,419 S | 11/2017 | Seiders et al. |
| D802,994 S | 11/2017 | Seiders et al. |
| D806,465 S | 1/2018 | Boroski |
| D806,543 S | 1/2018 | Finkbohner et al. |
| 9,919,860 B2 | 3/2018 | Dabah et al. |
| 9,926,115 B2 | 3/2018 | Jung et al. |
| D814,852 S | 4/2018 | Melanson et al. |
| D814,930 S | 4/2018 | Tremayne et al. |
| D816,426 S | 5/2018 | Washburn et al. |
| D817,114 S | 5/2018 | Beckman |
| D818,775 S | 5/2018 | Woodruff |
| D819,402 S | 6/2018 | Silsby et al. |
| D819,443 S | 6/2018 | Martinez Carregui et al. |
| D820,039 S | 6/2018 | Fitzsimons |
| 10,029,832 B2 | 7/2018 | Isogai |
| 10,040,593 B2 | 8/2018 | Ross et al. |
| D831,434 S | 10/2018 | Washburn et al. |
| 10,086,980 B2 | 10/2018 | Isogai |
| D834,938 S | 12/2018 | Barnes et al. |
| D835,937 S | 12/2018 | Nichols |
| D836,387 S | 12/2018 | Silsby et al. |
| D836,388 S | 12/2018 | Abante et al. |
| D836,389 S | 12/2018 | Abante et al. |
| 10,167,120 B1 | 1/2019 | Levy et al. |
| 10,183,791 B2 | 1/2019 | Friedrich et al. |
| 10,189,619 B1 | 1/2019 | Crawley |
| 10,196,179 B2 | 2/2019 | Wisniewski |
| 10,196,185 B2 | 2/2019 | Zoppas |
| 10,196,186 B2 | 2/2019 | Cox |
| 10,202,224 B2 | 2/2019 | Painchaud |
| 10,214,323 B2 | 2/2019 | Conley et al. |
| D842,030 S | 3/2019 | Meyers |
| D842,038 S | 3/2019 | Seiders et al. |
| D883,737 S | 5/2020 | Bullock et al. |
| D883,738 S | 5/2020 | Bullock et al. |

(56) References Cited

U.S. PATENT DOCUMENTS

| | | | |
|---|---|---|---|
| D885,903 S | 6/2020 | Rane et al. | |
| D887,776 S | 6/2020 | Bo | |
| D897,151 S | 9/2020 | Bullock et al. | |
| 2002/0014498 A1 | 2/2002 | Forsman et al. | |
| 2003/0141321 A1 | 7/2003 | Sekendur | |
| 2003/0155323 A1 | 8/2003 | Ekkert | |
| 2004/0016715 A1 | 1/2004 | Strikovic | |
| 2004/0045967 A1* | 3/2004 | Becker | B65D 47/122 220/288 |
| 2004/0201224 A1 | 10/2004 | Chang | |
| 2004/0206721 A1 | 10/2004 | Swanberg et al. | |
| 2005/0274741 A1 | 12/2005 | Cho | |
| 2006/0180585 A1 | 8/2006 | Cunningham et al. | |
| 2007/0108153 A1 | 5/2007 | Weist | |
| 2007/0199914 A1 | 8/2007 | Hung | |
| 2007/0251956 A1 | 11/2007 | Wasserman et al. | |
| 2008/0142466 A1 | 6/2008 | Balitski | |
| 2008/0230506 A1 | 9/2008 | Lantz et al. | |
| 2009/0045194 A1 | 2/2009 | Rhee | |
| 2009/0084752 A1 | 4/2009 | Coulson | |
| 2009/0101644 A1 | 4/2009 | Maiwald et al. | |
| 2010/0012615 A1 | 1/2010 | Brooks | |
| 2010/0089151 A1 | 4/2010 | Mantilla et al. | |
| 2010/0200602 A1 | 8/2010 | Chan | |
| 2010/0215294 A1 | 8/2010 | Berman | |
| 2010/0237078 A1 | 9/2010 | Lentz et al. | |
| 2011/0036836 A1 | 2/2011 | Lantheaume | |
| 2011/0056386 A1 | 3/2011 | Taketani | |
| 2011/0186585 A1 | 8/2011 | Lu | |
| 2011/0198352 A1 | 8/2011 | Lown et al. | |
| 2011/0220656 A1 | 9/2011 | Gau | |
| 2011/0278216 A1 | 11/2011 | Hull et al. | |
| 2012/0074143 A1 | 3/2012 | Lin | |
| 2012/0199548 A1 | 8/2012 | Kitto | |
| 2012/0312031 A1 | 12/2012 | Olsen et al. | |
| 2013/0136382 A1 | 5/2013 | Barron | |
| 2013/0306642 A1 | 11/2013 | Dabah et al. | |
| 2014/0069917 A1 | 3/2014 | Meyers et al. | |
| 2014/0251938 A1 | 9/2014 | Rose et al. | |
| 2014/0312077 A1 | 10/2014 | Tajima et al. | |
| 2014/0353275 A1 | 12/2014 | Hung | |
| 2015/0191293 A1 | 7/2015 | Forcella | |
| 2015/0232232 A1* | 8/2015 | Shibuki | B65D 81/3869 220/592.16 |
| 2015/0251812 A1 | 9/2015 | Gillie | |
| 2015/0314929 A1 | 11/2015 | Tebbe et al. | |
| 2015/0374151 A1 | 12/2015 | Lin | |
| 2016/0159538 A1 | 6/2016 | Michie | |
| 2016/0167852 A1 | 6/2016 | Moradi | |
| 2016/0176587 A1 | 6/2016 | Heraud | |
| 2016/0192797 A1* | 7/2016 | Yang | B65D 53/02 220/592.17 |
| 2016/0256359 A1 | 9/2016 | Trawick et al. | |
| 2016/0318693 A1 | 11/2016 | Hein et al. | |
| 2016/0355305 A1 | 12/2016 | Hoskins | |
| 2016/0368663 A1 | 12/2016 | Hizon | |
| 2017/0001772 A1 | 1/2017 | Rho | |
| 2017/0043916 A1 | 2/2017 | Seiders et al. | |
| 2017/0081090 A1* | 3/2017 | Boyer | A47J 41/0027 |
| 2017/0119212 A1 | 5/2017 | Petrillo et al. | |
| 2017/0127859 A1 | 5/2017 | Hornung et al. | |
| 2017/0144811 A1 | 5/2017 | Wohlgenannt | |
| 2017/0158398 A1 | 6/2017 | Shively | |
| 2017/0158412 A1 | 6/2017 | Seiders et al. | |
| 2017/0354289 A1 | 12/2017 | Marina et al. | |
| 2018/0029762 A1 | 2/2018 | Eyal | |
| 2018/0050845 A1 | 2/2018 | Chin et al. | |
| 2018/0105346 A1 | 4/2018 | Tolman et al. | |
| 2018/0118427 A1 | 5/2018 | Lee et al. | |
| 2018/0134457 A1 | 5/2018 | Mutterle et al. | |
| 2018/0141722 A1 | 5/2018 | Langelaan | |
| 2018/0162608 A1 | 6/2018 | Kim | |
| 2018/0162610 A1* | 6/2018 | Kim | B65D 51/18 |
| 2018/0265264 A1 | 9/2018 | Graybill et al. | |
| 2019/0002164 A1 | 1/2019 | Nakatani et al. | |
| 2019/0039782 A1 | 2/2019 | Campbell | |
| 2019/0047754 A1 | 2/2019 | Dubiel et al. | |
| 2019/0047773 A1 | 2/2019 | Bullock et al. | |
| 2019/0062010 A1 | 2/2019 | Apte et al. | |
| 2020/0245818 A1 | 8/2020 | Halkes et al. | |
| 2020/0245858 A1 | 8/2020 | Takeno et al. | |

FOREIGN PATENT DOCUMENTS

| | | |
|---|---|---|
| CA | 2504722 A1 | 1/2006 |
| CA | 3030583 A1 | 11/2018 |
| CA | 3012127 A1 | 2/2019 |
| CN | 201019201 Y | 2/2008 |
| CN | 300984030 | 8/2009 |
| CN | 201349991 | 11/2009 |
| CN | 301110494 | 1/2010 |
| CN | 201640878 U | 11/2010 |
| CN | 201694495 U | 1/2011 |
| CN | 201777557 U | 3/2011 |
| CN | 202030152 U | 11/2011 |
| CN | 202060630 U | 12/2011 |
| CN | 202086330 U | 12/2011 |
| CN | 301888124 S | 4/2012 |
| CN | 202287503 U | 7/2012 |
| CN | 302228747 S | 12/2012 |
| CN | 103112651 A | 5/2013 |
| CN | 202981686 U | 6/2013 |
| CN | 203127394 U | 8/2013 |
| CN | 203207847 U | 9/2013 |
| CN | 103619723 A | 3/2014 |
| CN | 104129579 A | 11/2014 |
| CN | 102730301 B | 3/2015 |
| CN | 303176279 S | 4/2015 |
| CN | 103086061 B | 8/2015 |
| CN | 103538798 A | 9/2015 |
| CN | 303413115 S | 10/2015 |
| CN | 303528321 | 12/2015 |
| CN | 105705425 A | 6/2016 |
| CN | 303748684 S | 7/2016 |
| CN | 303894653 | 10/2016 |
| CN | 303899030 | 10/2016 |
| CN | 303902404 | 11/2016 |
| CN | 303905254 | 11/2016 |
| CN | 303905266 | 11/2016 |
| CN | 303944047 | 11/2016 |
| CN | 303956194 | 12/2016 |
| CN | 303965272 | 12/2016 |
| CN | 303965286 | 12/2016 |
| CN | 303965392 | 12/2016 |
| CN | 303965400 | 12/2016 |
| CN | 303966239 | 12/2016 |
| CN | 303974938 | 12/2016 |
| CN | 303984407 | 12/2016 |
| CN | 303984493 | 12/2016 |
| CN | 304011213 | 1/2017 |
| CN | 304011214 | 1/2017 |
| CN | 304025064 S | 2/2017 |
| CN | 205998332 U | 3/2017 |
| CN | 108313494 A | 7/2018 |
| CN | 107224167 B | 8/2018 |
| CN | 108394633 A | 8/2018 |
| CN | 106458394 B | 10/2018 |
| CN | 105050907 B | 12/2018 |
| CN | 105358441 B | 12/2018 |
| CN | 108945789 A | 12/2018 |
| CN | 106163937 B | 1/2019 |
| CN | 105595863 B | 2/2019 |
| CN | 106255648 B | 2/2019 |
| CN | 106414269 B | 2/2019 |
| CN | 106458396 B | 2/2019 |
| CN | 109319295 A | 2/2019 |
| CN | 208470495 U | 2/2019 |
| CN | 208485029 U | 2/2019 |
| CN | 208531194 U | 2/2019 |
| DE | 2233565 A1 | 6/1973 |
| DE | 2226556 B2 | 8/1977 |
| DE | 3514261 A1 | 1/1986 |
| DE | 29612345 U1 | 9/1996 |
| DE | 29611746 U1 | 11/1997 |

(56) References Cited

FOREIGN PATENT DOCUMENTS

| | | |
|---|---|---|
| DE | 69509827 T2 | 10/1999 |
| DE | 29912668 U1 | 12/1999 |
| DE | 202008009584 U1 | 10/2008 |
| DE | 102014011506 B3 | 7/2015 |
| DK | 402016101176-0008 | 11/2016 |
| DK | 402016101176-0010 | 11/2016 |
| EM | 003528504-0004 | 12/2016 |
| EM | 004539732-0003 | 12/2017 |
| EP | 1088764 A1 | 4/2001 |
| EP | 1693310 A1 | 8/2006 |
| EP | 1934106 A1 | 6/2011 |
| EP | 2457842 B1 | 5/2015 |
| EP | 3066018 A4 | 11/2016 |
| EP | 2851311 B1 | 6/2018 |
| EP | 3157833 A | 8/2018 |
| EP | 2796078 B1 | 10/2018 |
| EP | 3398484 A1 | 11/2018 |
| EP | 3398871 A1 | 11/2018 |
| EP | 3441320 A1 | 2/2019 |
| FR | 1359912 A | 4/1964 |
| FR | 2521957 B1 | 10/1986 |
| FR | 2786465 | 6/2000 |
| FR | 2830848 A1 | 4/2003 |
| GB | 729903 A | 5/1955 |
| GB | 2114959 B | 7/1985 |
| JP | S50-64 A | 1/1975 |
| JP | S59044941 U | 3/1984 |
| JP | H02-052759 U | 4/1990 |
| JP | H03159974 U | 7/1991 |
| JP | H08-0117119 A | 5/1996 |
| JP | 2000333847 A | 12/2000 |
| JP | 2001315831 A | 11/2001 |
| JP | 2002068227 A | 3/2002 |
| JP | 2002145294 A | 5/2002 |
| JP | 2003125912 A | 5/2003 |
| JP | 2008162679 A | 7/2008 |
| JP | 1363566 | 6/2009 |
| JP | 2010280402 A | 12/2010 |
| JP | 2011093544 A | 5/2011 |
| JP | 2012025436 A | 2/2012 |
| JP | 2012517386 A | 8/2012 |
| JP | 1530358 S | 8/2015 |
| JP | 2016141412 A | 8/2016 |
| JP | 6408837 B2 | 10/2018 |
| JP | 6409250 B1 | 10/2018 |
| JP | 2019001538 A | 1/2019 |
| JP | 6467720 B2 | 2/2019 |
| JP | 2019503943 A | 2/2019 |
| KR | 200169857 Y1 | 2/2000 |
| KR | 300295354 | 4/2002 |
| KR | 300303813.0000 | 8/2002 |
| KR | 100908999 B1 | 7/2009 |
| KR | 20100008131 A | 1/2010 |
| KR | 300764889.0000 | 10/2014 |
| KR | 3020150002495 | 12/2015 |
| KR | 101581270 B1 | 1/2016 |
| KR | 30-0847946 | 4/2016 |
| KR | 101668309 B1 | 10/2016 |
| KR | 300883384.0000 | 11/2016 |
| KR | 300884377.0000 | 12/2016 |
| KR | 300885455.0000 | 12/2016 |
| KR | 300885851.0000 | 12/2016 |
| KR | 300888536.0000 | 1/2017 |
| KR | 101785906 B1 | 10/2017 |
| KR | 20-2019-0000204 U | 1/2019 |
| KR | 101922235 B1 | 2/2019 |
| RU | 00100680 | 11/2016 |
| WO | 2005028317 A2 | 3/2005 |
| WO | 2006023238 A2 | 3/2006 |
| WO | 07123365 A1 | 11/2007 |
| WO | 08048039 A1 | 4/2008 |
| WO | 2014114493 A1 | 7/2014 |
| WO | 14041325 A3 | 9/2014 |
| WO | 14184341 A1 | 11/2014 |
| WO | D088688-002 | 1/2016 |
| WO | 16180908 A1 | 11/2016 |
| WO | 17097485 A1 | 6/2017 |
| WO | 17115193 A1 | 7/2017 |
| WO | 2018075540 A1 | 4/2018 |
| WO | 18149763 A1 | 8/2018 |
| WO | 2017/223093 A3 | 2/2019 |
| WO | 2019025589 A1 | 2/2019 |

OTHER PUBLICATIONS

Apr. 14, 2022—(AU) Examination Report No. 1—App. No. 2019359826.
Mar. 14, 2022—(EP) Extended Search Report—App. No. 21207878.6.
May 10, 2022—(JP) Office Action—Appl. No. 2021-521191.
May 27, 2022—(JP) Office Action—App. No. 2021-523912.
Sep. 23, 2012—(CN) First Office Action—App. No. 2021091702140010.
Amazon. YETI Rambler 12 oz Bottle, Stainless Steel, Vacuum Insulated, with Hot Shot Cap. Apr. 4, 2019. https://www.amazon.com/YETI-Rambler-Stainless-Vacuum-Insulated/dp/B07QD7Z2ZP (Year: 2019).
Oct. 19, 2021—(JP) Office Action—App. No. 2019542349.
Mar. 30, 2022—(AU) Examination Report No. 1—App. No. 2019374770.
Aug. 22, 2022—(AU) Examination Report No. 2—App. No. 2019374770.
Aug. 17, 2022—(CA) Examiner's Report—App. No. 3118873.
Aug. 31, 2022—(AU) Examination Report No. 1—App. No. 2017346682.
Nov. 15, 2022—(CN) First Office Action—App. No. 202111219424.3.
Avex, "40oz. 3Sixty Pour Stainless Steel Thermal Bottle", Accessed May 18, 2017. http://www.avexoutdoor.com/3sixty-pour-realtree-thermal-bottle.html.
Jan. 29, 2018—(WO) Invitation to Pay Additional Fees and Partial International Search Report—App. No. PCT/US2017/057010—13 pages.
Liquid Hardware, Insulated Aqua Silver Sidewinder Vacuum Bottle 20oz/592ml. Powder Coated in USA!, product description, retrieved from internet on Aug. 12, 2015, 3 pages.
Nov. 2, 2016—(WO) International Search Report and Written Opinion—App. No. PCT/US2016/047043.
Oct. 18, 2016—(JP) Office Action—App. 2016-010799, English Translation, 3 Pages.
Oct. 18, 2016—(JP) Office Action—App. 2016-010800, English Translation, 3 Pages.
YETI 36 oz. Rambler: Announced Jan. 11, 2016 [online], site visited [May 10, 2016]. Available from Internet URL: http://yeticoolers.com/rambler-bottle-36-oz/.
KOLD Vacuum Insulated Stainless Steel Sports Bottle: Announced Dec. 8, 2015 [online], site visited [May 11, 2016]. Available from Internet URL: http://www.amazon.com/KOLD-Sports-Water-Bottles-Insulated/dp/B018YH K79E/ ref=cm.
"Hydro Flask Insulated Stainless Steel Water Bottle" published on Dec. 29, 2014, retrieved from http://web.archive.org/web/*/https://www.amazon.com/dp/B004X55L9l/ref=twister_B00GA03LG4?_encoding=UTF8&psc=1 on Sep. 22, 2016.
"UA Beyond 18 oz. Vacuum Insulated Water Bottle" published on Mar. 29, 2015, retrieved from http://web.archive.org/web/*/https://www.underarmour.com/en-us/beyond-18-oz-vacuum-insulated-ss-bottle-with-flip-top-lid/pid1232014 on Sep. 22, 2016.
"Klean Kanteen Insulated Classic with Polypropylene" published on Jul. 7, 2015, retrieved from http://web.archive.org/web/*/https://www.lifewithoutplastic.com/store/klean-kanteen-insulated-classic-with-polypropylene-loop-cap-0-95-l-32-oz.html on Sep. 22, 2016.
"Eco Vessel 64 ounce Growler" published on Jan. 28, 2015, retrieved from http://web.archive.org/web/*/http://www.snewsnet.com/press-release/eco-vessel-launches-the-boss-insulated-growler/ on Sep. 22, 2016.
"64 oz Double-Wall Vacuum-Insulated Growler" published on Nov. 14, 2014, retrieved from https://web.archive.org/web/*/http://www.fiftyfiftybottles.com/64oz-growler/ on Sep. 22, 2016.

(56) References Cited

OTHER PUBLICATIONS

"2015 BOULDER Insulated Water Bottle with Tea, Fruit, Ice Strainer" published on Jun. 28, 2015, retrieved from http://web.archive.org/web/*/http://www.ecovessel.com/boulder-insulated-water-bottle-with-tea-fruit-ice-strainer-20-oz/ on Sep. 2022.
"KB8 20 oz. Double Wall Stainless Bottle," published on May 22, 2015, retrieved from https://web.archive.org/web/20150807054814/http://thermo-steel.com/work/keen-kb8 on Sep. 27, 2016.
Nov. 1, 2016—(JP) Office Action—App. 2016-9606, English Translation, 2 Pages.
Oct. 4, 2016—(JP) Office Action—App 2016-9607, English Translation, 2 pages.
Oct. 4, 2016—(JP) Office Action—App. 2016-9608, English Translation, 2 Pages.
'First Look: YETI Rambler One Gallon 'Jug' Review'. Found online Jun. 12, 2017 at gearjunkie.com. Page dated May 2, 2017. Retrieved from https://gearjunkie.com/yeti-rambler-one-gallon-jug-review.
"Lifefactory Water Bottle with Flip Cap". Found online Oct. 26, 2016 at amazon.com. Page dated Jan. 21, 2012. Retrieved from https://www.amazon.com/Lifefactory-22-Ounce-BPA-Free-Bottle-Silicone/dp/B01JIHJYOI/ref=pd_day0_79_22?_encoding=UTF8&refRID=YW47QZQ73YFSYXXEHXG2.
"Igloo Sport Beverage Cooler". Found online Jun. 7, 2017 at amazon.com. Page dated Mar. 9, 2013. Retrieved from https://www.amazon.com/Igloo-Beverage-Cooler-Majestic-2-Gallon/dp/B0088AYPOG/ref=cm_cr_arp_d_product_top?ie=UTF8.
"Klear Loop Cap Hangle Lids for Klear Bottle and Hydro Flask". Found online Jun. 7, 2017 at amazon.com. Page dated Jul. 4, 2016. Retrieved from https://www.amazon.com/Klear-Handle-Bottle-Hydro-Flask/dp/B01EXKSRLQ/ref=cm_cr_arp_d_product_top?ie=UTF8.
Rambler Jug Mount. Online, published date unknown. Retrieved on Jan. 2, 2018 from URL: https://www.yeti.com/accessories/rambler-jug-mount!YRAMJM.html.
Mar. 27, 2018—(WO) International Search Report and Written Opinion—App. No. PCT/US2017/057010—19 pages.
YETI Rambler Vacuum Insulated Stainless Steel One Gallon Jug with MagCap. Found online 06/12/20177 at amazon.com. Page dated May 30, 2017. Retrieved from https://www.amazon.com/YETI-Rambler-Vacuum-Insulated-Stainless/dp/B071HTJ4Q8.
"Klean Kanteen Stainless Unibody Bamboo Cap". Found online Jun. 12, 2018 at amazon.com. Page dated Sep. 10, 2012. Retrieved from https://www.amazon.com/Klean-Kanteen-Stainless-Unibody-Bamboo/dp/B0083F0SDI/ref=cm_cr_arp_d_product_top?ie=UTF8.
"Takeya ThermoFlask". Found online Jun. 9, 2018 at amazon.com. Page dated Apr. 15, 2016. Retrieved from https://www.amazon.com/Takeya-ThermoFlask-Pack-Back-Silver/dp/B01D7NIOWW/ref=cm_cr_arp_d_product_top?ie=UTF8.
"Twitter: h2go elevate and h2go inspire: same lid stlye, different body typw". Found online Jun. 12, 2018 at twitter.com. Page dated Jan. 21, 2015. Retrieved from https://twitter.com/etsexpress/status/557997114589196288.
"Thermos Stainless King 60 Ounce Vacuum Insulated Beverage Bottle." Found online Jul. 13, 2018 at www.amazon.com. Page dated Aug. 15, 2015. Retrieved from U RL: https://www.amazon.com/Thermos-Stainless-Insulated-Beverage-Midnight/dp/B008YB4V52 (Year: 2015).
"Stanley Classic Vacuum Bottle." Found online Jul. 13, 2018 at www.amazon.com. Page dated Nov. 30, 2014. Retrieved from URL: https://tinyurl.com/y8nnymt9 (Year: 2014).
Feb. 11, 2019—(CN) Office Action—App. No. 201680059619.7.
"YETI Rambler Bottle Cup Cap Accessory." Found online: Jun. 18, 2019 at www.amazon.com. Product reviewed May 30, 2019. Retrieved from URL: http://tinyurl.com/y32g688u (Year: 2019).
Jul. 15, 2019—(CN) Office Action—App. No. 201680059619.7.
Youtube. YETI Rambler R12 Bottle with Hotshot Cap Demo, Features & Review by Tentworld—The Camping Experts. Oct. 30, 2019. https://www.youtube.com/watch?v=cLZsvhUMydM (Year: 2019).
Dec. 4, 2019—(CN) Examination Report—App. No. 201680059619.7.
Feb. 19, 2020—(EP) Extended Search Report—App No. EP19209538.
Apr. 6, 2020—(WO) International Search Report & Written Opinion—PCT/US19/056566.
May 19, 2020—(CN) Office Action—App. No. 201680059619.7.
May 7, 2020—(WO) ISR & Written Opinion—PCT/US19/059799.
Jul. 23, 2020—U.S. Final Office Action—U.S. Appl. No. 15/786,163.
Jan. 4, 2021—(CN) Fourth Office Action—App. No. 201680059619.7.
United States District Court Western District of Texas, Austin Division, "Complaint for Damages and Injunctive Relief tor: (1)-(12) Patent Infringement in Violation of 35 U.S.C. § 271; and (13) Breach of Contract", *YETI Coolers, LLC v. RTIC Outdoors, LLC; and Corporate Support & Fulfillment, LLC*, Case 1:21-cv-00214, filed Mar. 5, 2021, 338 pages.
Jan. 29, 2021 (CN) Chinese Evaluation Report app No. 201930169002.7.
Jun. 3, 2021—(CN) Fifth Office Action—App. No. 201680059619.7.
Jul. 15, 2022—(CA) Office Action—App. No. 3116874.
Oct. 21, 2022—(MX) First Substantive Office Action—App. No. MX/A/2019/004520.
Feb 14, 2023—(CA) Office Action—Ap. No. 3118873.
United States District Court Western District of Texas, Austin Division, "First Amended Complaint, 'Complaint for Damages and Injunctive Relief tor: (1 )-(15) Patent Infringement in Violation of 35 U.S.C. § 271; and (16) Breach of Contract'", *YETI Coolers, LLC v. RTIC Outdoors, LLC; and Corporate Support & Fulfillment, LLC*, Case 1:21-cv-00214-RP, Document 10, filed Jun. 2, 2021, 39 pages.
Nov 2, 2022—(AU) Examination Report No. 2—App. No. 2019359826.
Dec. 23, 2022—(NZ) First Examination Report—App. No. 774979.
Jan. 27, 2023—(NZ) Examination Report No. 1—App. No. 775705.
Feb. 3, 2023—(JP) Office Action—App. No. 2022006119.
Jul. 6, 2023—(NZ) Examination Report No. 2—App. No. 774979.
Aug. 2, 20236—(CN) Office Action—App. No. 201980068566.9.

* cited by examiner

CONTAINER AND METHOD OF FORMING A CONTAINER

CROSS-REFERENCE TO RELATED APPLICATIONS

This application is a divisional of U.S. patent application Ser. No. 16/163,153 filed Oct. 17, 2018, which is a continuation-in-part of U.S. patent application Ser. No. 15/786,163, filed on Oct. 17, 2017, which claims priority to both U.S. Provisional Patent Application No. 62/409,242, filed Oct. 17, 2016, and U.S. Provisional Patent Application No. 62/508,793, filed 19 May 2017. The content of these above listed applications is expressly incorporated herein by reference in their entirety for any and all non-limiting purposes.

FIELD

The present disclosure herein relates broadly to containers, and more specifically to drinkware containers used for drinkable beverages or foods.

BACKGROUND

A container may be configured to store a volume of liquid. Containers can be filled with hot or cold drinkable liquids, such as water, coffee, tea, a soft drink, or an alcoholic beverage, such as beer. These containers can be formed of a double-wall vacuumed formed construction to provide insulative properties to help maintain the temperature of the liquid within the container.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In certain examples, an insulating container can be configured to retain a volume of liquid. The insulating container can include a canister with a first inner wall having a first end with an opening extending into an internal reservoir for receiving liquid, along with a second outer wall and a bottom portion forming an outer shell of the canister. The bottom portion may form a second end configured to support the canister on a surface.

The insulating container may include a spout adapter configured to seal the opening of the canister, and provide a re-sealable spout opening that is narrower than the opening of the canister, to facilitate more controlled pouring of the contents of the internal reservoir of the canister into another container. In one example, the other container may be a cup formed from a lid that is removably coupled to a top of the spout adapter.

BRIEF DESCRIPTION OF THE DRAWINGS

The present disclosure is illustrated by way of example and not limited in the accompanying figures in which like reference numerals indicate similar elements and in which.

Further, it is to be understood that the drawings may represent the scale of different components of various examples; however, the disclosed examples are not limited to that particular scale.

DETAILED DESCRIPTION

In the following description of the various examples, reference is made to the accompanying drawings, which form a part hereof, and in which is shown by way of illustration various examples in which aspects of the disclosure may be practiced. It is to be understood that other examples may be utilized and structural and functional modifications may be made without departing from the scope and spirit of the present disclosure.

Figure 1:
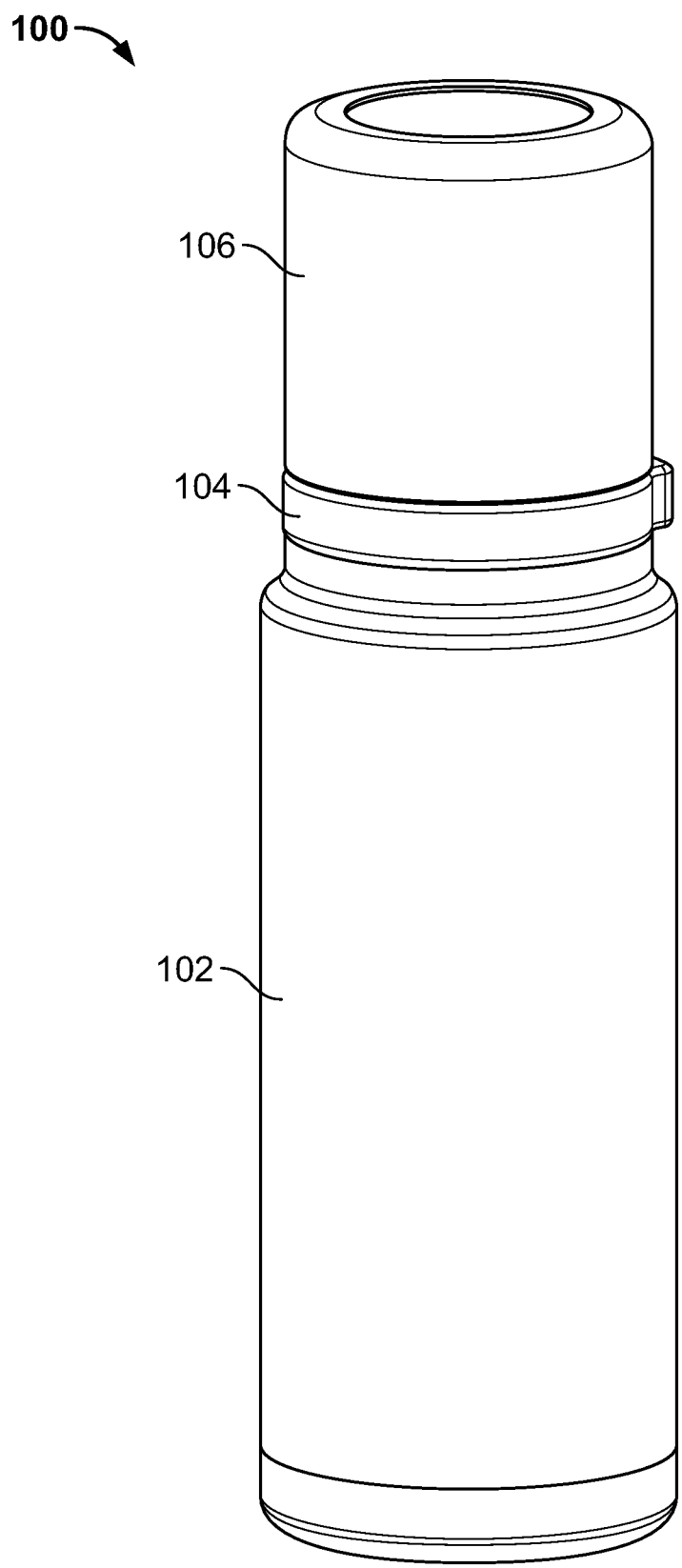
FIG. 1 depicts an isometric view of an insulating container, according to one or more aspects described herein.

FIG. 1 depicts an isometric view of an insulating container 100, according to one or more aspects described herein. In one example, the container 100 may be configured to store a volume of liquid. The container 100 may comprise a canister 102 that is removably coupled to a spout adapter 104 and a lid 106. The lid 106, when removed from the spout adapter 104, may be configured to function as a cup into which, for example, a portion of the liquid stored in the canister 102 can be poured. In one example, the canister 102 may be substantially cylindrical in shape, however, it is contemplated that the canister 102 may be embodied with any shape, such as a cuboidal shape, without departing from the scope of these disclosures. Further, in various examples, the canister 102 may be referred to as a bottom portion, base, or insulated base structure having a substantially cylindrical shape. As an example, a structure may be described as having a substantially cylindrical shape may have a shape of a cylinder with a generally circular cross-sectional shape and parallel side walls, as another option a substantially cylindrical shape may have a generally circular cross-sectional shape where the side walls are within 5 degrees of being parallel to each other, or where the side walls are within 10 degrees of each other.

Figure 2:
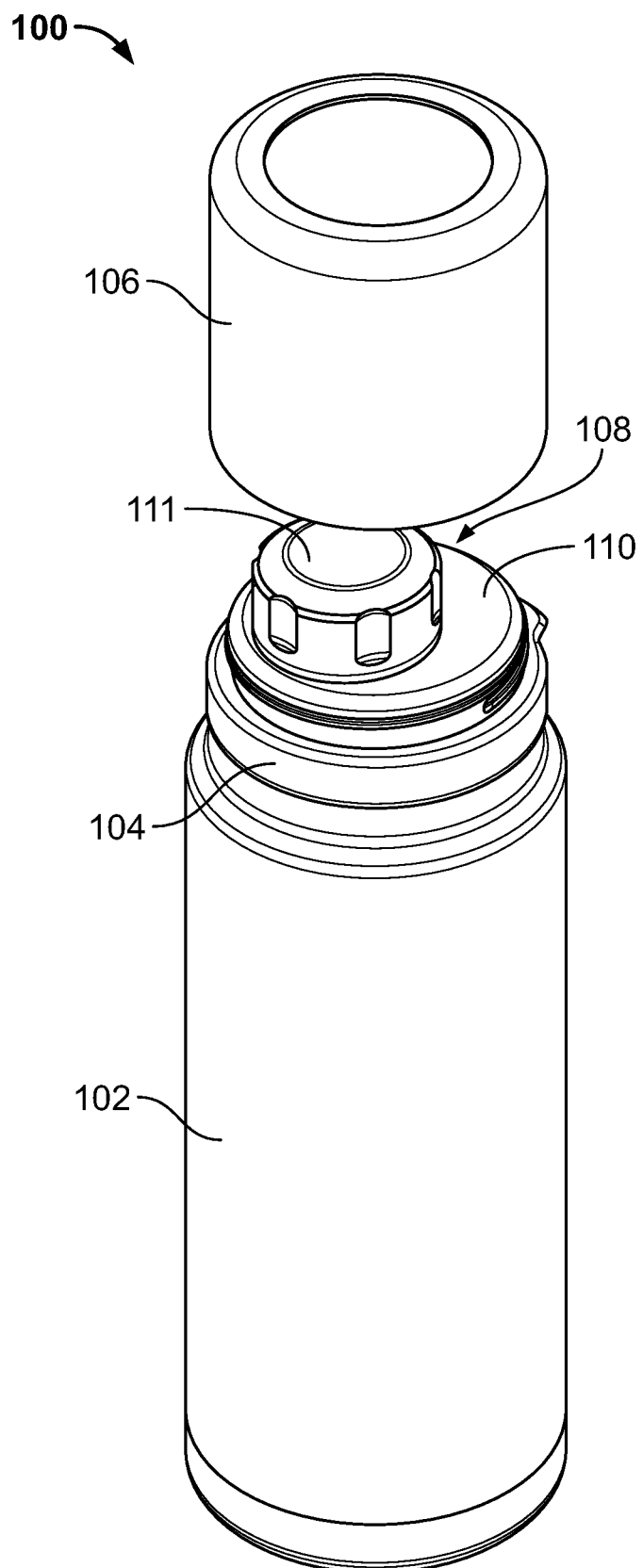
FIG. 2 depicts another isometric view of the insulating container from FIG. 1, according to one or more aspects described herein.
Figure 3:
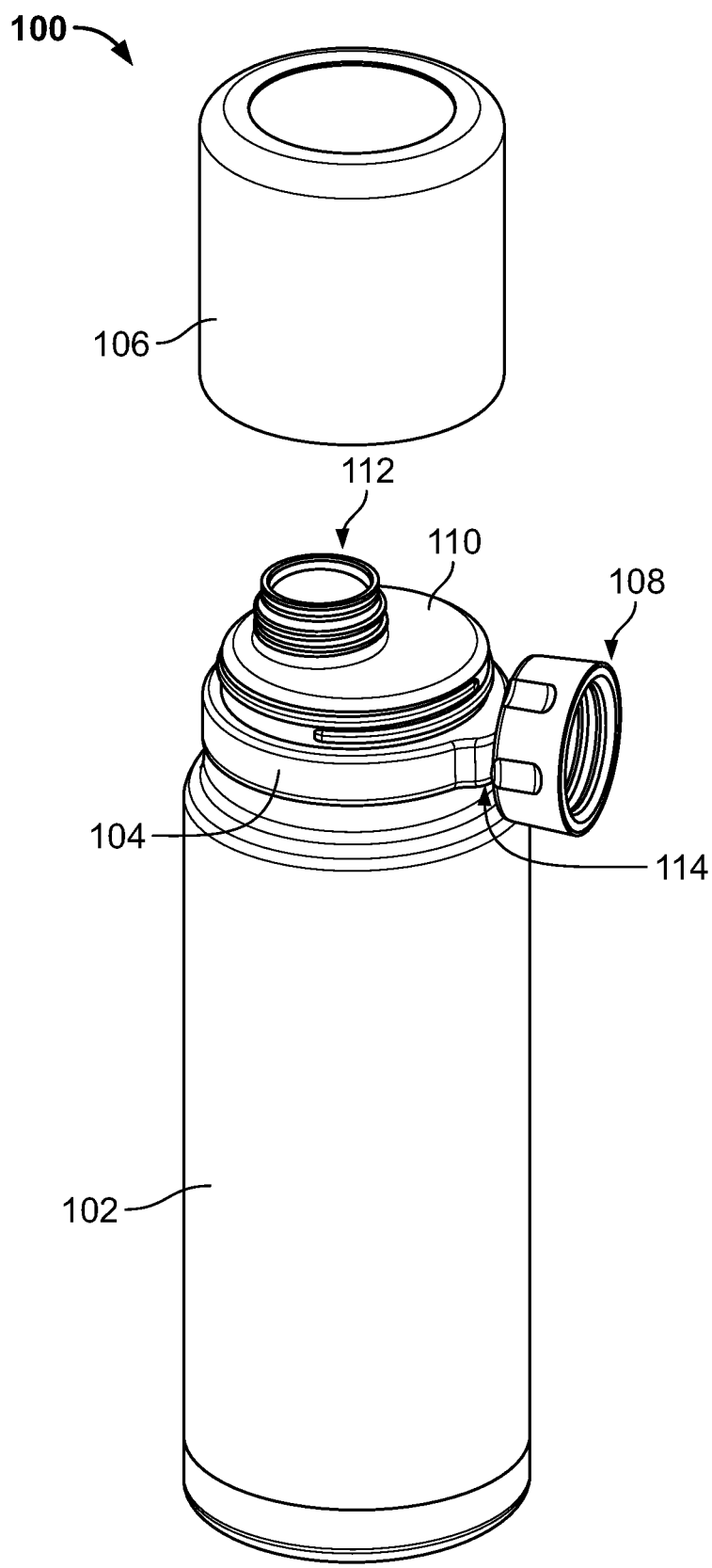
FIG. 3 depicts yet another isometric view of the insulating container from FIG. 1, according to one or more aspects described herein.

FIG. 2 depicts another isometric view of the insulating container 100 from FIG. 1, according to one or more aspects described herein. As depicted in FIG. 2, the lid 106 is removed from the spout adapter 104 to reveal a cap 108 that is removably coupled to a top surface 110 of the spout adapter 104. The cap 108, when removed from the spout adapter 104, as depicted in FIG. 3, reveals a spout opening 112 that extends through the spout adapter 104 into a cavity of the canister 102. Accordingly, the cap 108 may be configured to removably couple to, and seal (i.e. resealably seal), the spout opening 112. Accordingly, in one example, the spout opening 112 provides a narrower opening than an opening 158 of the canister 102 (see, e.g. FIG. 9), and as such, provides for more controlled/better targeted manual pouring of the contents of the canister 102 into another container, such as the lid 106, when removed from the spout adapter 104. In one example, the spout opening 112 of the spout adapter 104 is off-center on the top surface 110 of the spout adapter 104. It is contemplated that the spout opening 112 may be positioned at any point on the top surface 110, and may be off-center, as depicted, or may be centered. In another example, the spout opening 112 may have a central axis (parallel to the axis of rotation of the cylindrical shape of the spout opening 112) that is parallel to a longitudinal axis of the container 100 (i.e. longitudinal axis parallel to the axis of rotation of the cylindrical shape of the canister 102) and/or perpendicular to the plane of top surface 110 of the spout adapter 104. In an alternative example, the central axis of the spout opening 112 may be angled relative to the top surface 110 at an angle that is not 90 degrees. In this regard, it is contemplated that the any angle may be utilized, without departing from the scope of these disclosures.

In one implementation, the cap 108 includes a magnetic top surface 111. The magnetic top surface 111 may include a polymeric outer layer covering a ferromagnetic structure (e.g. a metal plate/other structural shape may be positioned below the magnetic top surface 111). In another implementation, all or a portion of the outer surfaces of the cap 108 may be constructed from one or metals and/or alloys. Accordingly, the magnetic top surface 111 may include an outer material that is ferromagnetic, or itself magnetized. In another implementation, the magnetic top surface 111 may comprise one or more polymers overmolded over a magnet structure (i.e. a magnetized metal/alloy may be positioned within the cap 108 as it is being molded).

The term "magnetic," as utilized herein, may refer to a material (e.g. a ferromagnetic material) that may be temporarily or "permanently" magnetized. As such, the term "magnetic" may refer to a material (i.e. a surface, or object, and the like) that may be magnetically attracted to a magnet (i.e. a temporary or permanent magnet) that has a magnetic field associated therewith. In one example, a magnetic material may be magnetized (i.e. may form a permanent magnet). Additionally, various examples of magnetic materials may be utilized with the disclosures described herein, including nickel, iron, and cobalt, and alloys thereof, among others.

The cap 108, when removed from the spout opening 112, as depicted in FIG. 3, may be magnetically coupled to a docking surface 114 of the spout adapter 104. Similar to the top surface 111 of the cap 108, the docking surface 114 of the spout adapter 104 may include a magnetic material. In one example, the docking surface 114 may include one or more polymers that are overmolded over a magnetic element (e.g. a metal plate, foil, or wire, among others). In another example, the docking surface 114 may include a metallic and magnetic outer surface.

It is contemplated that in one example, the canister 102 and the lid 106 may be primarily constructed from an alloy, such as steel, or an alloy of titanium, and the spout adapter 104 and cap 108 may be primarily constructed from one or more polymers (with the exception of the magnetic top surface 111, and the docking surface 114, among others). However, it is further contemplated that each element described herein can be constructed from one or more metals, alloys, polymers, ceramics, or fiber-reinforced materials, among others. In particular, the container 100 may utilize one or more of steel, titanium, iron, nickel, cobalt, high impact polystyrene, acrylonitrile butadiene styrene, nylon, polyvinylchloride, polyethylene, and/or polypropylene, among others.

Figure 4:
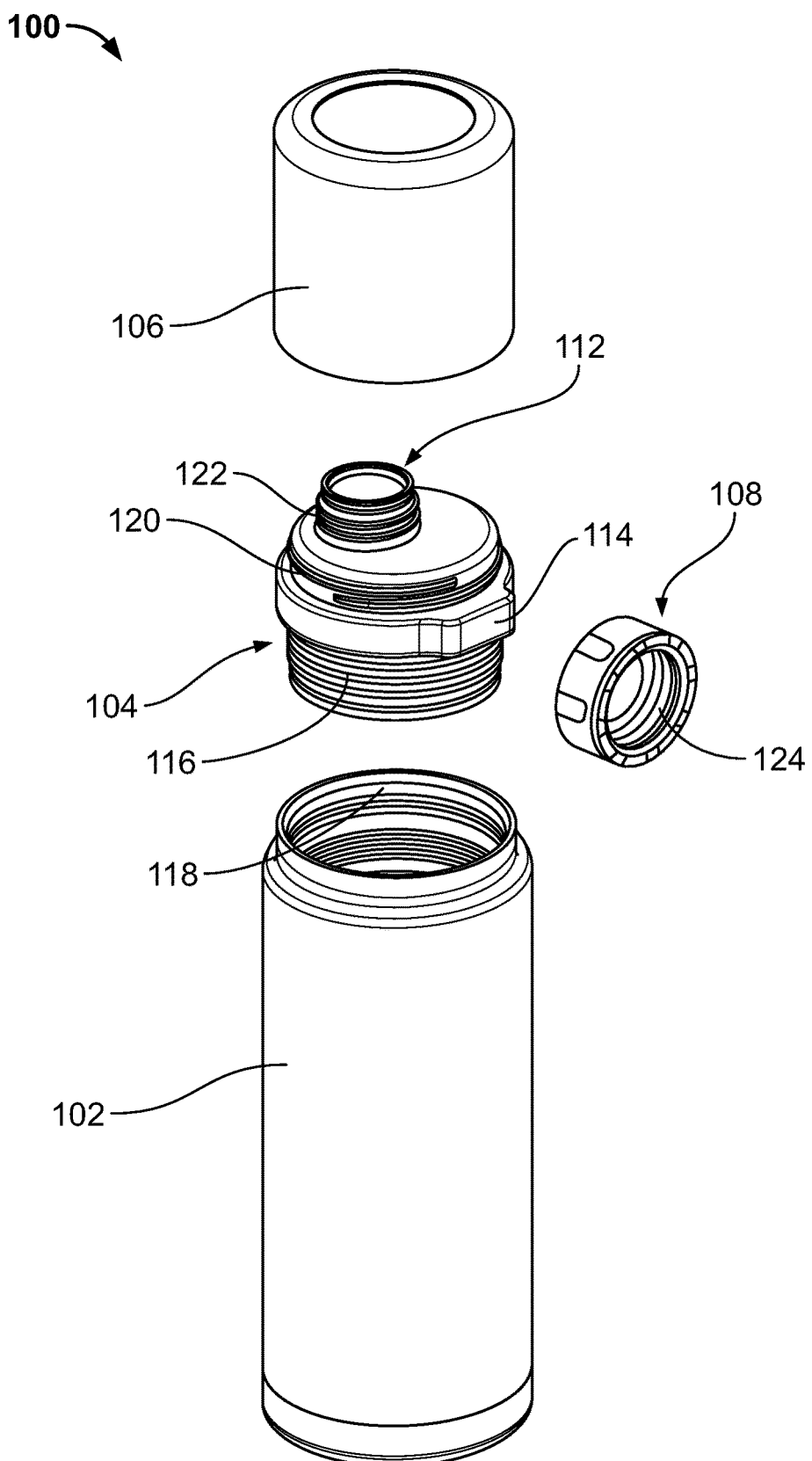
FIG. 4 depicts an exploded isometric view of the container from FIG. 1, according to one or more aspects described herein.

FIG. 4 depicts an exploded isometric view of the container 100, according to one or more aspects described herein. In particular, FIG. 4 depicts the spout adapter 104 removed from the canister 102, and the lid 106 and cap 108 removed from the spout adapter 104. In one implementation, the spout adapter 104 may include a bottom threaded surface 116 that is configured to removably couple to a threaded inner surface 118 of the canister 102. Additionally, the spout adapter 104 may include a top threaded surface 120 that is configured to removably couple to a threaded inner surface of the lid 106. Further a threaded outer spout surface 122 is configured to removably couple to a threaded inner surface 124 of the cap 108.

It is contemplated, however, that in an alternative implementation, the threaded surfaces previously described may be reversed, without departing from the scope of these disclosures. In this alternative implementation, the spout adapter 104 may include a bottom threaded surface that is configured to removably couple to a threaded outer surface of the canister 102, and the spout adapter 104 may include a top threaded surface that is configured to removably couple to a threaded outer surface of the lid 106. Further a threaded inner spout surface of the spout opening 112 may be configured to removably couple to a threaded outer surface of the cap 108.

It is contemplated that a threaded surface discussed herein may include any thread geometry, including any thread pitch, angle, or length, among others, without departing from the scope of these disclosures. As such, any of the bottom threaded surface 116, threaded inner surface 118, top threaded surface 120, threaded inner surface of the lid 106, threaded outer spout surface 122, and/or threaded inner surface 124 may be fully engaged with corresponding mating elements by rotating the elements relative to one another by any number of rotations, without departing from the scope of these disclosures. For example, two mating threaded elements, from elements 116, 118, 120, 122, and/or 124, may be fully engaged by rotating by approximately ¼ of one full revolution, approximately ⅓ of one full revolution, approximately ½ of one full revolution, approximately 1 full revolution, approximately 2 full revolutions, approximately 3 full revolutions, at least 1 revolution, or at least five revolutions, among many others.

It is further contemplated that the removable couplings between one or more of the canister 102, the spout adapter 104, the lid 106 and the cap 108 may include additional or alternative coupling mechanisms, such as clamp elements, tabs, ties, or an interference fitting, among others, without departing from the scope of these disclosures.

Figure 5:
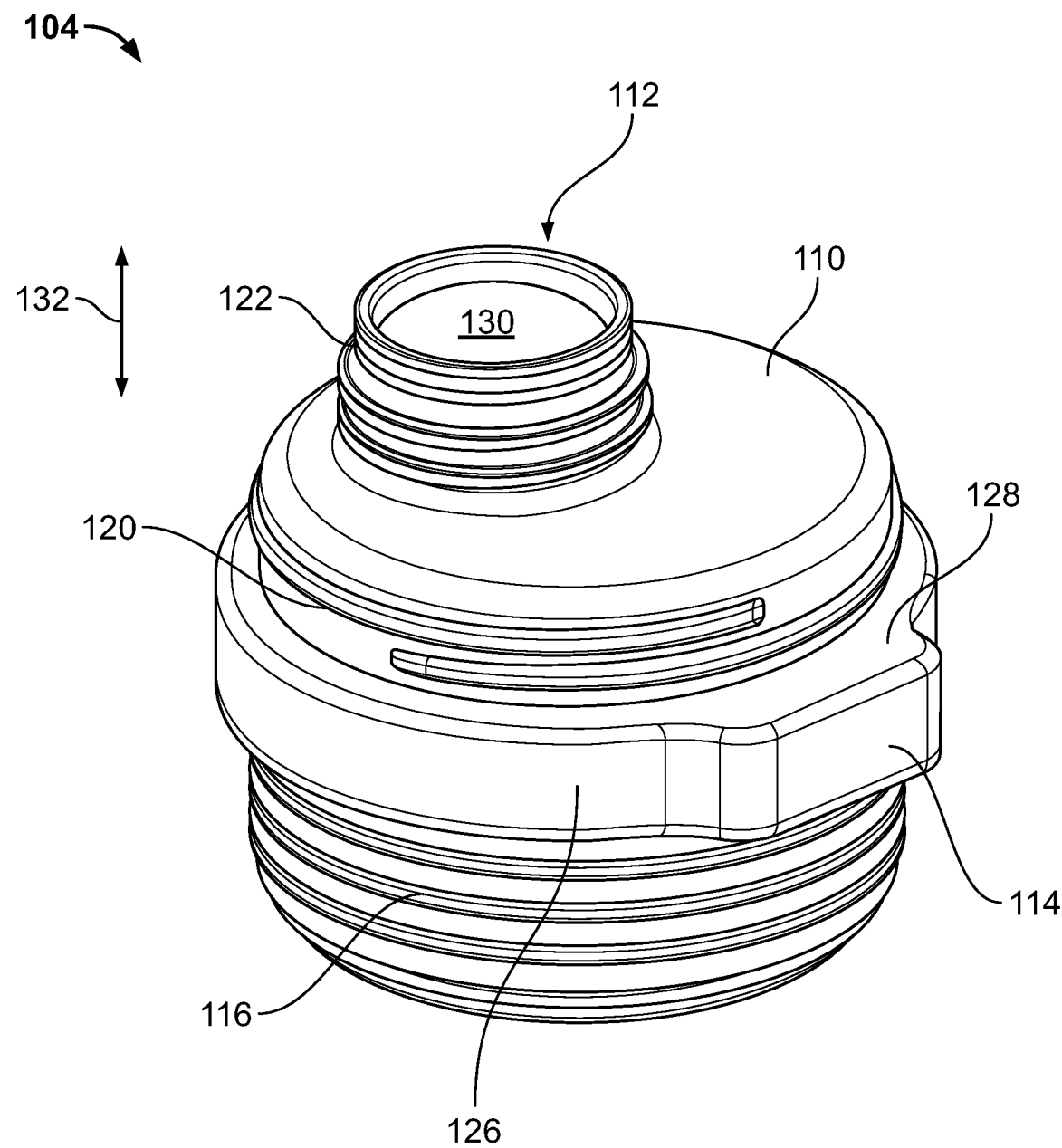
FIG. 5 depicts a more detailed isometric view of a top of a spout adapter, according to one or more aspects described herein.

FIG. 5 depicts a more detailed isometric view of the top of the spout adapter 104, according to one or more aspects described herein. The spout adapter 104 includes the bottom threaded surface 116 separated from the top threaded surface 120 by a grip ring 126. In one implementation, the docking surface 114 is formed from a portion of a handle 128 extending from the grip ring 126. In one implementation, the grip ring 126 is configured to be grasped by a user in order to couple and uncouple the spout adapter 104 from the canister 102 and/or lid 106. Accordingly, in one example, the handle 128 prevents or reduces a user's hand slipping around the grip ring 126 as a user exerts a manual torque on the spout adapter 104 to couple or decouple it from the canister 102 and/or lid 106. It is further contemplated that the grip ring 126 may comprise multiple handle structures in addition to the single handle 128 depicted in FIG. 5, without departing from the scope of these disclosures. Additionally, the grip ring 126 may include one or more tacky or rubberized materials, or a surface texture such as a knurling, configured to prevent or reduce slippage of a user's hand as it rotates the spout adapter 104 relative to the canister 102 and/or the lid 106.

Figure 6:
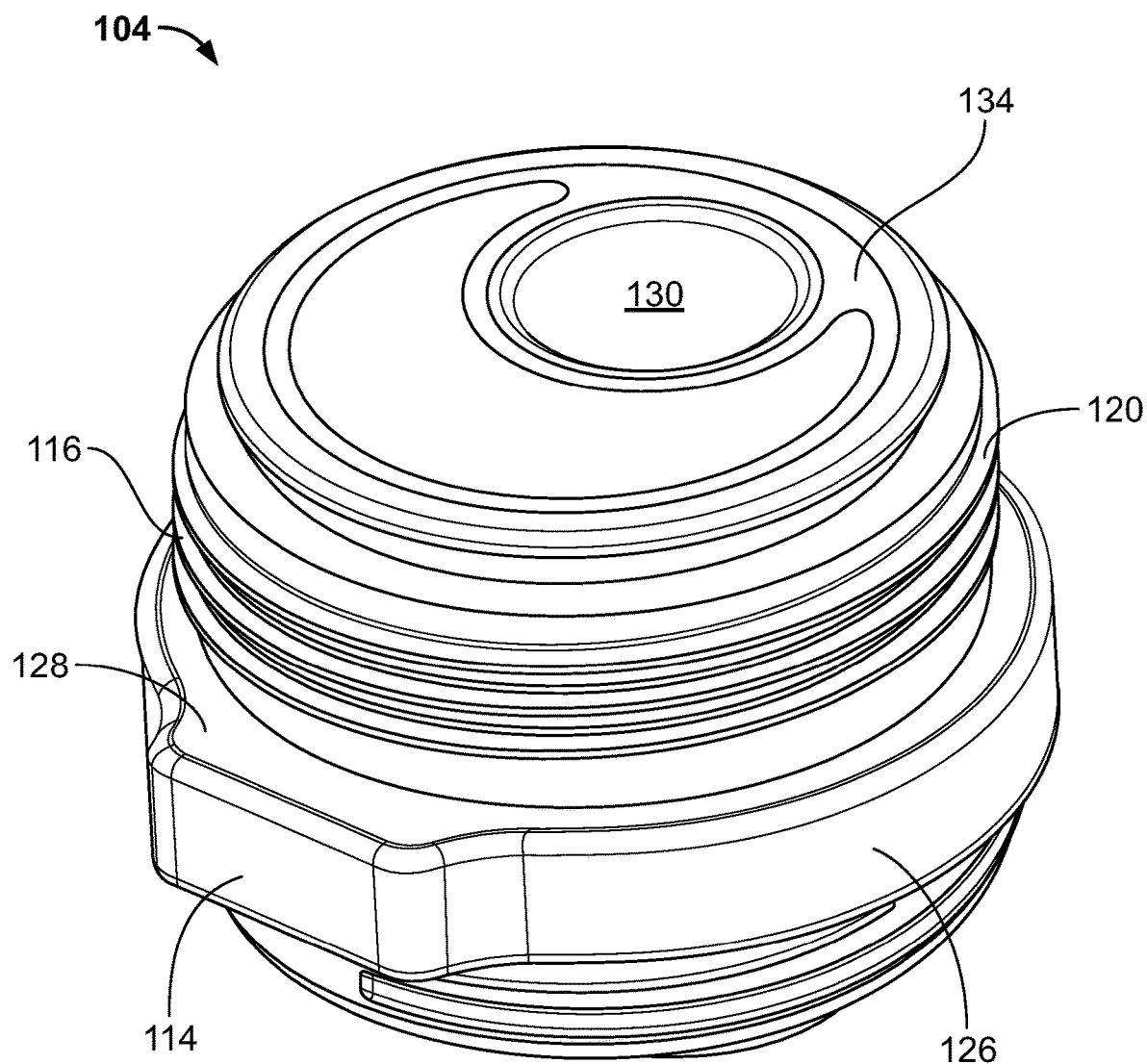
FIG. 6 depicts a more detailed isometric view of a bottom of the spout adapter, according to one or more aspects described herein.
Figure 7:
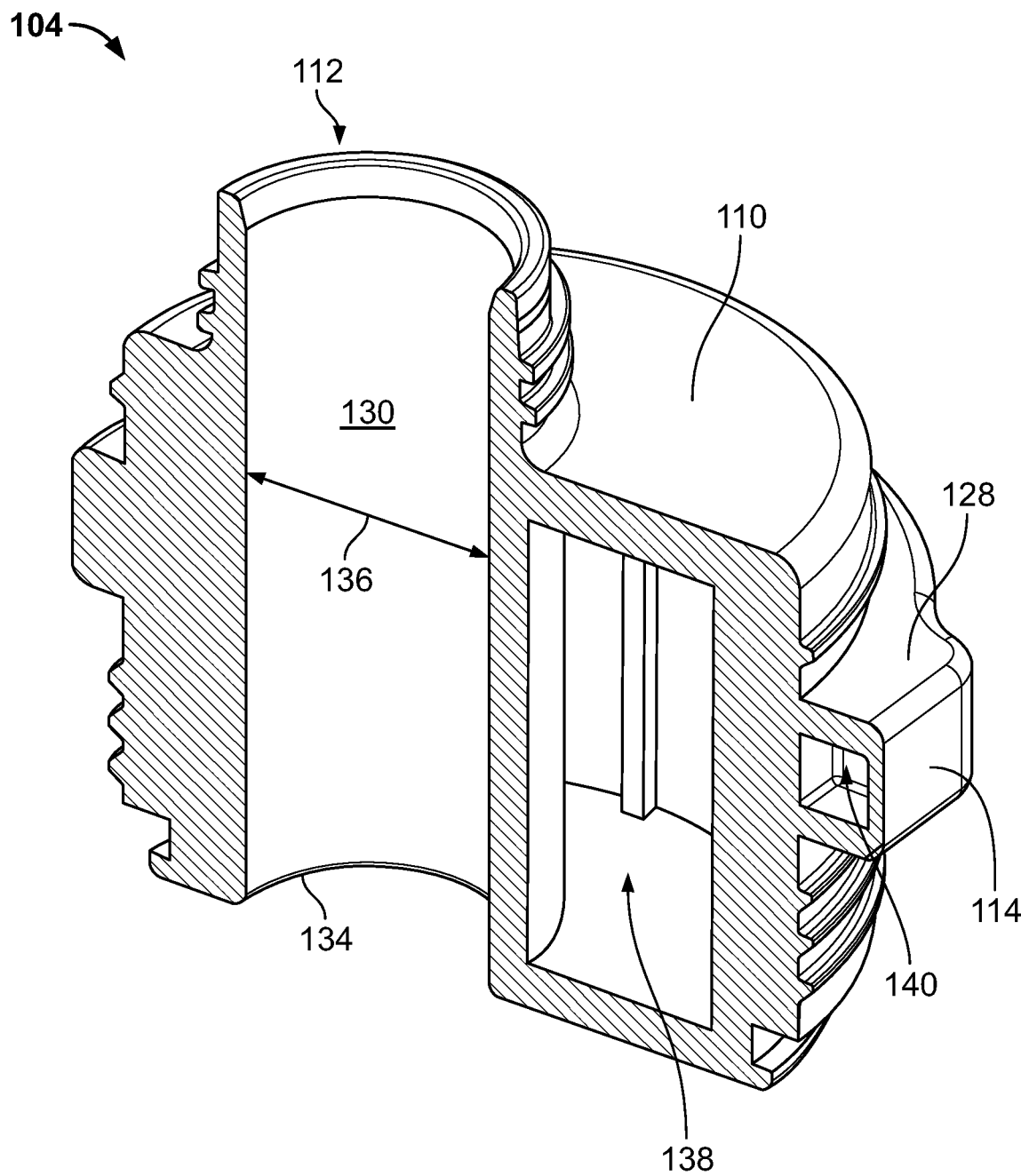
FIG. 7 schematically depicts a cross-sectional isometric view of the spout adapter, according to one or more aspects described herein.

In one example, the spout opening 112 of the spout adapter 104 provides access to a spout channel 130 that extends through a height (approximately parallel to direction 132) of the spout adapter 104 and through to a bottom surface 134 of the spout adapter 104, as depicted in FIG. 6. FIG. 7 schematically depicts a cross-sectional isometric view of the spout adapter 104, according to one or more aspects described herein. As depicted in FIG. 7, the spout channel 130 may extend from the spout opening 112 through to the bottom surface 134. In the depicted implementation, the spout channel 130 may have a diameter 136 approximately uniform through the length of the spout channel 130. However, it is contemplated that the spout channel may have different diameters and sizes through the length of the channel extending between the spout opening 112 and the bottom surface 134.

In one implementation, the spout adapter 104 may include an internal cavity 138 that extends around the spout channel 130. This internal cavity 138 may be sealed by one or more manufacturing processes utilized to construct the spout adapter 104. Accordingly, in one example, the internal cavity 138 may contain a vacuum cavity to reduce heat transfer between the bottom surface 134 and top surface 111, or vice versa. Additionally or alternatively, it is contemplated that the internal cavity 138 may be partially or wholly filled with one or more foam or polymer materials to increase thermal resistance. In yet another example, one or more surfaces of the internal cavity 138 may be coated with a reflective material to reduce heat transfer by radiation.

In one example, a magnet, or magnetic material, may be positioned behind the docking surface 114. Accordingly, in one implementation, the magnet or magnetic material may be positioned within a cavity 140 within the handle 128. It is contemplated that any coupling mechanism may be utilized to position the magnet or magnetic material within the cavity 140, including gluing, an interference fitting, clamping, screwing, or riveting, among others. In another example, the magnet or magnetic material may be overmolded within the handle 128, and such that the cavity 140 represents a volume that the overmolded magnet or magnetic material occupies.

In one example, the spout adapter 104 may be integrally formed. In another example, the spout adapter 104 may be formed from two or more elements that are coupled together by another molding process, welding, gluing, interference fitting, or one or more fasteners (rivets, tabs, screws, among others). In one implementation, the spout adapter 104 may be constructed from one or more polymers. It is contemplated, however, that the spout adapter 104 may, additionally or alternatively, be constructed from one or more metals, alloys, ceramics, or fiber-reinforced materials, among others. The spout adapter 104 may be constructed by one or more injection molding processes. In one specific example, a multi-shot injection molding process (e.g. a two-shot, or a three-shot, among others) may be utilized to construct the spout adapter 104. It is further contemplated that additional or alternative processes may be utilized to construct the spout adapter 104, including rotational molding, blow molding, compression molding, gas assist molding, and/or casting, among others.

Figure 8:
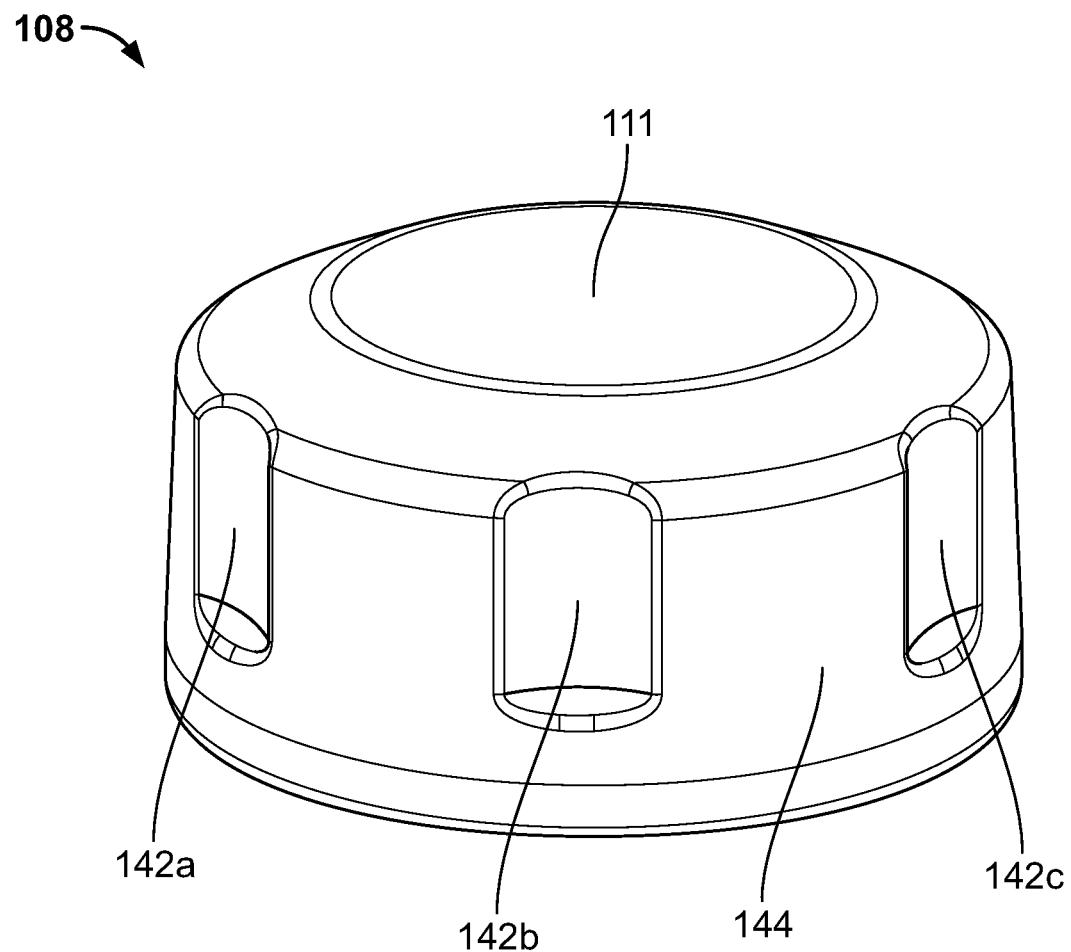
FIG. 8 depicts an isometric view of cap, according to one or more aspects described herein.

FIG. 8 depicts an isometric view of cap 108, according to one or more aspects described herein. As previously described, the cap 108 may include a magnetic top surface 111. Accordingly, the cap 108 may be constructed from one or more polymer materials, and such that the magnetic top surface 111 includes one or more polymers that are overmolded over a magnetic material.

In the depicted example, cap 108 has a substantially cylindrical shape. However, it is contemplated that additional or alternative shapes may be utilized, without departing from the scope of these disclosures. For example, cap 108 may be cuboidal in shape, among others. The cap 108 includes grip depressions 142*a-c*, which are configured to reduce or prevent a user's fingers from slipping upon application of a manual torque to the cap 108 to couple or uncouple the cap 108 to or from the threaded outer spout surface 122 of the spout opening 112. It is contemplated that any number of the grip depressions 142*a-c* may be utilized around a circumference of the cylindrical cap 108, without departing from the scope of these disclosures. Further, the cap 108 may include additional or alternative structural elements configured to increase a user's grip of the cap 108. For example, an outer cylindrical surface 144 of the cap 108 may include a tacky/rubberized material configured to increase a user's grip. Further, the outer cylindrical surface 144 may include a series of corrugations, or a knurling.

Figure 9:
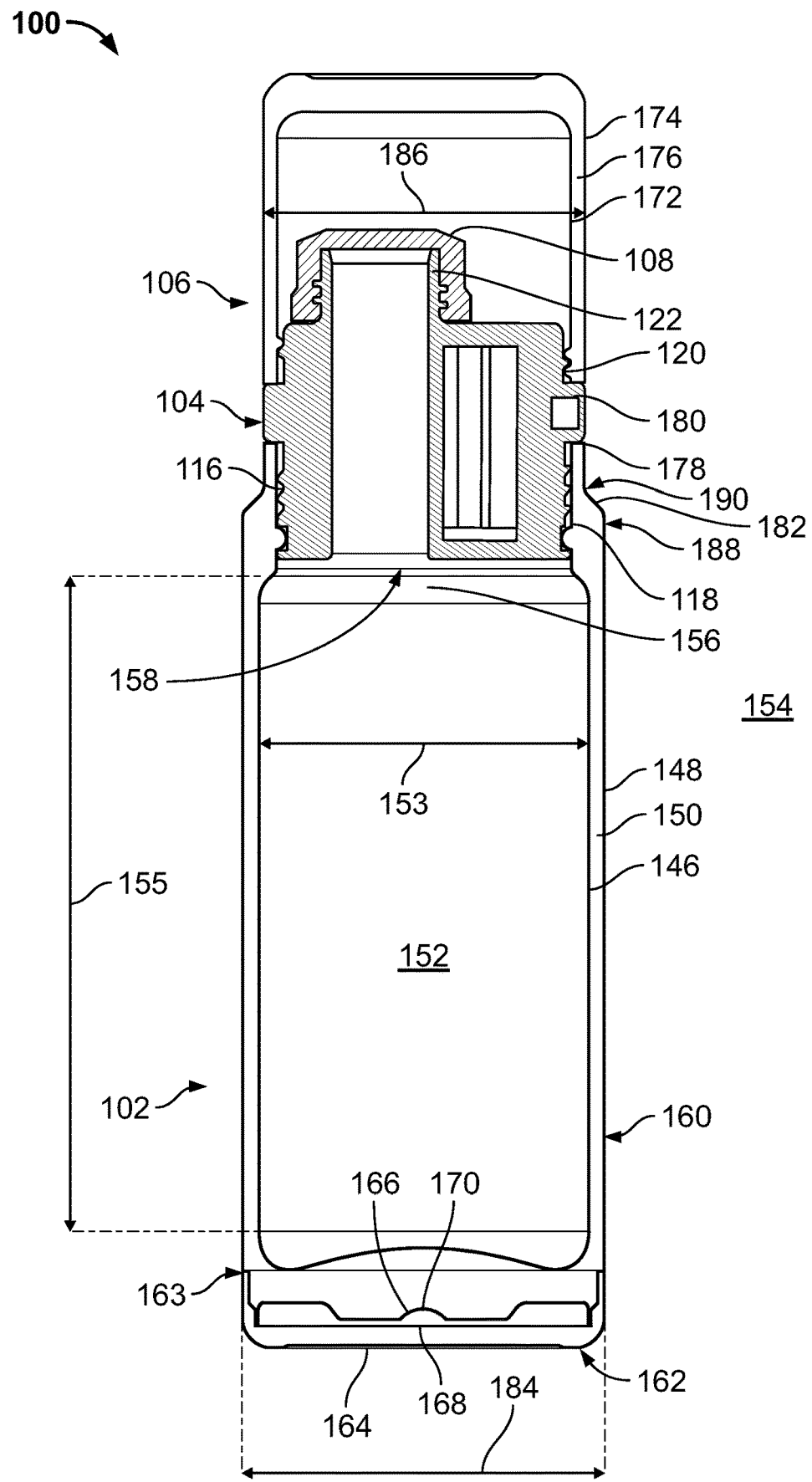
FIG. 9 schematically depicts a cross-sectional view of the insulating container of FIG. 1, according to one or more aspects described herein.

FIG. 9 schematically depicts a cross-sectional view of the insulating container 100 with the cap 108 coupled to the threaded outer spout surface 122, the lid 106 coupled to the top threaded surface 120 of the spout adapter 104, and the bottom threaded surface 116 of the spout adapter 104 coupled to the threaded inner surface 118 of the canister 102.

The canister 102 may include a first inner wall 146 and a second outer wall 148. A sealed vacuum cavity 150 may be formed between the first inner wall 146 and the second outer wall 148. This construction may be utilized to reduce heat transfer through the first inner wall 146 and the second outer wall 148 between a reservoir 152, which is configured to receive a mass of liquid, and an external environment 154. As such, the sealed vacuum cavity 150 between the first inner wall 146 and the second outer wall 148 may be referred to as an insulated double-wall structure. Additionally, the first inner wall 146 may have a first end 156 that defines an opening 158 extending into the internal reservoir 152 for receiving a mass of liquid. The second outer wall 148 may form an outer shell of the canister 102. The second outer wall 148 may be formed of a side wall 160 and a bottom portion 162, which forms a second end 164 to support the canister 102 on a surface. A seam 163 can be formed between the second outer wall 148 and the bottom portion 162. In one example, the bottom portion 162 can be press-fitted onto the second outer wall 148. Additionally the bottom portion 162 can be welded to the second outer wall 148. The weld may also be polished such that the seam does not appear on the bottom of the canister 102.

The bottom portion 162 may include a dimple 166 that is used during a vacuum formation process. As depicted in FIG. 9, the bottom portion 162 may cover the dimple 166 such that the dimple 166 is not visible to the user. The dimple 166 may generally resemble a dome shape. However, other suitable shapes are contemplated for receiving a resin material during the manufacturing process, such as a cone, or frustoconical shape. The dimple 166 may include a circular base 168 converging to an opening 170 extending into the second outer wall 148. As discussed below, the opening 170 may be sealed by a resin (not shown). During the formation of the vacuum between the first inner wall 146 and the second outer wall 148, the resin may seal the opening 170 to provide the sealed vacuum cavity 150 between the first inner wall 146 and the second outer wall 148 in formation of the insulated double-wall structure.

In alternative examples, the dimple 166 may be covered by a correspondingly shaped disc (not shown) such that the dimple 166 is not visible to the user. The circular base 168 may be covered by a disc, which can be formed of the same material as the second outer wall 148 and the first inner wall 146. For example, the first inner wall 146, the second outer wall 148, and the disc may be formed of titanium, stainless steel, aluminum, or other metals or alloys. However, other suitable materials and methods for covering the dimple 166 are contemplated, as discussed herein and as discussed in U.S. Appl. No. 62/237,419, which is incorporated fully by reference as set forth fully herein.

The canister 102 may be constructed from one or more metals, alloys, polymers, ceramics, or fiber-reinforced materials. Additionally, canister 102 may be constructed using one or more hot or cold working processes (e.g. stamping, casting, molding, drilling, grinding, forging, among others). In one implementation, the canister 102 may be constructed using a stainless steel. In specific examples, the canister 102 may be formed substantially of 304 stainless steel or a titanium alloy. Additionally, one or more cold working processes utilized to form the geometry of the canister 102 may result in the canister 102 being magnetic (may be attracted to a magnet).

In one example, the reservoir 152 of the canister 102 may have an internal volume of 532 ml (18 fl. oz.). In another example, the reservoir 152 may have an internal volume ranging between 500 and 550 ml (16.9 and 18.6 fl. oz.) or between 1000 ml and 1900 ml (33.8 fl. oz. and 64.2 fl. oz.). In yet another example, the reservoir 152 may have an internal volume of at least 100 ml (3.4 fl. oz.), at least 150 ml (5.1 fl. oz.), at least 200 ml (6.8 fl. oz.), at least 400 ml (13.5 fl. oz.), at least 500 ml (16.9 fl. oz.), or at least 1000 ml (33.8 fl. oz.). The opening 158 in the canister 102 may have an opening diameter of 64.8 mm. In another implementation, the opening 158 may have an opening diameter at or between 60 and/or 70 mm. The reservoir 152 may have an internal diameter 153 and a height 155 configured to receive a standard-size 355 ml (12 fl. oz.) beverage (aluminum) can (standard 355 ml beverage can with an external diameter of approximately 66 mm and a height of approximately 122.7 mm). Accordingly, the internal diameter 153 may measure at least 66 mm, or between 50 mm and 80 mm. The height 155 may measure at least 122.7 mm, or between 110 mm and 140 mm.

Additional or alternative methods of insulating the container 100 are also contemplated. For example, the cavity 150 between the first inner wall 146 and the outer walls 148 may be filled with various insulating materials that exhibit low thermal conductivity. As such, the cavity 150 may, in certain examples, be filled, or partially filled, with air to form air pockets for insulation, or a mass of material such as a polymer material, or a polymer foam material. In one specific example, the cavity 150 may be filled, or partially filled, with an insulating foam, such as polystyrene. However, additional or alternative insulating materials may be utilized to fill, or partially fill, cavity 150, without departing from the scope of these disclosures.

Moreover, a thickness of the cavity 150 may be embodied with any dimensional value, without departing from the scope of these disclosures. Also, an inner surface of one or more of the first inner wall 146 or the second outer wall 148 of the container 100 may comprise a silvered surface, copper plated, or covered with thin aluminum foil configured to reduce heat transfer by radiation.

In one example, the lid 106 may be formed of one or more metals, alloys, polymers, ceramics, or fiber-reinforced materials, among others. Further, the lid 106 may be formed using one or more injection molding or other manufacturing processes described herein among others. The lid 106 may comprise a solid structure, or may include a double-wall structure similar to the canister 102, having an inner wall 172, an outer wall 174, and a cavity 176 therebetween. It is also contemplated that the lid 106 may be insulated such that the cavity 176 is a vacuum cavity constructed using the techniques described herein.

In one example, the canister 102 includes a shoulder region 182. As such, the canister 102 may have an outer diameter 184 that is greater than an outer diameter 186 of the spout adapter 104. Accordingly, an outer wall 148 of the canister 102 may taper between points 188 and 190 along a shoulder region 182. In one example, the shoulder region 182 may improve heat transfer performance of the canister 102 (reduce a rate of heat transfer). In particular, the shoulder region 182 may comprise insulation having lower thermal conductivity (higher thermal resistance/insulation) than the lid spout adapter 104 that seals the opening 158.

It is contemplated that the spout adapter 104 may include a lower gasket 178 configured to seal the opening 158 of the canister 102 when the spout adapter 104 is removably coupled thereto. Additionally, the spout adapter 180 may include an upper gasket configured to resealably seal the lid 106 against the spout adapter 104, when coupled thereto.

Figure 10A:
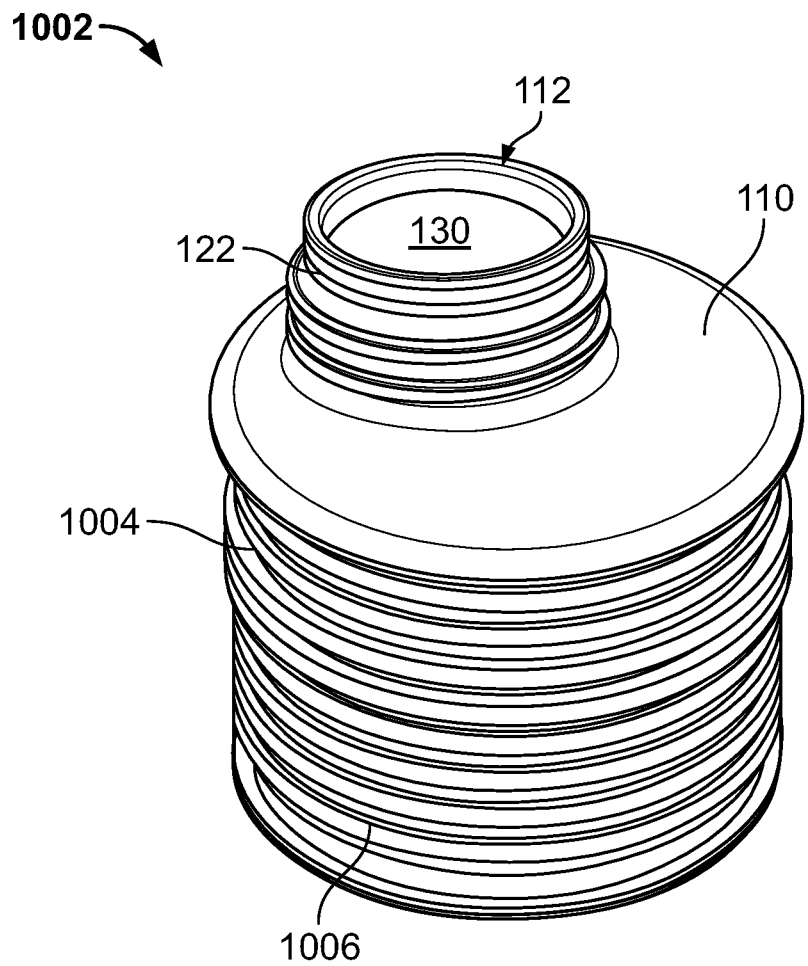
FIGS. 10A-10F depict steps of a molding process of the spout adapter 104, according to one or more aspects described herein.

FIGS. 10A-10F depict steps of a molding process of the spout adapter 104, according to one or more aspects described herein. As previously described, the spout adapter may be constructed from one or more polymers, and molded using a multi-shot injection molding process, among others. Accordingly, in one example, FIG. 10A depicts an intermediate spout adapter structure 1002 of following a first injection molding shot of polymer. The intermediate spout adapter structure 1002 includes a top threaded section 1004 and a bottom threaded section 1006 that will form the top threaded surface 120 and the bottom threaded surface 116, respectively, when the molding processes of the spout adapter 104 are complete. In one implementation, the intermediate spout adapter structure 1002 includes a complete top surface 110 and spout opening 112 having threaded outer spout surface 122 and spout channel 130.

Figure 10B:
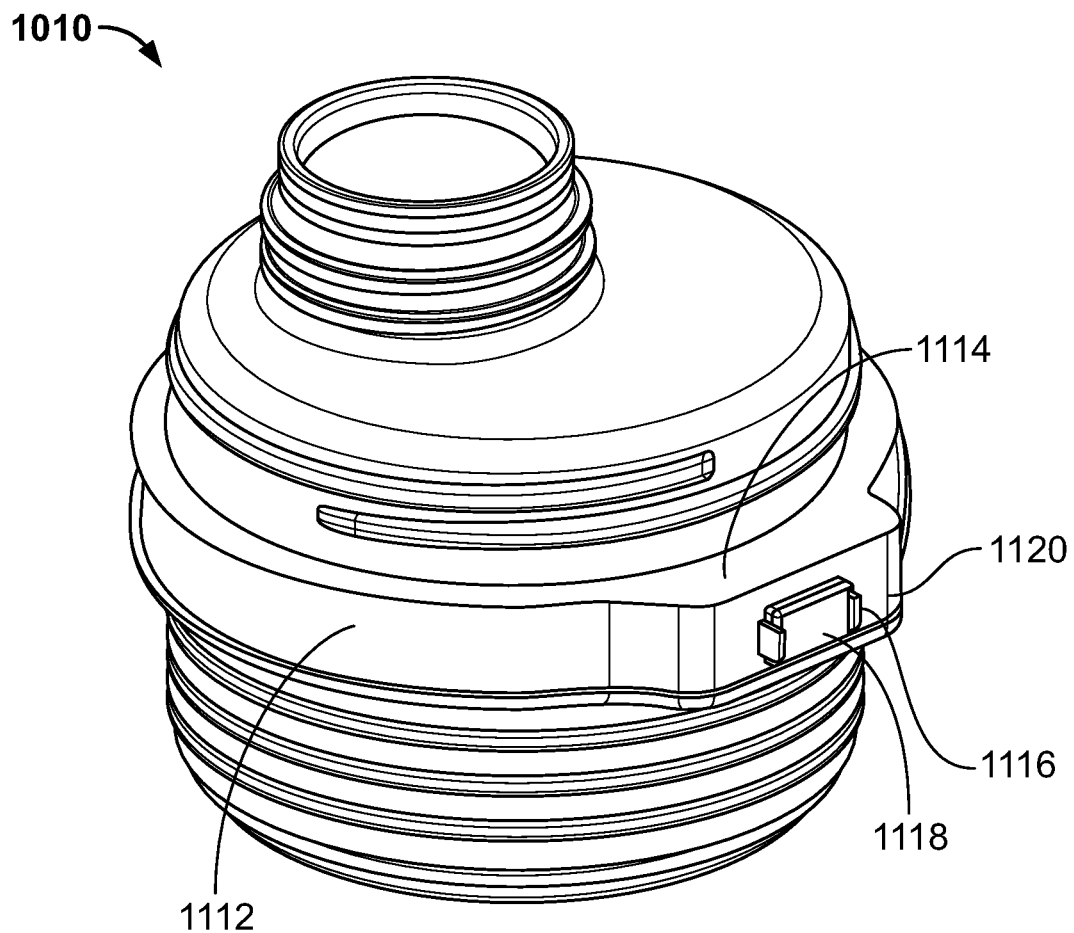

FIG. 10B depicts a second intermediate spout adapter structure 1010 following a second injection molding shot. The second intermediate spout adapter structure 1010 includes a grip ring base structure 1112 that extends around a circumference of the second intermediate spout adapter structure 1010 and forms an underlying structural support surface for an overmolded third shot that forms the grip ring 126, as described with reference to FIG. 10C. Additionally, the second intermediate spout adapter structure 1010 includes a handle base structure 1114, which forms an underlying structural support surface for an overmolded third shot that forms the handle 128. Further, the handle base structure 1114 includes a plate bracket 1116, which, in one implementation, is configured to hold a magnetic plate 1118 in a fixed position on surface 1120 prior to overmolding to form the docking surface 114. Further, the plate bracket 1116 may include clamping elements configured to hold the magnetic plate 1118 in an interference fit prior to overmolding with a third injection molding shot. However, it is contemplated that the plate bracket 1116 may utilize additional or alternative elements for holding the magnetic plate 1118, including gluing, or using one or more fasteners, among others.

Figure 10C:
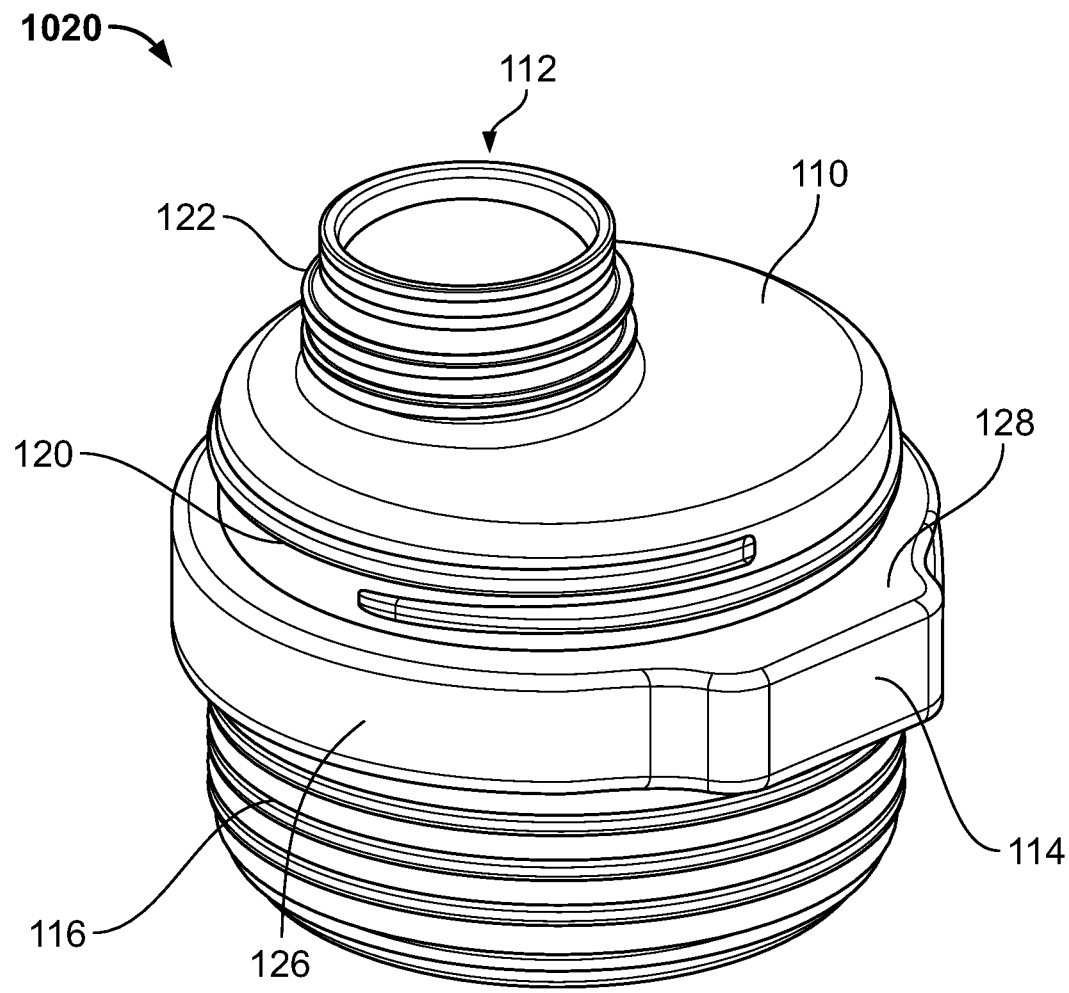

FIG. 10C depicts a third intermediate spout adapter structure 1020 following a third injection molding shot of polymer. In particular, a third injection molding shot of polymer is configured to overmold the grip ring base structure 1112 and handle base structure 1114 to form the grip ring 126 and handle 128 with docking surface 114, as previously described. It is also contemplated, however, that the grip ring base structure 1112 could be formed separately with threads and threaded and glued into place on the spout adapter structure 1010.

Figure 10D:
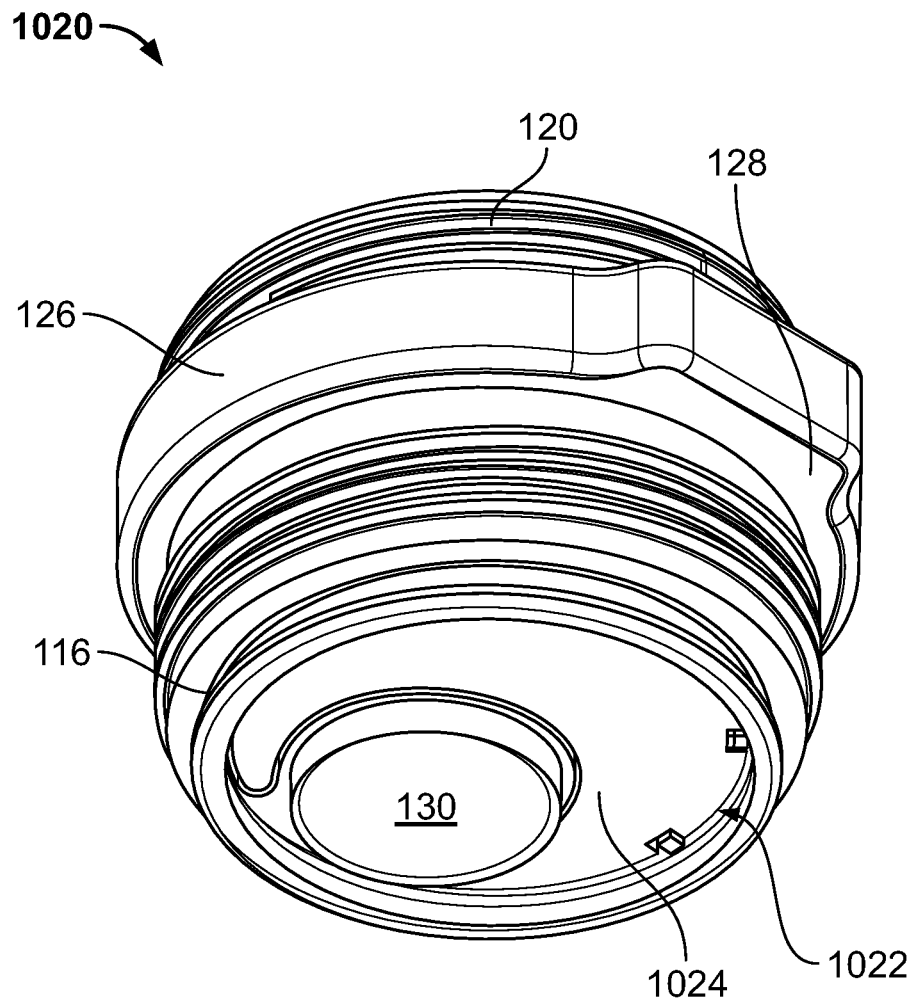

FIG. 10D depicts a bottom view of the third intermediate spout adapter structure 1020 of FIG. 10C. In particular, FIG. 10D depicts an opening 1022 into a cavity (i.e. cavity 138 described in FIG. 7) prior to forming the bottom surface 134 of the spout adapter 104. Accordingly, a foam 1024 may be injected into the cavity, as depicted in FIG. 10D to partially or wholly fill the cavity, and thereby increase thermal resistivity of the spout adapter 104, once complete. It is contemplated that the foam 1024 may comprise any polymer foam material, without departing from the scope of these disclosures.

Figure 10E:
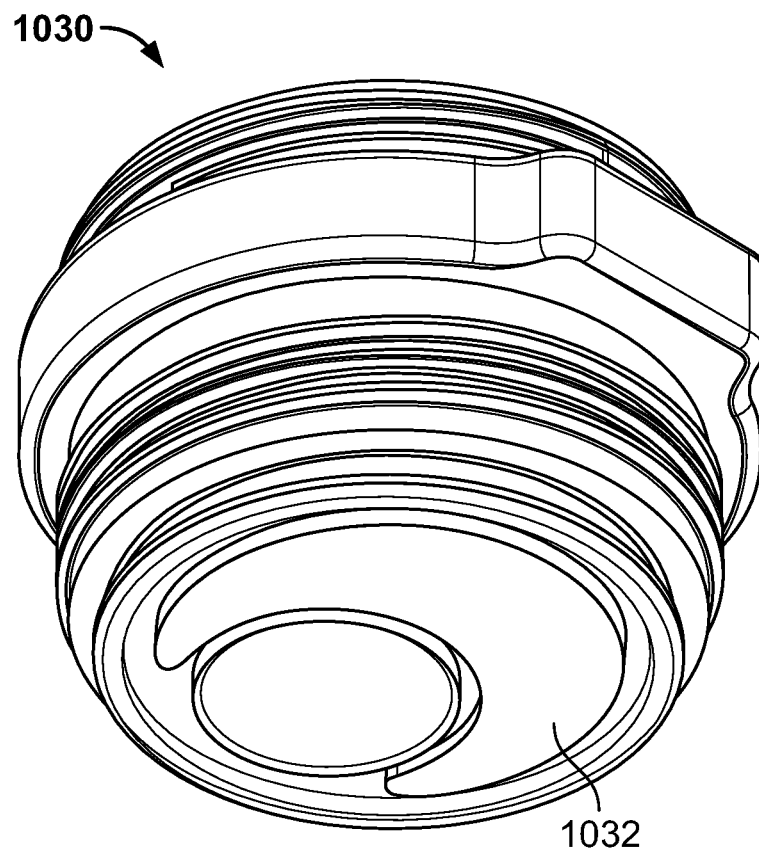

FIG. 10E depicts a fourth intermediate spout adapter structure 1030 having a lower cap 1032 positioned to cover the opening 1022, as previously described in relation to FIG. 10E. In one example, the lower cap 1032 may be formed by a fourth shot of a polymer injection molding process (otherwise referred to as a first shot of a process to mold the bottom surface 134).

Figure 10F:
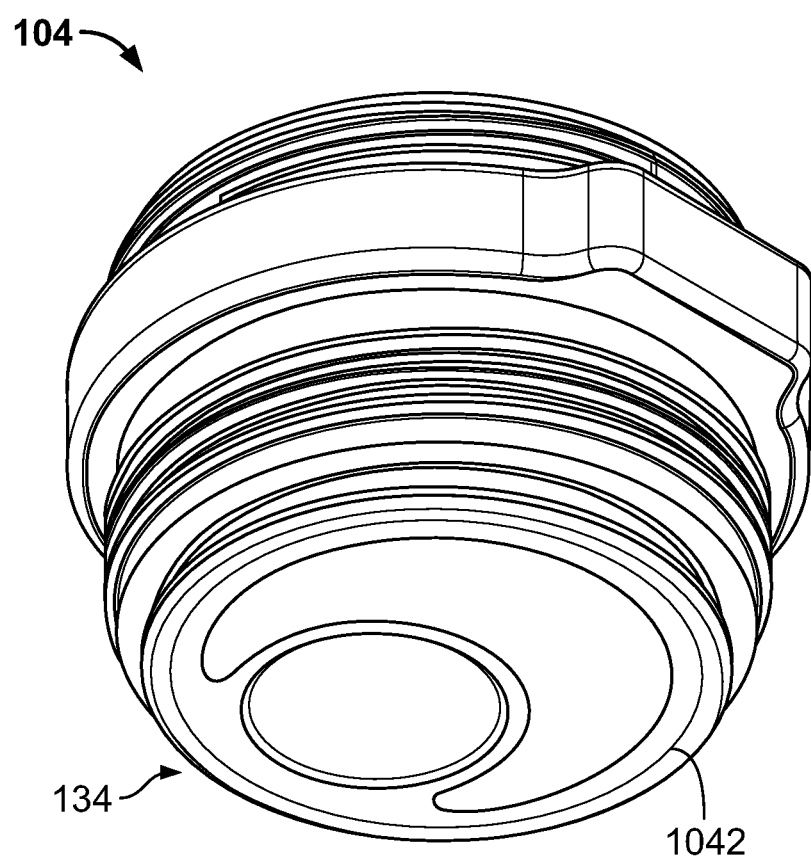

FIG. 10F depicts the complete spout adapter 104 following a fifth shot of an injection molding process (otherwise referred to as a second shot of a process to mold the bottom surface 134). As depicted, a fifth injection molding shot may be utilized to mold a sealing element 1042, which seals the opening 1022, as previously described in relation to FIG. 10E, and forms the bottom surface 134 of the complete spout adapter 104.

Figure 11:
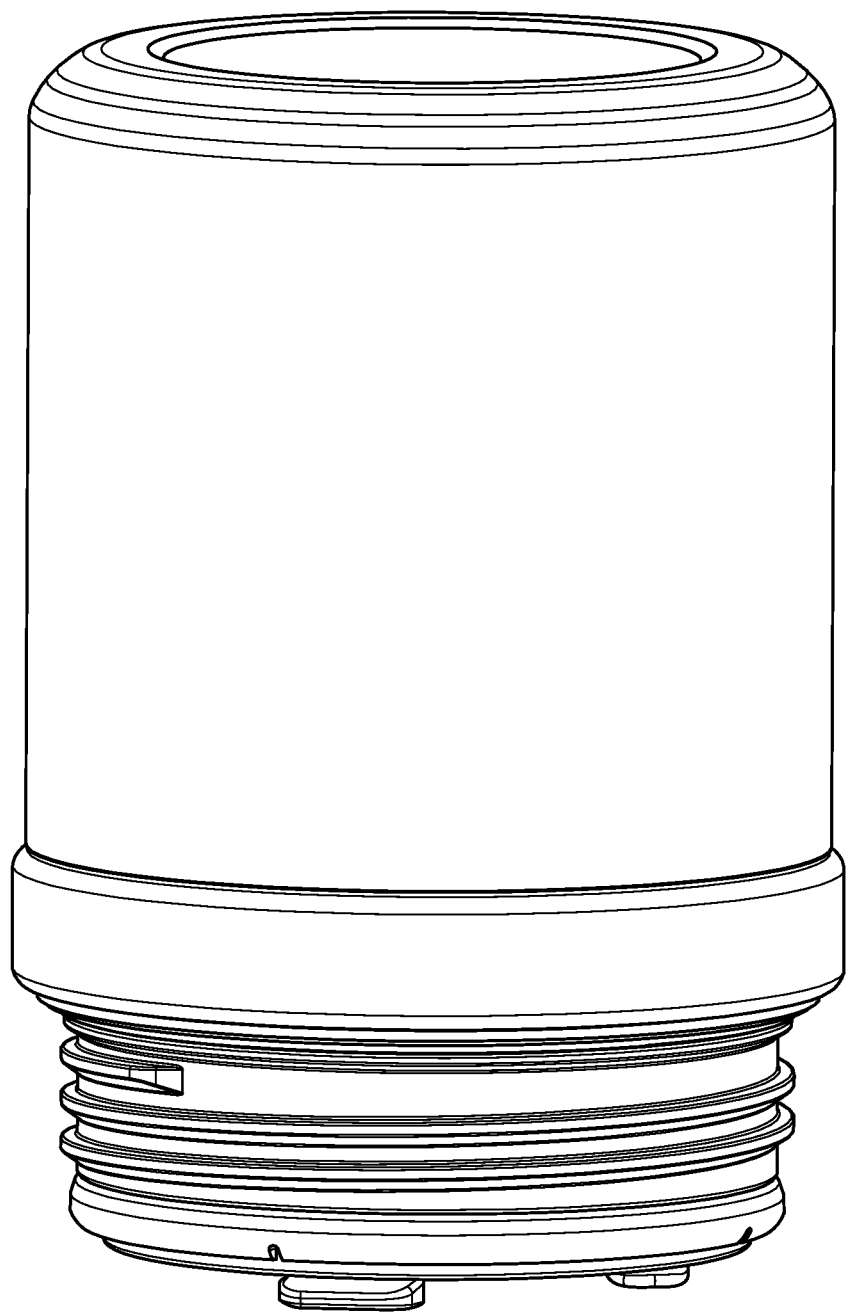
FIG. 11 depicts an isometric view of an opening adapter assembly configured to be removably coupled to an insulating container, according to one or more aspects described herein.
Figure 12:
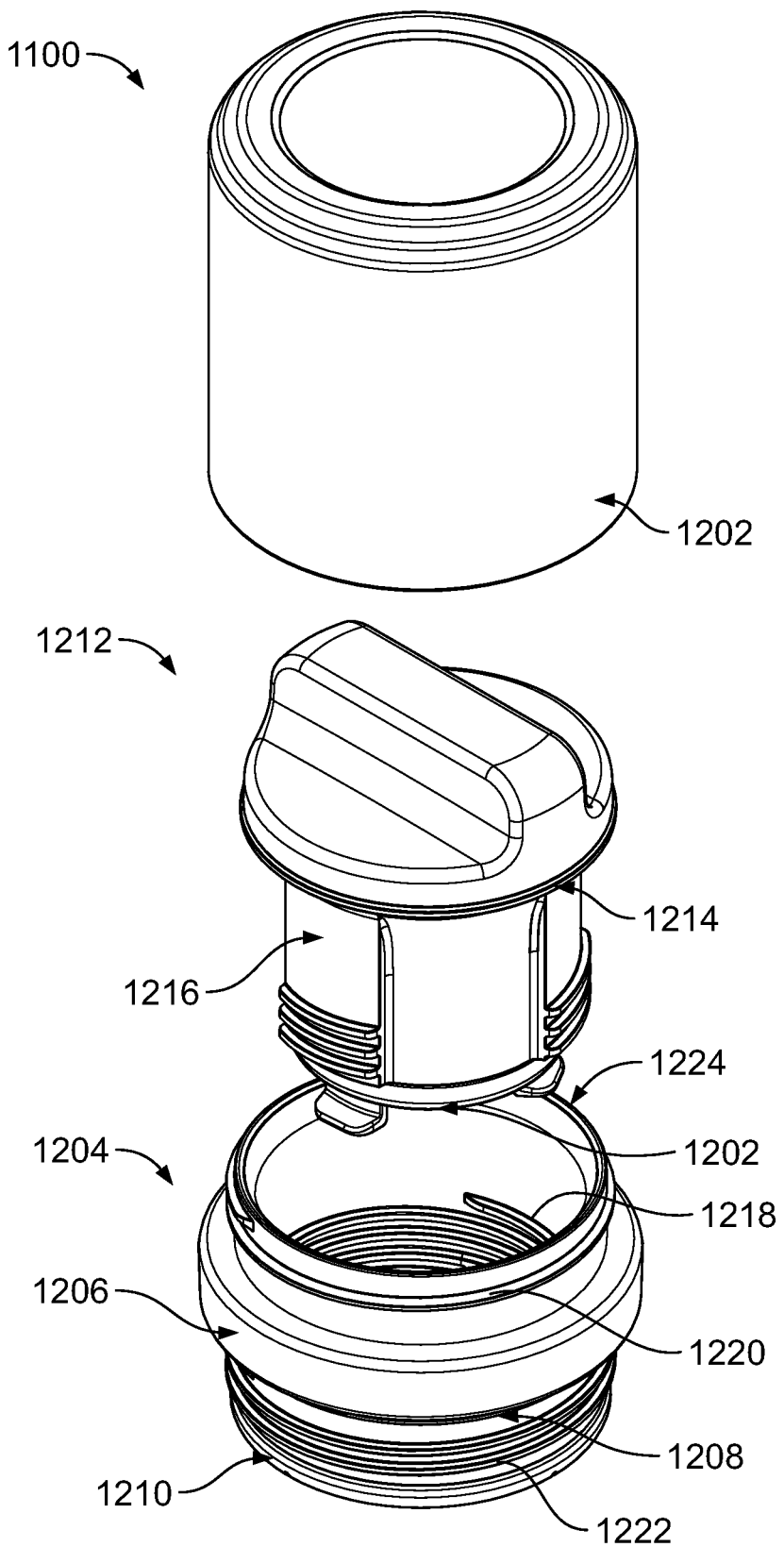
FIG. 12 depicts an exploded isometric view of the opening adapter assembly from FIG. 11, according to one or more aspects described herein.

FIG. 11 depicts an isometric view of an opening adapter assembly 1100 configured to be removably coupled to an insulating container, according to one or more aspects described herein. In one example, the opening adapter assembly 1100 may be configured to be removably coupled to the insulating container canister/bottle 102, as previously described in these disclosures. FIG. 12 depicts an exploded isometric view of the opening adapter assembly 1100 from FIG. 11, according to one or more aspects described herein. In one example, the assembly 1100 includes a lid 1202. This lid 1202 may be similar to lid 106. Further, the lid 1202 may be configured to be removably coupled to an opening adapter 1204. In one example, the opening adapter 1204 may have a substantially cylindrical geometry with an external top threaded surface 1220 that is configured to engage with internal threads of the lid 1202. Additionally, the opening adapter 1204 may include an external bottom threaded surface 1222 that is configured to engage with a threaded inner surface of a canister, such as surface 118 of canister 102. An upper gasket 1208 and a lower gasket 1210 may be configured to seal an opening of the canister 102 when the external bottom threaded surface 1222 is removably coupled thereto. Further, the upper gasket 1208 and the lower gasket 1210 may include any gasket geometry and/or materials, without departing from the scope of these disclosures.

A grip ring 1206 may extend around a circumference of the opening adapter 1204. The grip ring 1206 may be spaced between the external top threaded surface 1220 and the external bottom threaded surface 1222. In one example, the grip ring 1206 may be integrally molded with the cylindrical structure of the opening adapter 1204. In another example, the grip ring 1206 may be formed separately, and rigidly coupled to the cylindrical structure of the opening adapter 1204. For example, the grip ring 1206 may be injection molded as a separate element and subsequently coupled to the opening adapter 1204 by gluing, welding, and/or an interference fitting, among others. In another example, the grip ring 1206 may be overmolded onto the opening adapter 1204.

Figure 13:
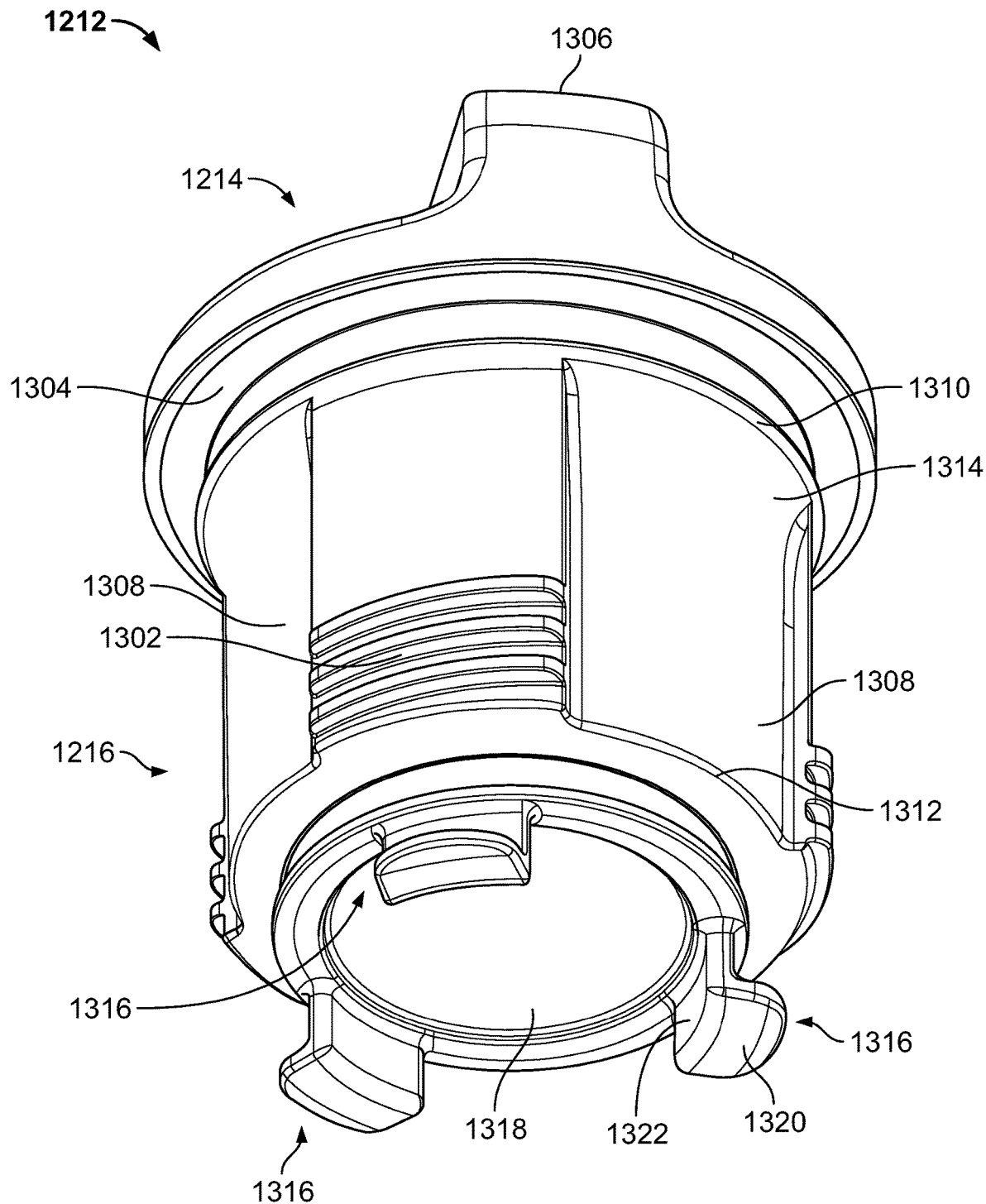
FIG. 13 depicts an isometric view of a plug structure, according to one or more aspects described herein.

The opening adapter 1204 may include a top opening 1224 configured to receive a plug structure 1212. The plug structure 1212 may include a bottom portion 1216 that has a substantially cylindrical sidewall, and a top portion 1214 that is rigidly coupled thereto. In one example, the bottom portion 1216 may be spin welded to the top portion 1214, among others. FIG. 13 depicts another isometric view of the plug structure 1212, according to one or more aspects described herein. In one implementation, the substantially cylindrical sidewall of the bottom portion 1216 of the plug structure 1212 may include a threaded outer surface 1302 that is configured to removably couple to the internal threaded surface 1218 of the opening adapter 1204. In one example, the plug structure 1212 may be configured to resealably seal the top opening 1224 of the opening adapter 1204 when the threaded outer surface 1302 engages with the internal threaded surface 1218 of the opening adapter 1204. Further, the top portion 1214 may be configured to extend, in a radial direction, beyond the sidewall of the bottom portion 1216 to form a sealing surface 1304. This sealing surface 1304 may be configured to abut a top lip of the opening adapter 1204 at the top opening 1224. Accordingly, the sealing surface 1304 may include a gasket, and this gasket may have any geometry (e.g. c-shaped gasket, among others), and may be constructed from any material, without departing from the scope of these disclosures.

The plug structure 1212 may include a handle 1306 that is rigidly coupled to the top portion 1214. The handle 1306 may extend across a diameter of the top portion 1214, and may be configured for manual actuation of the threaded coupling between the plug structure 1212 and the opening adapter 1204, as well as for manual insertion/removal of the plug structure 1212. The plug structure 1212 may also include one or more external channels 1308. In one specific example, the plug structure 1212 may include three external channels 1308 equally spaced apart around a circumference of the outer sidewall of the bottom portion 1216 of the plug structure 1212. It is contemplated, however, that any number of external channels 1308 may be utilized, without departing from the scope of these disclosures. The external channel 1308 may be configured to extend between a channel top edge 1310 and a channel bottom edge 1312. In one implementation, a depth of the external channel 1308 (e.g. depth along a radial direction relative to the substantially cylindrical geometry of the outer sidewall of the bottom portion 1216 of the plug structure 1212) may be uniform along a longitudinal length of the external channel 1308 (e.g. along that direction parallel to a longitudinal axis of the cylindrical geometry of the bottom portion 1216 of the plug structure 1212). In another implementation, a depth of the external channel 1308 may be non-uniform, and may transition from a first depth to a second depth, less than the first depth, along a channel transition region 1314. In certain examples, the external channel 1308 may be configured to provide a partial or full gas pressure relief/equilibration between an external environment and an internal compartment of the canister 102 that the opening adapter 1204 is removably coupled to.

In one example, the plug structure 1212 may include an internal cavity that is partially or wholly filled with an insulating material, such as a foam (e.g. expanded polystyrene, among others), and/or may include a vacuum cavity, configured to reduce heat transfer therethrough.

The plug structure 1212 may additionally include retention tabs 1316. As depicted, the plug structure 1212 may include three retention tabs 1316 equally spaced around a circumference of a base 1318 of the plug structure 1212. However, it is contemplated that any number of retention tabs 1316 may be utilized, without departing from the scope of these disclosures. In one example, the retention tabs 1360 may include flexures (e.g. one or more of longitudinal surface 1322 and/or radial surface 1320 may be configured to deform) configured to flex between a compressed configuration and an expanded configuration. As depicted in FIG. 13, the retention tabs 1316 are in the expanded configuration.

Figure 14:
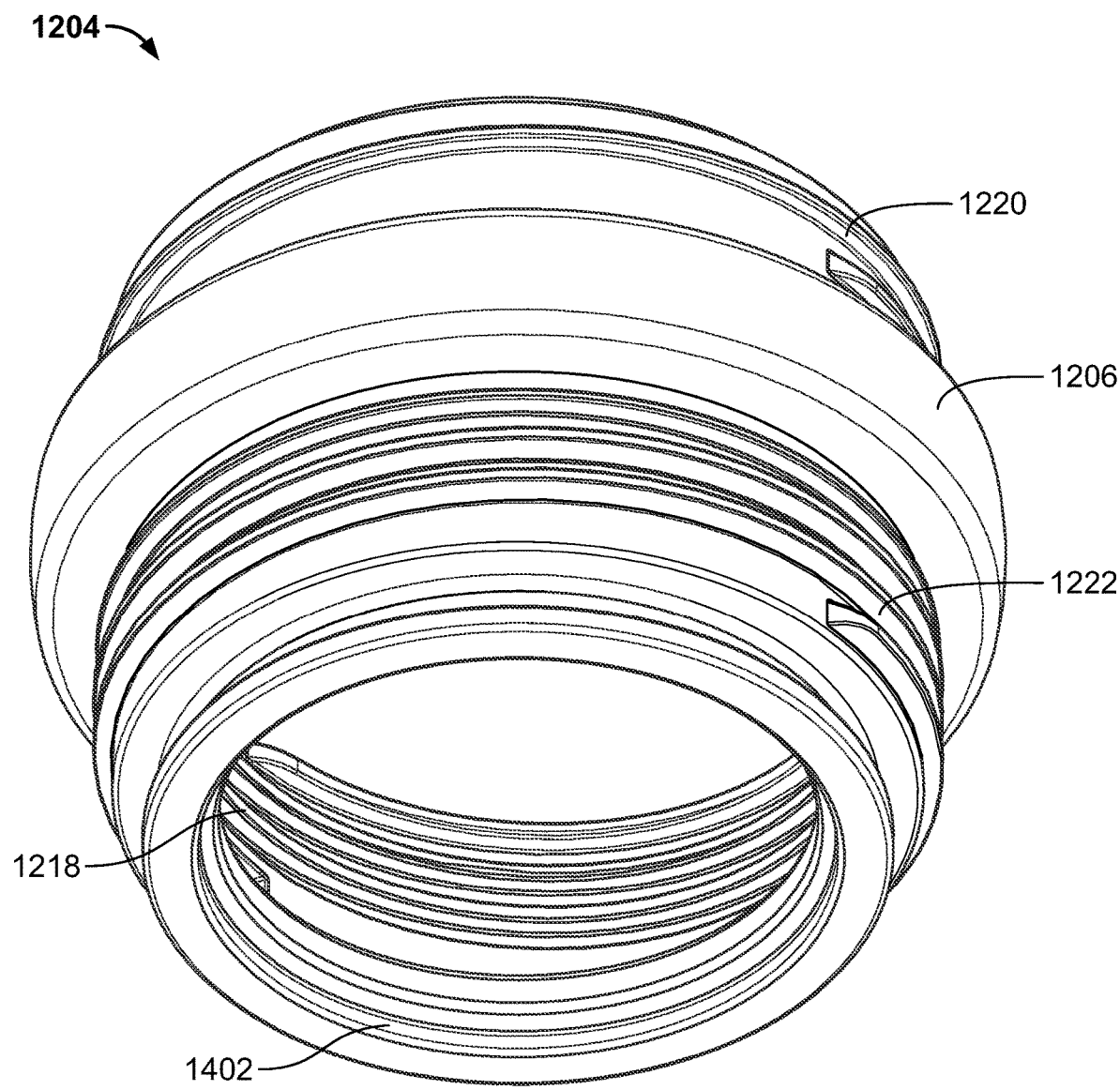
FIG. 14 depicts a bottom view of an opening adapter, according to one or more aspects described herein.

In one example, the retention tabs 1316 may be configured to limit the extent to which the plug structure 1212 may be removed from the opening adapter 1204 when the threaded outer surface 1302 is uncoupled from the internal threaded surface 1218 of the opening adapter 1204. In particular, when in the expanded configuration, the retention tabs 1316 may be configured to abut a retention surface of the opening adapter 1204. As such, FIG. 14 depicts a bottom view of the opening adapter 1204, according to one or more aspects described herein. In one implementation, the retention tabs 1316 may be configured to abut the retention ridge surface 1402 of the opening adapter 1204 when in the expanded configuration.

Figure 15A:
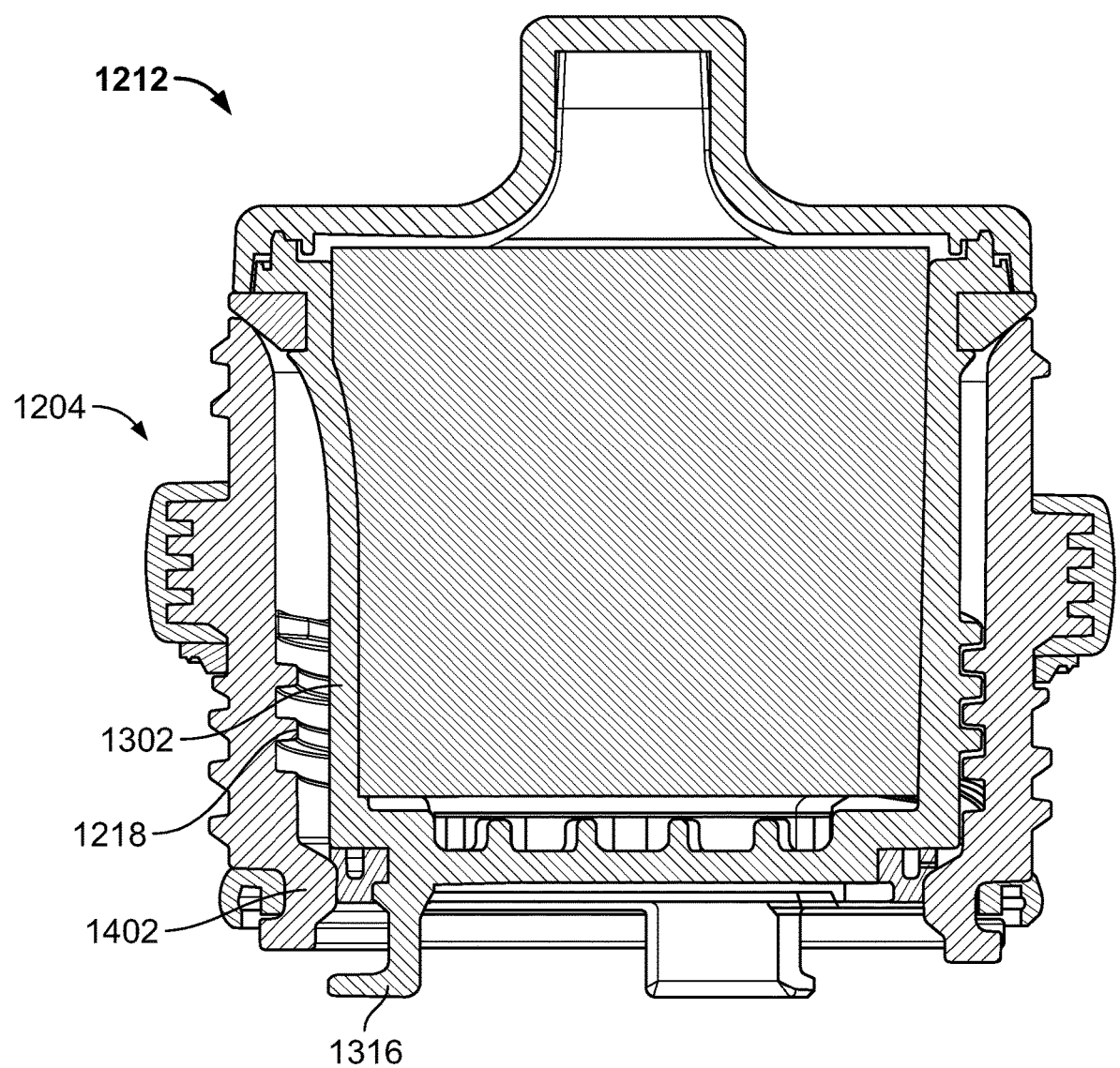
FIG. 15A schematically depicts a cross-sectional view of a plug structure fully engaged with an opening adapter, according to one or more aspects described herein.
Figure 15B:
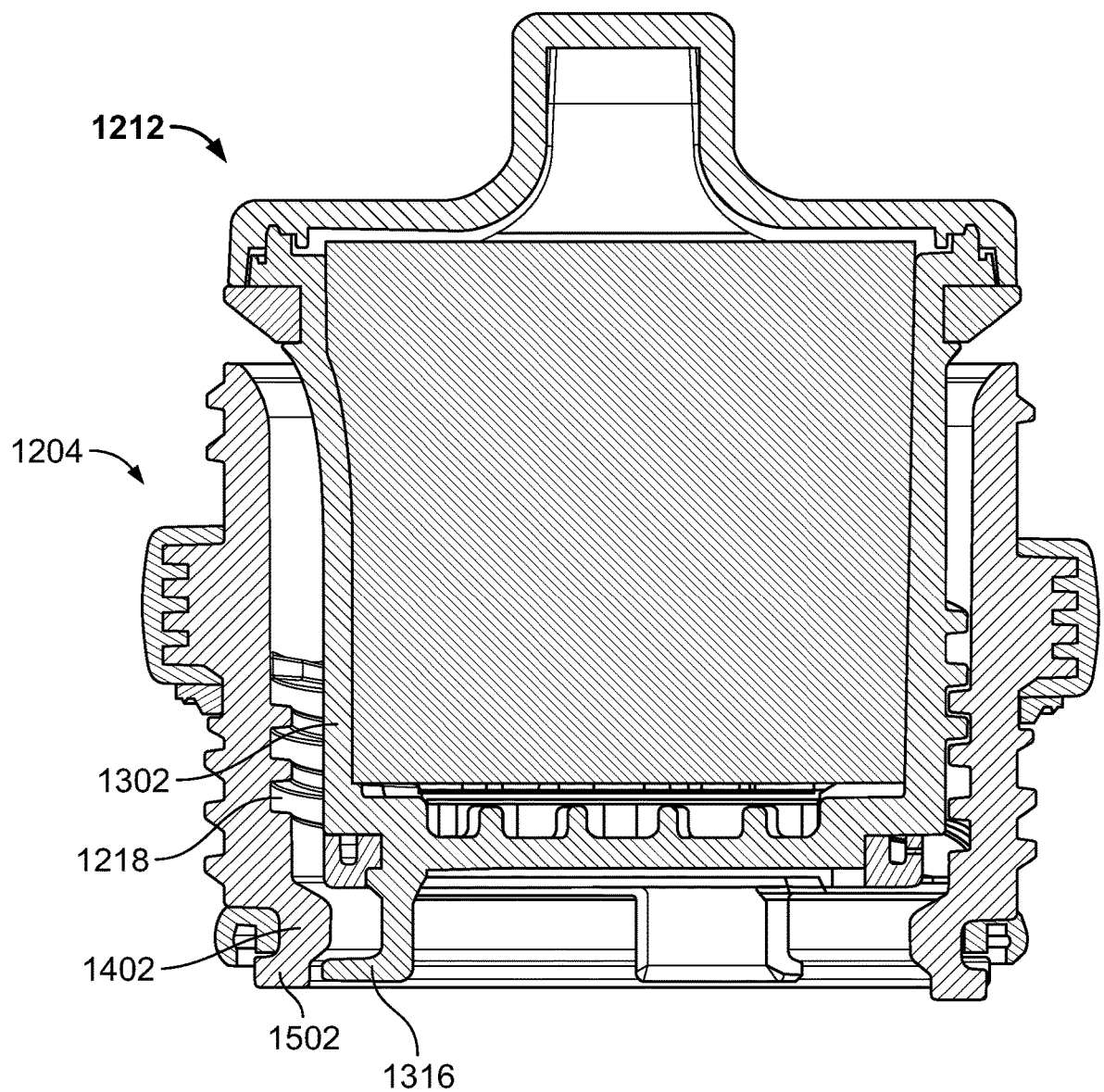
FIG. 15B schematically depicts another cross-sectional view of the plug structure in a partially uncoupled configuration relative to the opening adapter, according to one or more aspects described herein.

FIG. 15A schematically depicts a cross-sectional view of the plug structure 1212 when fully engaged with the opening adapter 1204. In particular, FIG. 15A schematically depicts the threaded outer surface 1302 of the plug structure 1212 coupled to the internal threaded surface 1218 of the opening adapter 1204. Further, when in this depicted fully engaged configuration, the retention tab 1316 may be spaced apart from the retention ridge surface 1402 of the opening adapter 1204. FIG. 15B schematically depicts another cross-sectional view of the plug structure 1212 in a partially uncoupled configuration relative to the opening adapter 1204. Accordingly, as depicted in FIG. 15B, the threaded outer surface 1302 of the plug structure 1212 may be uncoupled from the internal threaded surface 1218 of the opening adapter 1204. However, the plug structure 1212 may be prevented from being fully removed from the opening adapter 1204 as a result of the retention tab 1316 abutting the retention ridge surface 1402 of the opening adapter 1204. Advantageously, this partial uncoupling may allow for the top opening 1224 to be unsealed, and the contents of, in one example, the canister 102 to be poured therefrom, without the plug structure 1212 being fully removed from the opening adapter 1204. Further advantageously, this functionality may allow for single-handed actuation of the threaded coupling between the opening adapter 1204 and the plug structure 1212, as well as pouring of the contents of the canister 102, without requiring the plug structure 1212 to be fully removed and held in a user's other hand, or set aside on an external surface.

In order to fully remove the plug structure 1212 from the opening adapter 1204, a manual decoupling force may be applied to urge the retention tabs 1316 to transition from the expanded configuration depicted in FIG. 15B, to a compressed configuration that allows the retention tabs 1316 to move past the retention ridge surface 1402. In one example, this manual decoupling force may be applied in a direction parallel to a longitudinal axis of the cylindrical structure of the bottom portion 1216. It is contemplated that any decoupling force may be utilized, based on the specific geometries and materials, among others, of the retention tabs 1316, without departing from the scope of these disclosures. Additionally or alternatively, the retention tabs 1360 may be configured to abut one or more additional or alternative surfaces of the opening adapter 1204 when in the expanded configuration, such as base surface 1502, without departing from the scope of these disclosures.

Figure 16:
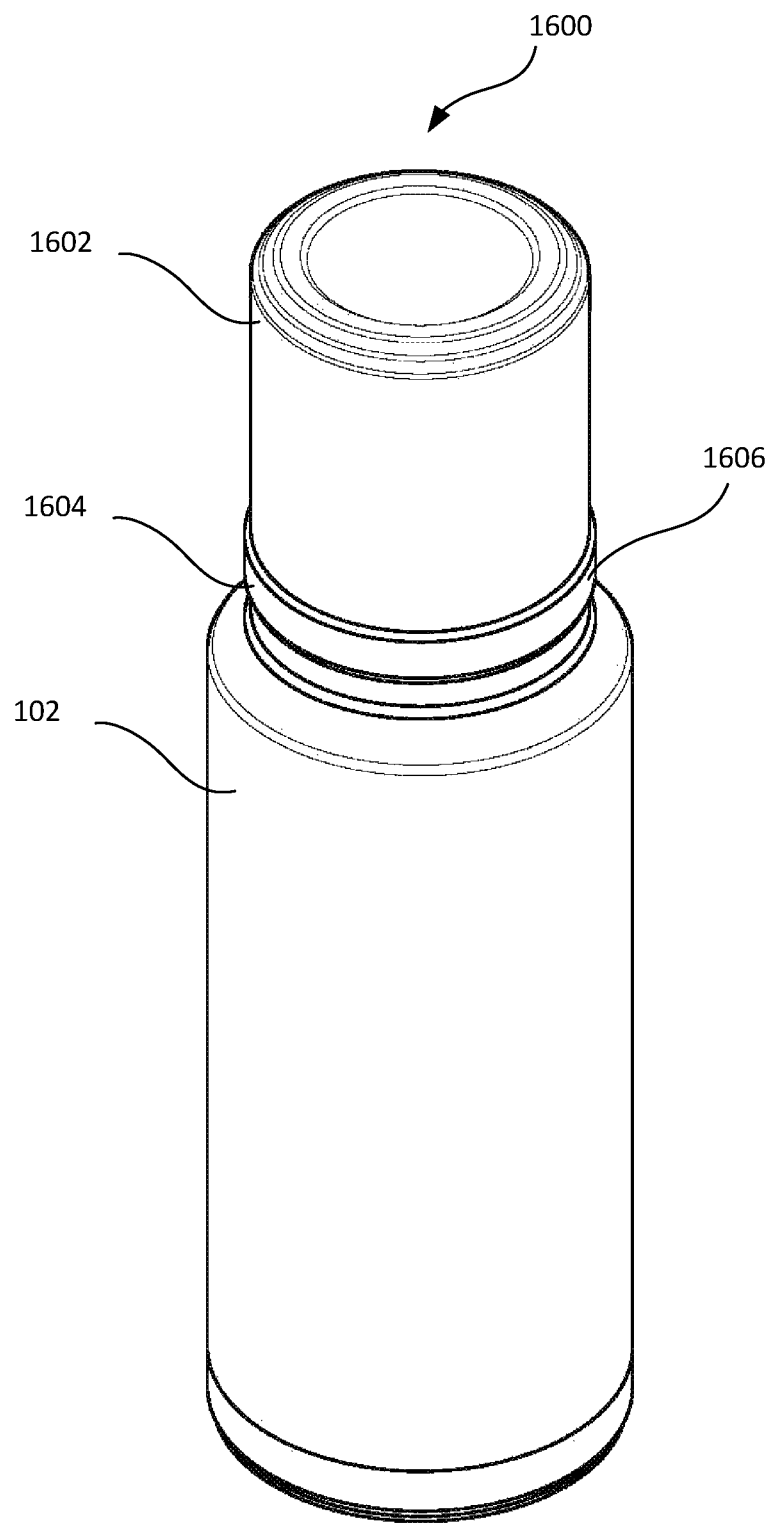
FIG. 16 depicts a top front isometric view of an alternate opening adapter assembly on an insulating container, according to one or more aspects described herein.
Figure 17A:
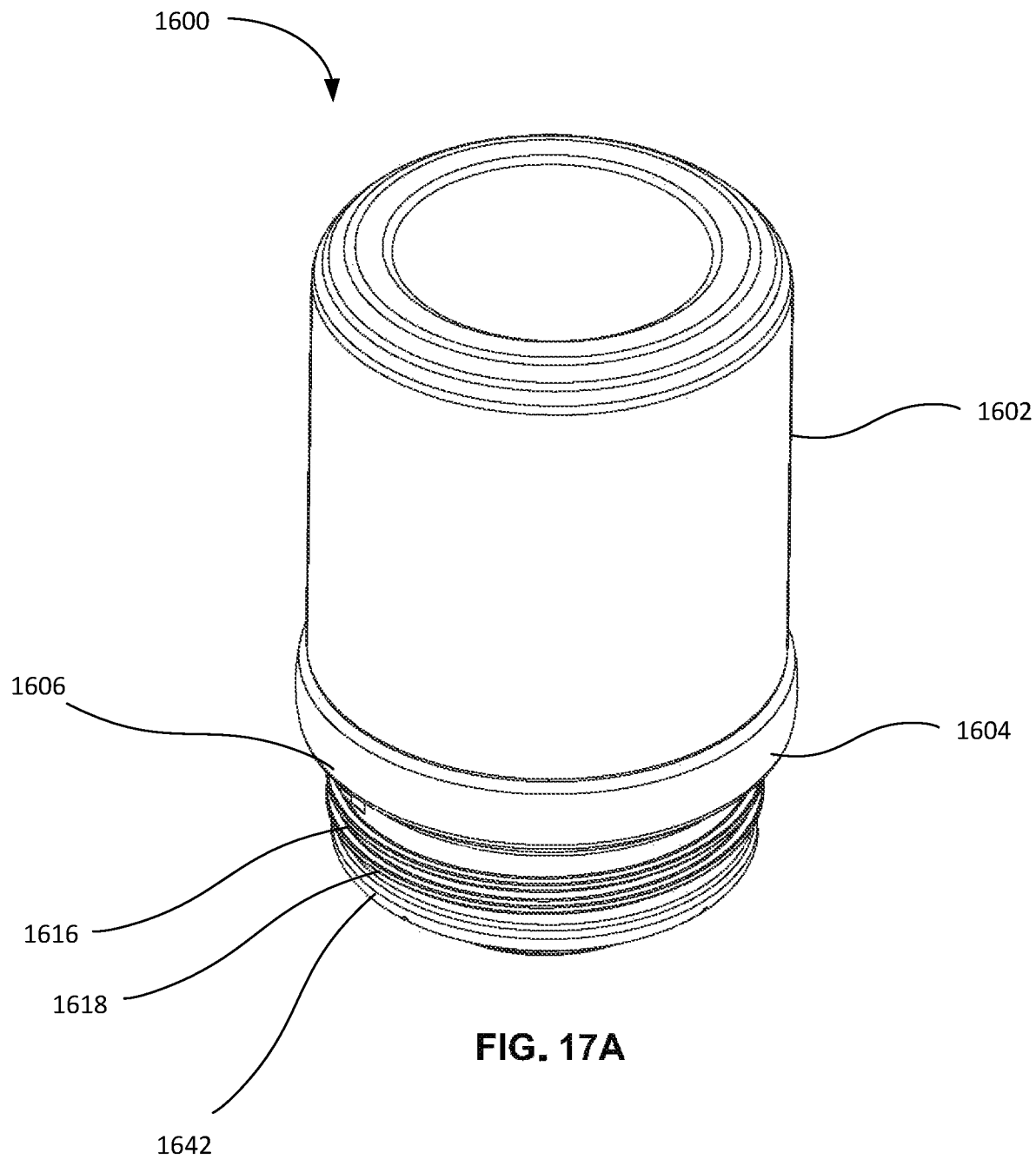
FIG. 17A depicts a top front isometric view of the alternate opening adapter assembly of FIG. 16.
Figure 17B:
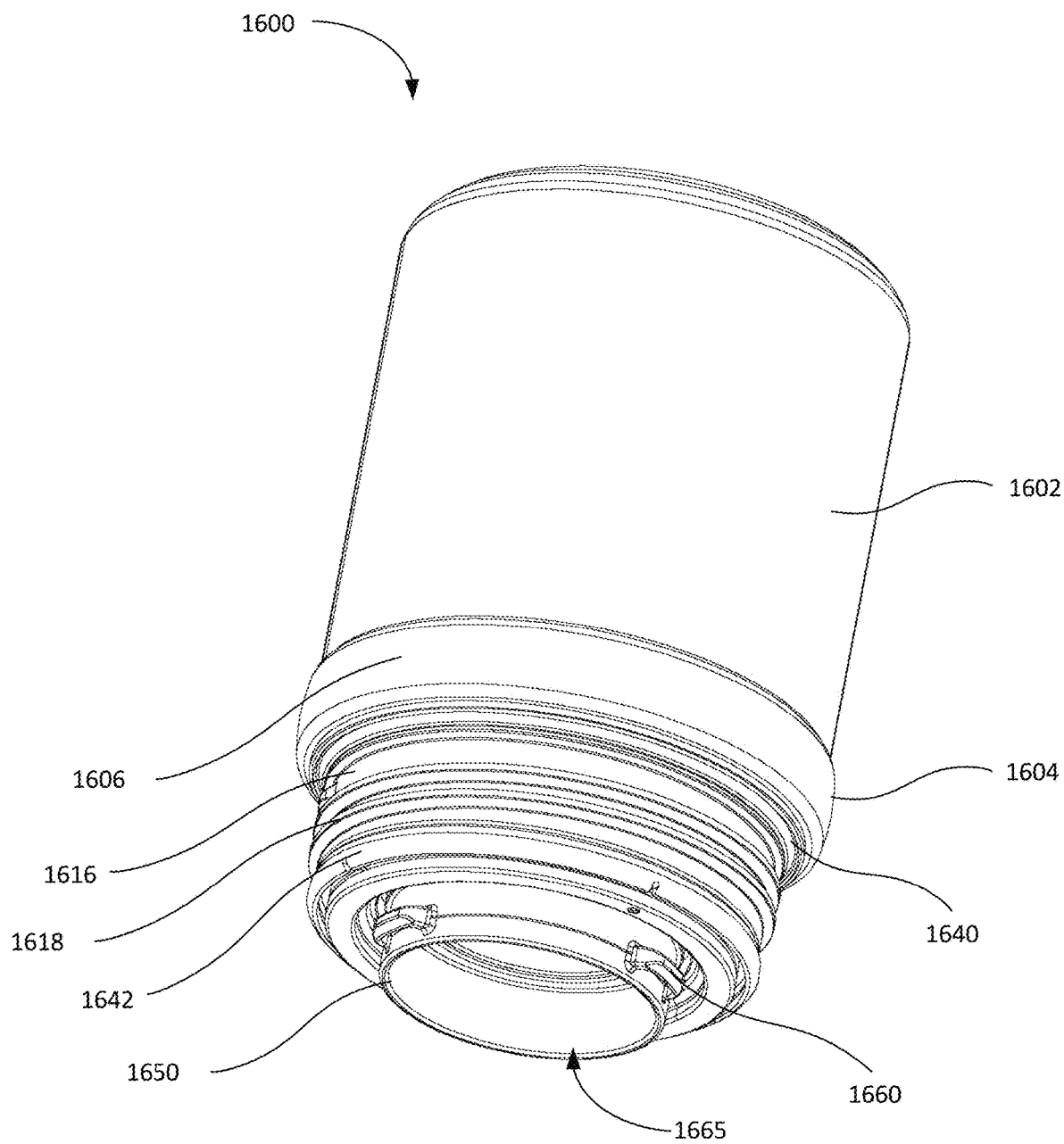
FIG. 17B depicts a bottom front isometric view of the alternate opening adapter assembly of FIG. 16.

FIGS. 16-22C illustrate exemplary embodiment of pour spout/opening adapter assembly 1600 for a beverage container, which is somewhat similar in structure to the opening adapter assembly 1100 described above. FIG. 16 depicts the opening adapter assembly 1600 removably coupled to the insulating container canister/bottle 102, as previously described in these disclosures. FIGS. 17A and 17B depict isometric views of the opening adapter assembly 1600 uncoupled from the canister/bottle 102. The opening adapter assembly 1600 may include a lid 1602, which may be configured to function as a cup into which, for example, a portion of the liquid stored in the canister 102 can be poured, similar to the lid 106 and lid 1202 described above. The lid 1602 may also be configured to be removably coupled to an opening adapter 1604, and a plug structure 1650 may be removably coupled to the opening adapter 1604.

Figure 18:
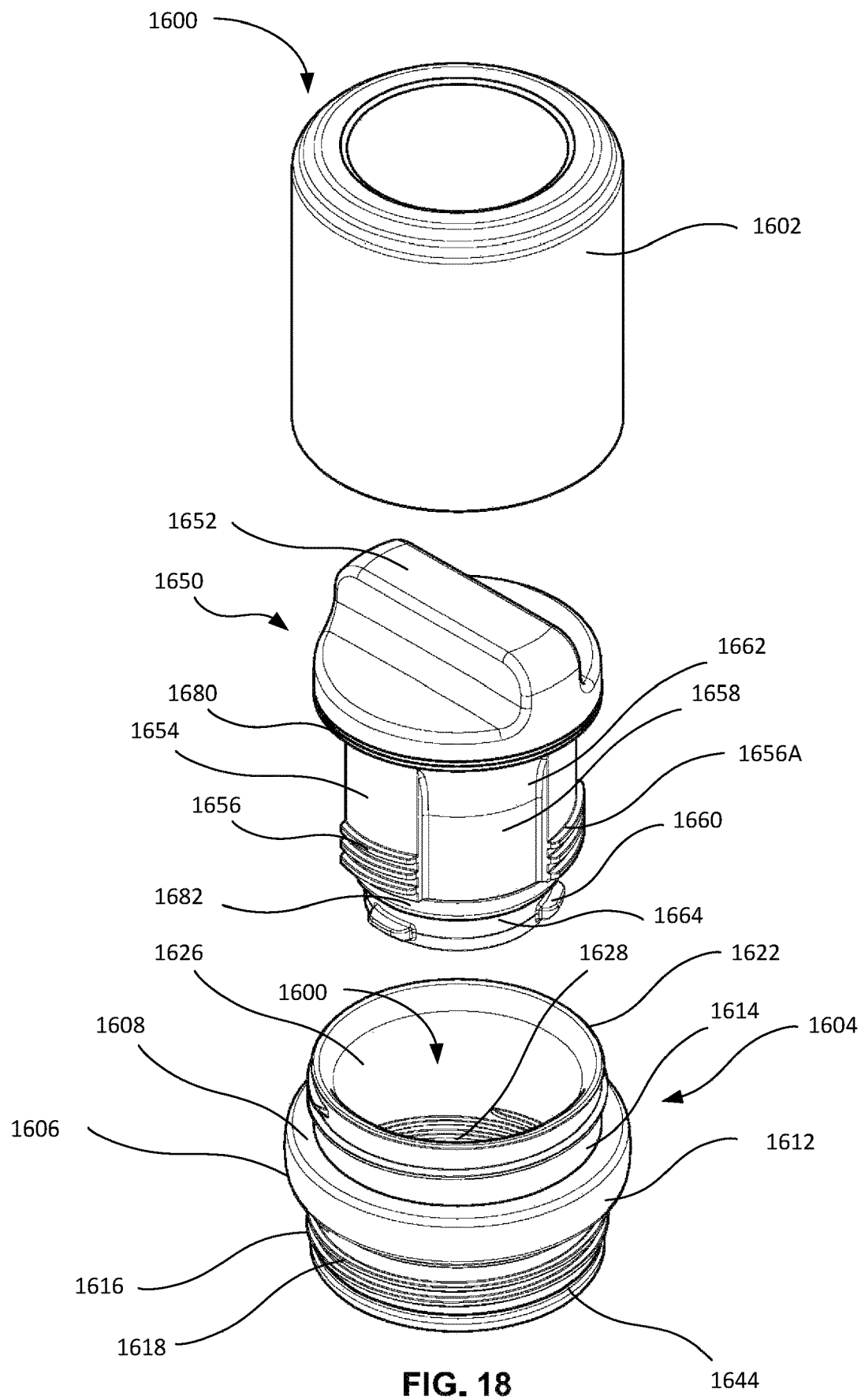
FIG. 18 depicts an exploded top front isometric view of the alternate opening adapter assembly of FIG. 16.

FIG. 18 depicts an exploded isometric view of the pour spout/opening adapter assembly 1600, according to one or more aspects described herein. The opening adapter assembly 1600 may comprise a lid 1602, a pour spout/opening adapter 1604, and a plug structure 1650. The opening adapter 1604 may comprise a grip ring 1606 having an upper surface 1608, a lower surface 1610 surface opposite the upper surface 1608, and a side surface 1612 extending from the upper surface 1608 to the lower surface 1610. Further, the grip ring 1606 may be similar to and have the characteristics of grip ring 1206 described above. Additionally, an upper cylindrical member 1614 may extend from the upper surface 1608, where the upper cylindrical member 1614 includes an upper external threaded portion to engage the lid 1602. The opening adapter 1604 further comprises a lower cylindrical member 1616 extending from the lower surface 1610, where the lower cylindrical member 1616 includes a lower externally threaded portion 1618 configured to engage threaded inner surface of a canister, such as surface 118 of canister 102. Additionally, the opening adapter 1604 may include an opening 1620 extending from a top surface 1622 of the upper cylindrical member 1614 through a bottom surface 1624 of the lower cylindrical member 1616 forming an interior surface 1626, where the interior surface 1626 includes an internal threaded portion 1628 that may engage an external threaded portion 1656 of the plug structure 1650 when the plug structure 1650 is received in the opening 1620 of the opening adapter 1604. An upper adapter gasket 1640 and a lower adapter gasket 1644 may be configured to provide a duplicate gaskets between the opening adapter 1604 and the canister 102. Further, the upper adapter gasket 1640 and the lower adapter gasket 1644 may include any gasket geometry and/or materials, without departing from the scope of these disclosures.

Similar to the embodiment of the opening adapter assembly 1100 described above, the plug structure 1650 may be received into the opening adapter 1604, where the external threads 1656 of the plug structure 1650 may engage the internal threads 1628 of the opening adapter 1604 such that as the plug structure 1650 is rotated the plug structure 1650 moves in a vertical direction to open and close the adapter assembly 1600. When the plug structure 1650 is engaged with the opening adapter 1604, the opening adapter assembly 1600 may be in a closed orientation such that liquid does not flow from the container as shown in FIG. 19, and when the plug structure 1650 is partially engaged with the opening adapter 1604, the opening adapter assembly 1600 may be in an open orientation such that liquid flows from the container as shown in FIG. 20.

The plug structure 1650 may include a top/handle portion 1652 and a substantially cylindrical lower portion 1654, where the lower portion 1654 may include an externally threaded portion 1656 that may removably couple with the internally threaded portion 1628 of the spout adapter 1604 when the plug structure 1650 is received within the opening 1620. The plug structure 1650 may also include an upper plug gasket 1680 and a lower plug gasket 1682 to seal against the opening adapter 1604. In addition, the plug structure 1650 may include a plurality of elongated tabs 1660 that frictionally engage a projection 1630 extending from the interior surface 1626 when the plug structure 1650 is rotated within the adapter 1604 to move the adapter assembly 1600 to an open orientation, where the frictional engagement of the elongated tabs 1660 with the projection 1630 provides the user with tactile feedback that the adapter assembly 1600 is in an optimal pouring position. The tactile feedback may be perceived by the user as increased resistance when unscrewing the plug structure 1650 from the adapter 1604. In order to fully remove the plug structure 1650 from the adapter 1604, the user continues to unscrew the plug structure 1650 which may cause the elongated tabs 1660 to deform allowing them to move above the projection 1630 at which point the plug structure 1650 may be fully unscrewed from the adapter 1604.

Figure 19:
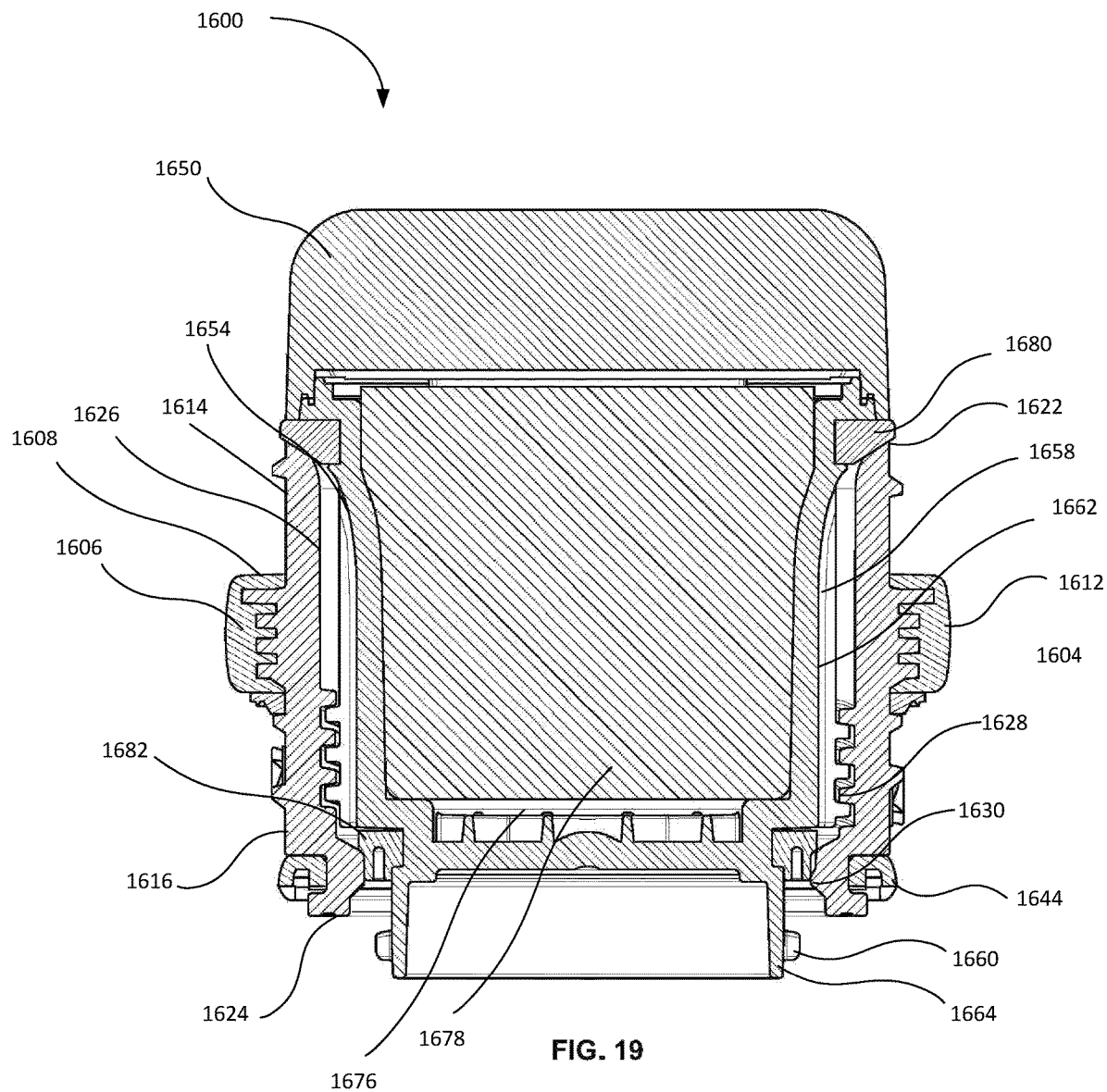
FIG. 19 depicts a cross-sectional view of the alternate opening adapter assembly of FIG. 16 in a closed orientation with the lid removed for clarity.

FIG. 19 illustrates a cross-sectional view of the adapter assembly 1600 in a closed orientation with the lid 1602 removed. The plug structure 1650 is engaged with the adapter 1604 such that the lower plug gasket 1682 contacts an upper surface of projection 1630 of the adapter 1604 to prevent fluid from flowing from the container. Optionally, as shown in the exemplary embodiment, the upper plug gasket 1680 may contact the interior surface 1626 of the adapter 1604 to provide an additional seal between the adapter 1604 and the plug structure 1650.

Figure 20:
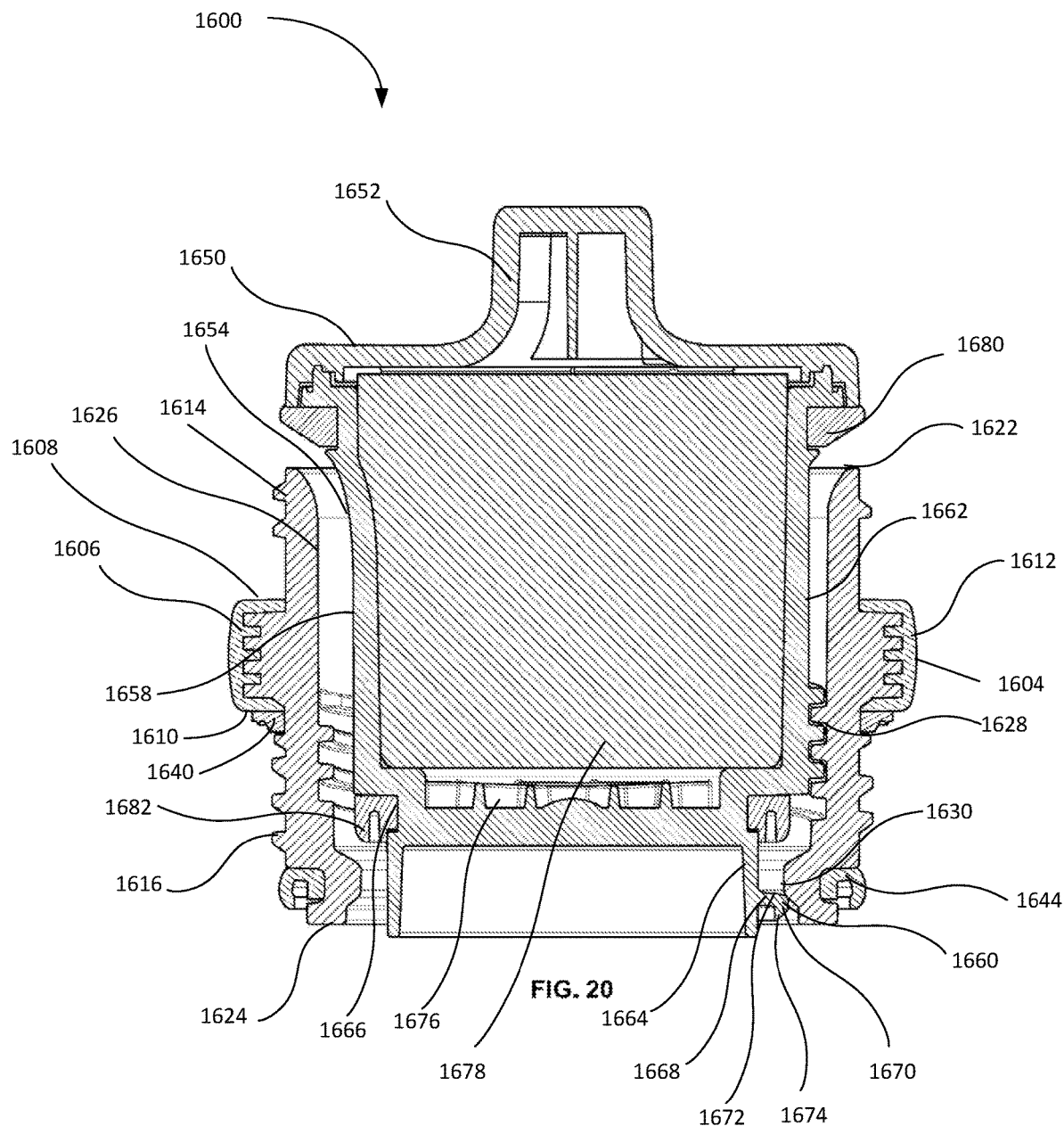
FIG. 20 depicts a cross-sectional view of the alternate opening adapter assembly of FIG. 16 in an open orientation with the lid removed for clarity.

FIG. 20 illustrates a cross-sectional view of the adapter assembly 1600 in an open orientation with the lid 1602 removed. The plug structure 1650 is partially unscrewed from the adapter 1604 such that the lower plug gasket 1682 is released from contacting the projection 1630 of the adapter 1604 to allow fluid to flow from the container. As the plug structure 1650 is unscrewed, the elongated tabs 1660 may move upwards to frictionally engage the projection 1630 placing the adapter assembly 1600 in an optimal pouring position.

Figure 21:
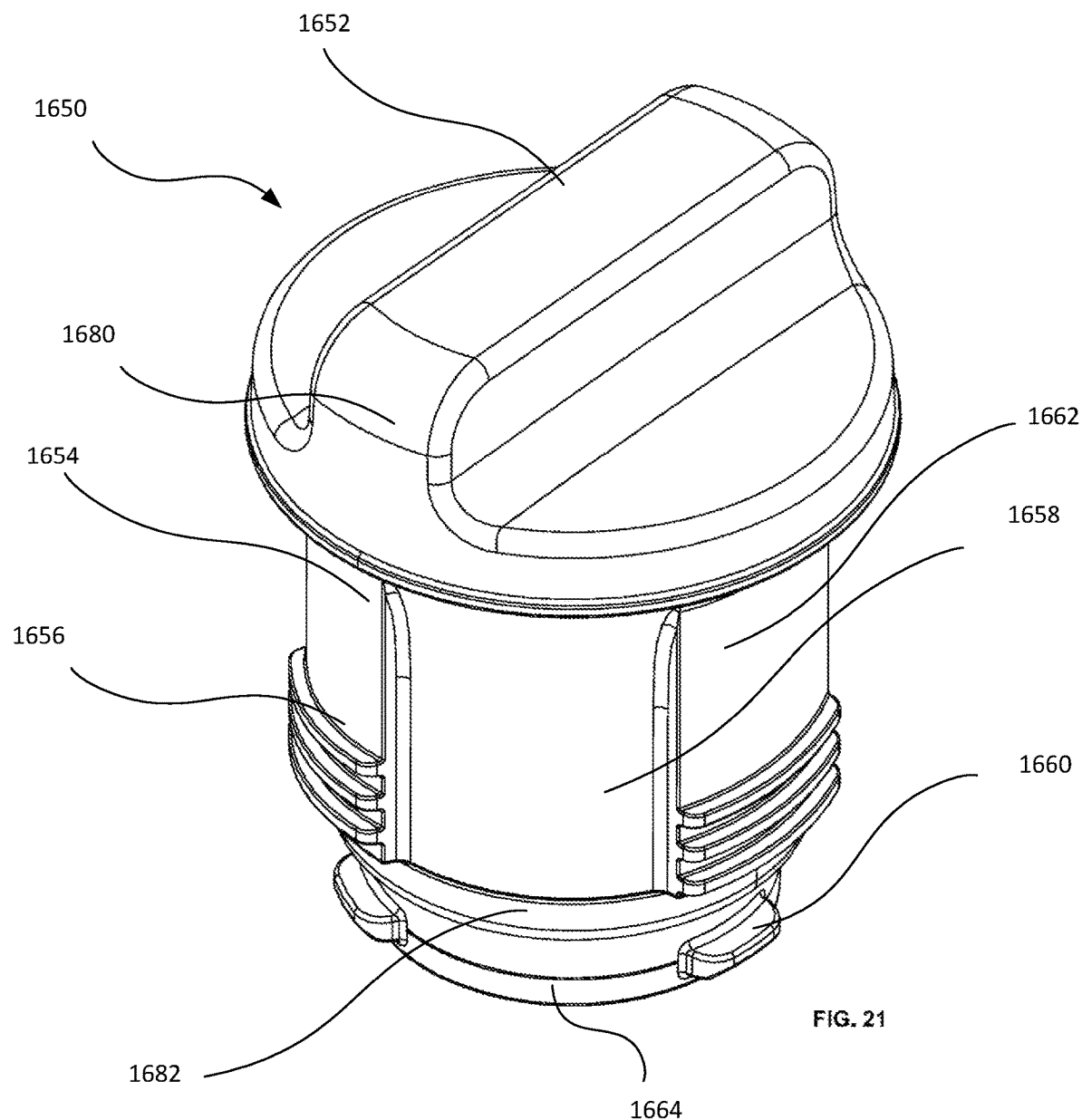
FIG. 21 depicts a top front isometric view of the plug of the alternate opening adapter assembly of FIG. 16.
Figure 22A:
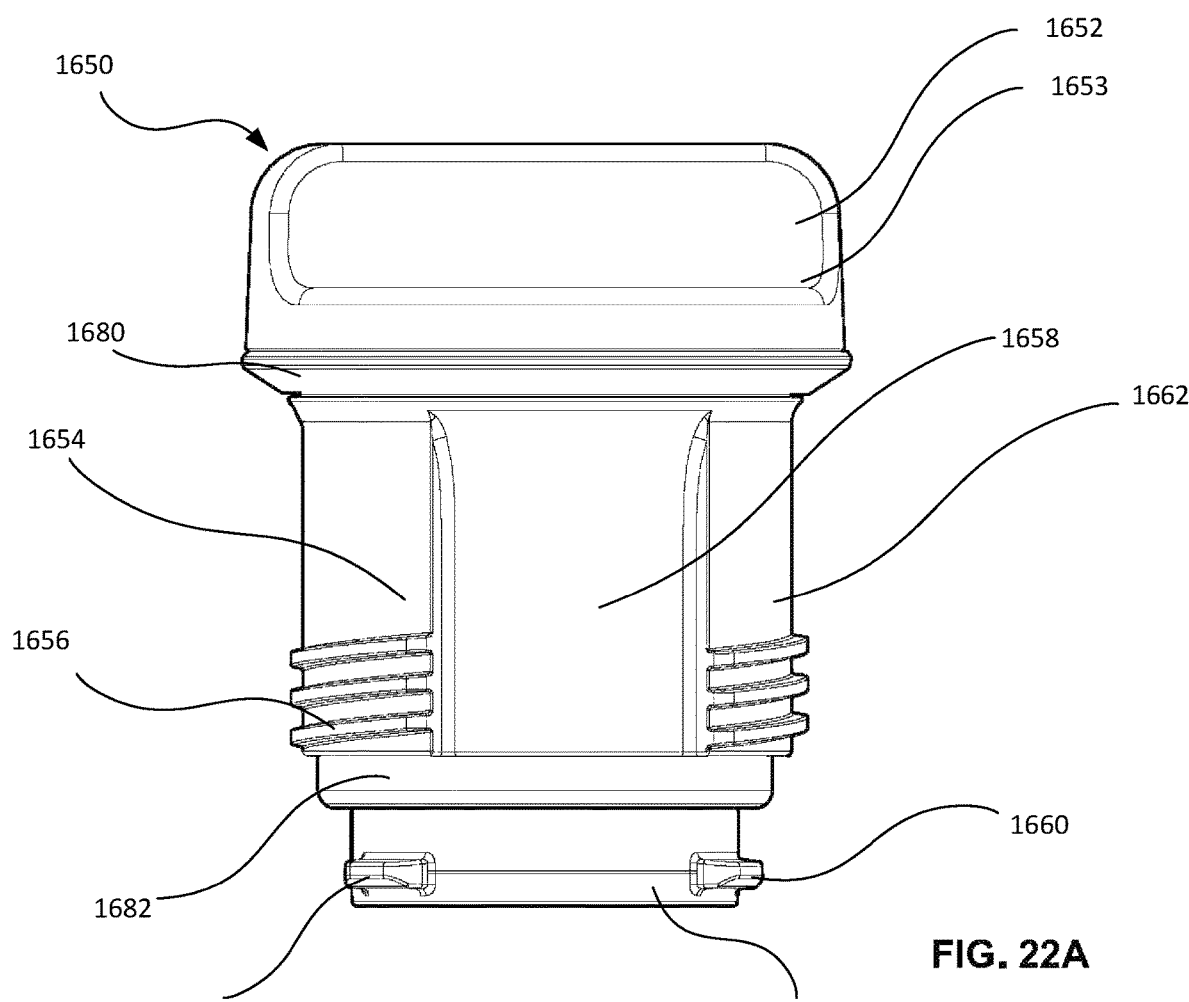
FIG. 22A depicts a front view of the plug of the alternate opening adapter assembly of FIG. 16.
Figure 22B:
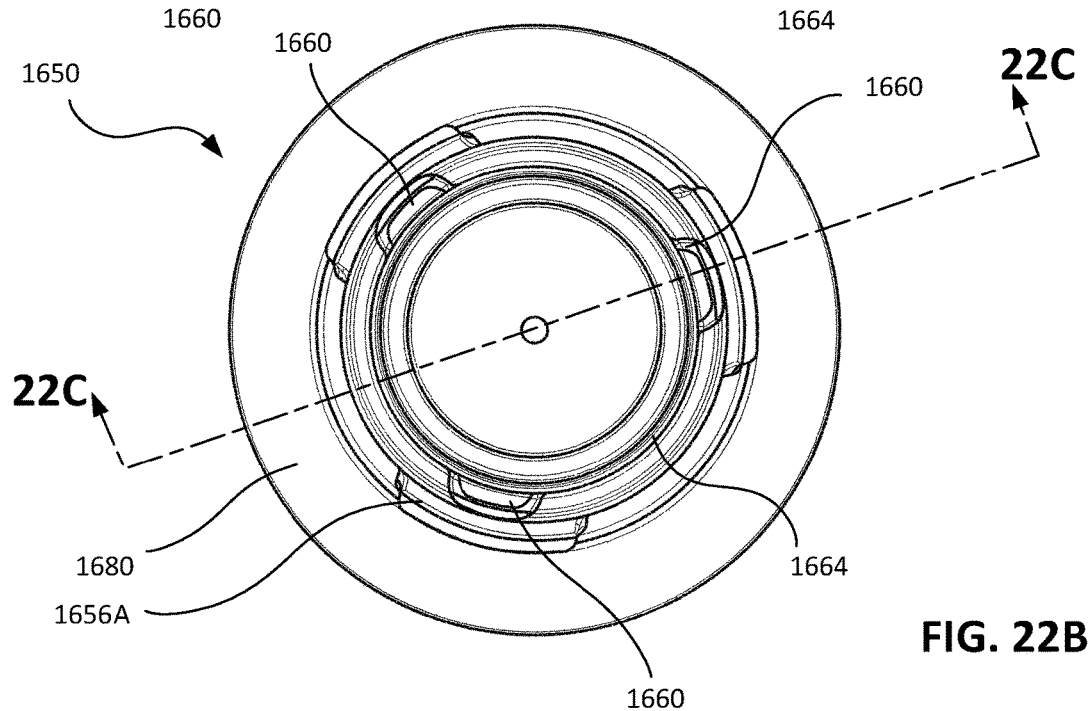
FIG. 22B depicts a bottom view of the plug of the alternate opening adapter assembly of FIG. 16.
Figure 22C:
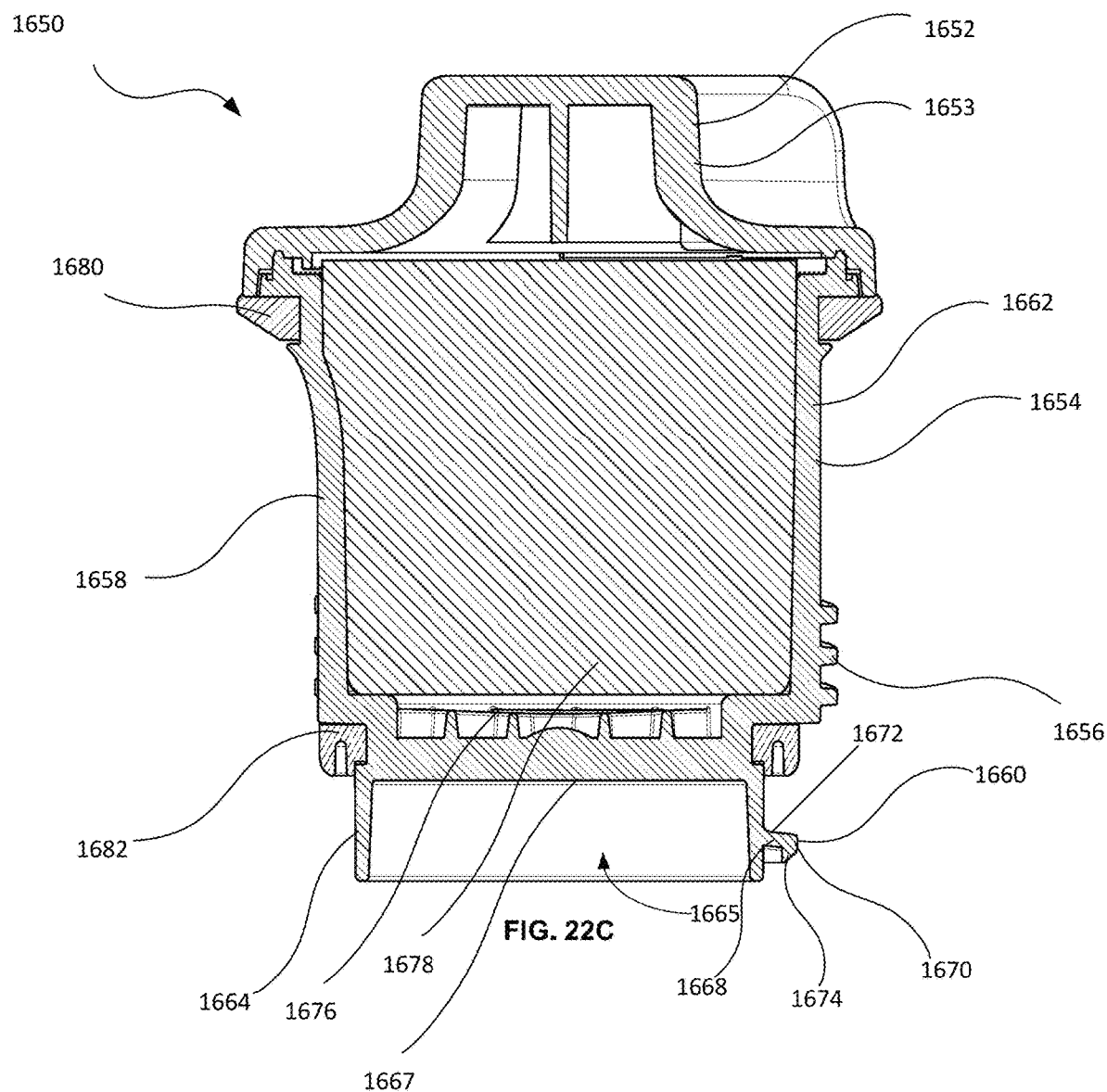
FIG. 22C depicts a cross-sectional view of the plug of the alternate opening adapter assembly of FIG. 16.

The plug structure 1650 with the plug gaskets 1680 and 1682 installed is shown in FIGS. 21-22C. The handle portion 1652 may include a protrusion 1653 that extends across a diameter of the handle portion 1652, and may be configured for manual actuation of the threaded coupling between the plug structure 1650 and the opening adapter 1604, as well as for manual insertion/removal of the plug structure 1650. The handle portion 1652 may be configured to extend, in a radial direction, beyond the diameter of the substantially cylindrical lower portion 1654 such that the bottom surface of the handle portion may form a sealing surface to abut a top surface 1622 of the opening adapter 1604. Alternatively, as shown in the exemplary embodiment the upper plug gasket 1680 may be arranged adjacent bottom surface of the handle portion 1652. Similar to the plug structure 1212, the plug structure 1650 may also include one or more external channels 1658, which may be similar and have characteristics of the external channels 1308 described above. The channels 1658 may interrupt the threaded portion 1656 forming interrupted threaded portions 1656A. The channels 1658 may provide a flow path for the fluid to flow when the adapter assembly 1600 is in an open orientation. While the exemplary embodiment illustrates the plug structure 1650 having three external channels 1658 that are equally spaced apart around a circumference of the lower portion 1654, the plug structure 1650 may comprise any number of channels 1658. In addition, the plug structure 1650 may include an internal cavity 1676 that is partially or wholly filled with an insulating material 1678 similar to plug structure 1212 described above, where this insulating material may be a foam material such as an expanding polystyrene foam or similar material. The lower portion 1654 of the plug structure 1650 may include an upper substantially cylindrical portion 1662 and a lower substantially cylindrical portion 1664 with a groove 1666 positioned between the upper cylindrical portion 1662 and the lower cylindrical portion 1664, where the lower plug gasket 1682 is arranged within the groove 1666. The plurality of elongated tabs 1660 may extend outward from the cylindrical lower portion 1664, where the length of each tab 1660 is longer than the thickness. Each elongated tab 1660 have a base member 1668 extending outward from the lower cylindrical portion 1664 and an end portion 1670 that extends downward from the base member 1668. The base member 1668 may extend such that the top surface 1672 extends at an obtuse angle from the side of the lower cylindrical portion 1664 to provide a ramped surface to engage the projection 1630 when unscrewing the plug structure 1650. Additionally, each end portion 1670 may have a downward facing surface 1674 that is arranged at an acute angle to the top surface 1672 of the base member 1668 to provide a ramped surface to engage projection 1630 when installing the plug structure 1650 into the adapter 1604. As depicted, the plug structure 1650 may include three elongated tabs 1660 equally spaced around a circumference of lower cylindrical portion 1664. At least one of the elongated tabs 1660 may be centered along one of the interrupted threaded portions 1656A. However, it is contemplated that any number of elongated tabs 1660 may be utilized, without departing from the scope of these disclosures. In addition, the plug structure 1650 may include a cavity 1665 located on a bottom of the plug structure 1665 that is surrounded by the lower cylindrical portion 1664, where the cavity 1665 comprises a bottom surface 1667 located within the cavity 1665 that is exposed.

Figure 23:
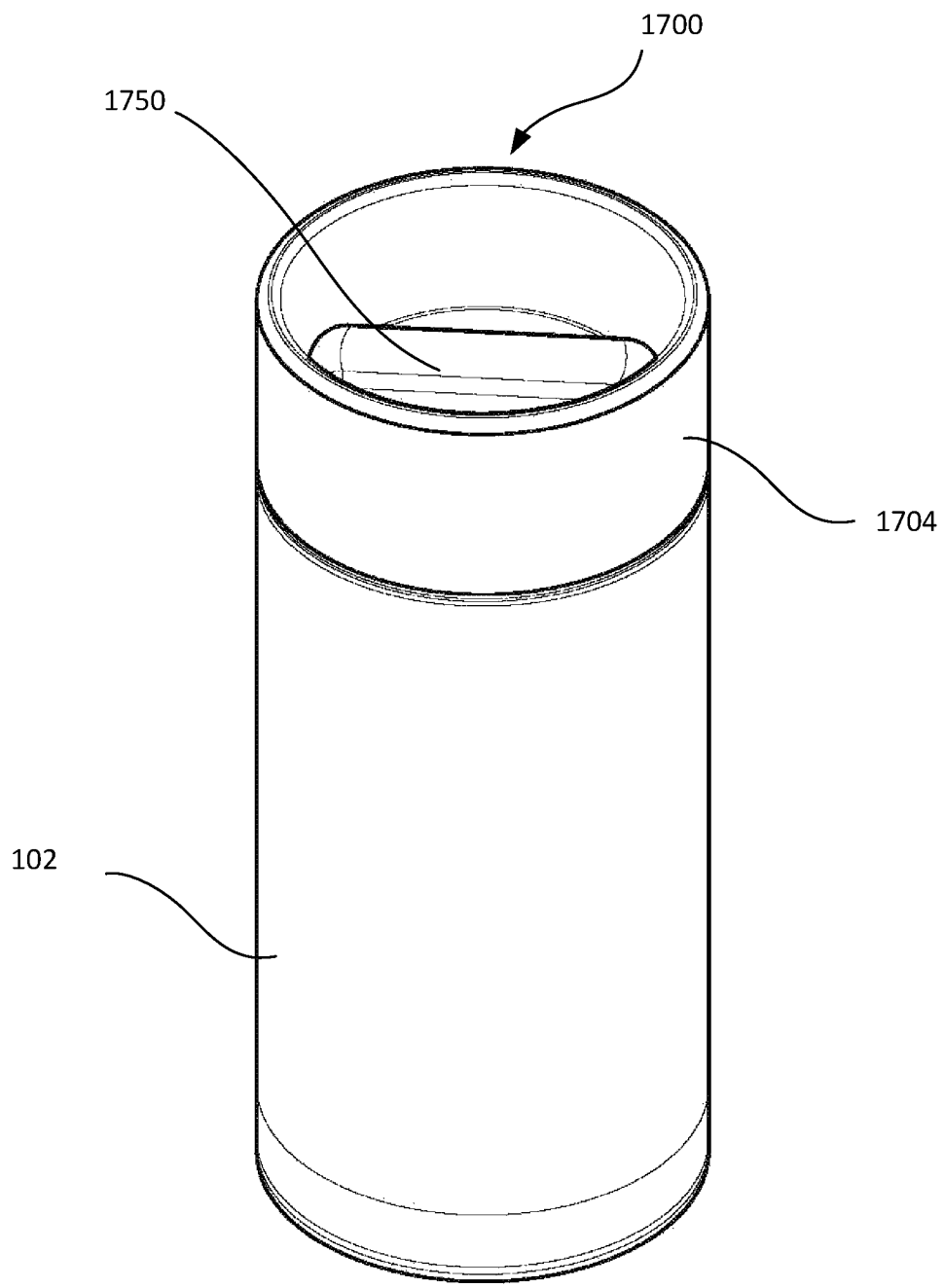
FIG. 23 depicts a top front isometric view of an alternate opening adapter assembly on an insulating container, according to one or more aspects described herein.

FIGS. 23-31C illustrate another exemplary embodiment of an opening adapter assembly for a beverage container. FIGS. 23-31C illustrate opening adapter assembly 1700, which is somewhat similar in structure to the opening adapter assemblies 1100 and 1600 described above. For the embodiment of FIGS. 23-31C, the features are referred to using similar reference numerals under the "17xx" series of reference numerals, rather than "16xx" as used in the embodiment illustrated in FIGS. 16-22C. Accordingly, certain features of the opening adapter assembly 1700 already described above with respect to opening adapter assembly 1600 of FIGS. 16-22C may be described in lesser detail, or may not be described at all. FIG. 23 depicts the opening adapter assembly 1700 removably coupled to the insulating container canister/bottle 102, as previously described in these disclosures.

Figure 24:
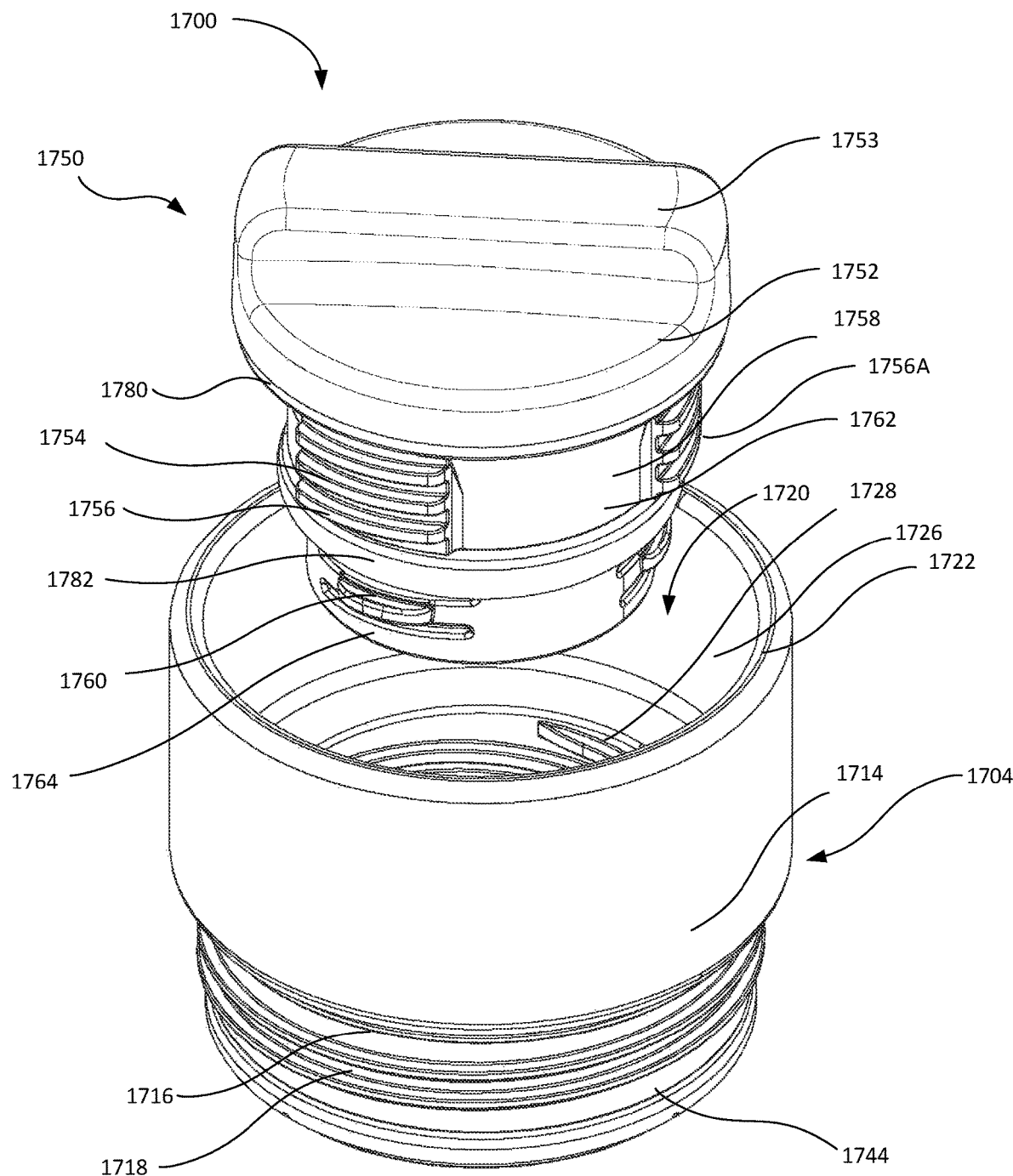
FIG. 24 depicts an exploded top front isometric view of the alternate opening adapter assembly of FIG. 23.

FIG. 24 depicts an exploded isometric view of the pour spout/opening adapter assembly 1700 of FIG. 23, according to one or more aspects described herein. The opening adapter 1704 may comprise a shelf member 1706 having an upper substantially cylindrical member 1714 extending from the shelf member 1706. The pour spout/opening adapter 1704 further comprises a lower substantially cylindrical member 1716 extending from the shelf member 1706, where the lower cylindrical member 1716 includes a lower external threaded portion 1718 configured to engage a threaded inner surface of a canister, such as surface 118 of canister 102. Additionally, the opening adapter 1704 may include an opening 1720 extending from a top surface 1722 of the upper cylindrical member 1714 through a bottom surface 1724 of the lower cylindrical member 1716 forming an interior surface 1726, where the interior surface 1726 includes an internal threaded portion 1728 that may engage the plug structure 1750 when the plug structure 1750 is received in the opening 1720 of the opening adapter 1704. An upper adapter gasket 1740 and a lower adapter gasket 1744 may be configured to provide a seal between the opening adapter 1704 and the canister 102 when the opening adapter is removably coupled to the canister 102. Further, the upper adapter gasket 1740 and the lower adapter gasket 1744 may include any gasket geometry and/or materials, without departing from the scope of these disclosures.

Similar to the embodiment of the opening adapter assembly 1600 described above, the plug structure 1750 may be received into the opening adapter 1704, where the external threads 1756 of the plug structure 1750 may engage the internal threads 1728 of the opening adapter 1704 such that as the plug structure 1750 is rotated, the plug structure 1750 moves in a vertical direction to open and close the adapter assembly 1700. When the plug structure 1750 is engaged with the opening adapter 1704, the opening adapter assembly 1700 may be in a closed orientation such that liquid does not flow from the container as shown in FIG. 25, and when the plug structure 1750 is partially engaged with the opening adapter 1704, the opening adapter assembly 1700 may be in an open orientation such that liquid flows from the container as shown in FIG. 26.

The plug structure 1750 may include a top/handle portion 1752 and a substantially cylindrical lower portion 1754, where a lower portion 1754 may include an external threaded portion 1756 that may removably couple with the internally threaded portion 1728 of the spout adapter 1704 when the plug structure 1750 is received within the opening 1720. The plug structure 1750 may also include an upper plug gasket 1780 and a lower plug gasket 1782 to seal against the opening adapter 1704. In addition, the plug structure 1750 may include a plurality of elongated tabs 1760 that frictionally engage a projection 1730 extending from the interior surface 1726 when the plug structure 1750 is rotated within the adapter 1704 to move the adapter assembly 1700 to an open orientation. As the elongated tabs 1760 contact the projection 1730, the user may feel increased resistance. When the plug structure 1750 is moved into the optimal pouring position, the elongated tabs 1760 may move into a plurality of pockets 1732 arranged along the projection 1730, which may give the user a tactile feeling of the elongated tabs 1760 falling into the pockets 1732 and also audible feedback to let the user know the opening adapter assembly 1700 is in an optimal pouring position.

Figure 25:
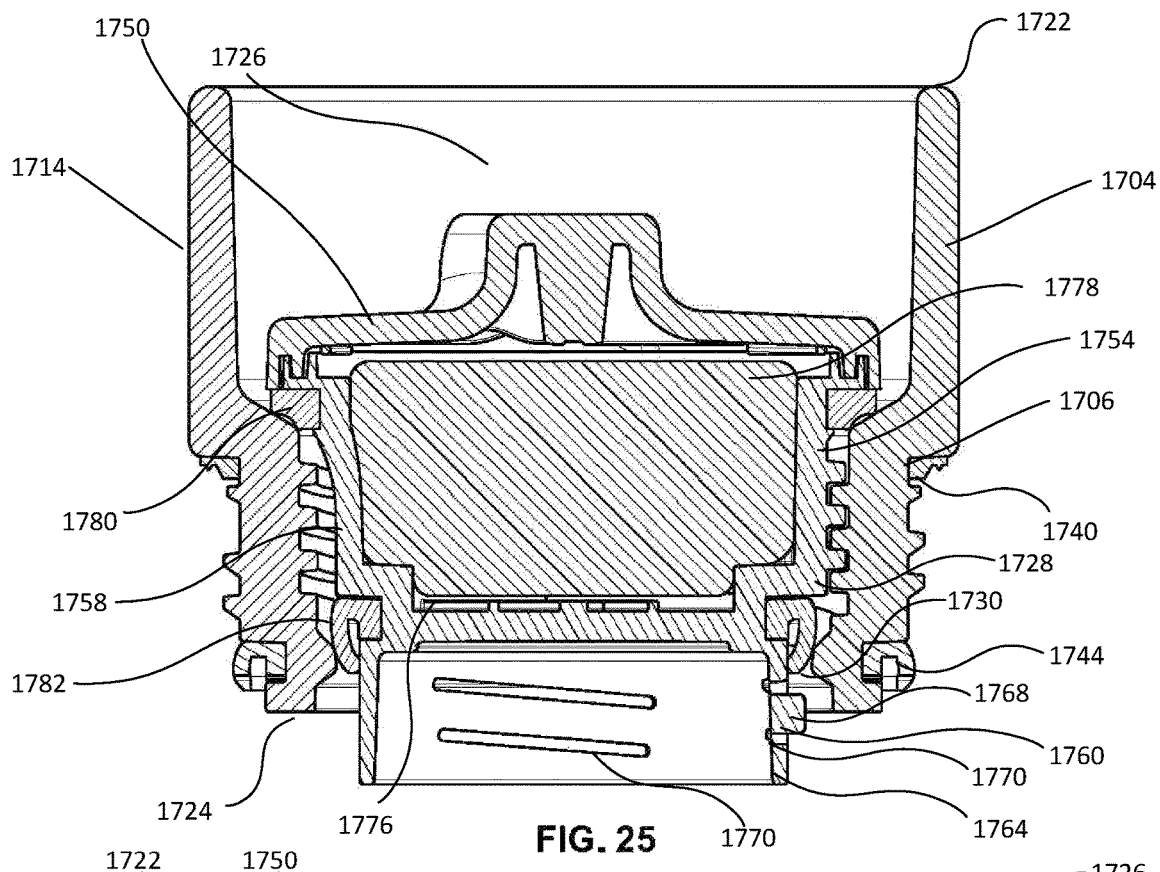
FIG. 25 depicts a cross-sectional view of the alternate opening adapter assembly of FIG. 23 in a closed orientation.

FIG. 25 illustrates a cross-sectional view of the adapter assembly 1700 in a closed orientation. The plug structure 1750 may be engaged with the adapter 1704 such that the lower plug gasket 1782 contacts the projection 1730 of the adapter 1704 to prevent fluid from flowing from the container. Optionally, as shown in the exemplary embodiment, the upper plug gasket 1780 may contact the interior surface 1726 of the adapter 1704 to provide an additional seal between the adapter 1704 and the plug structure 1750.

Figure 26:
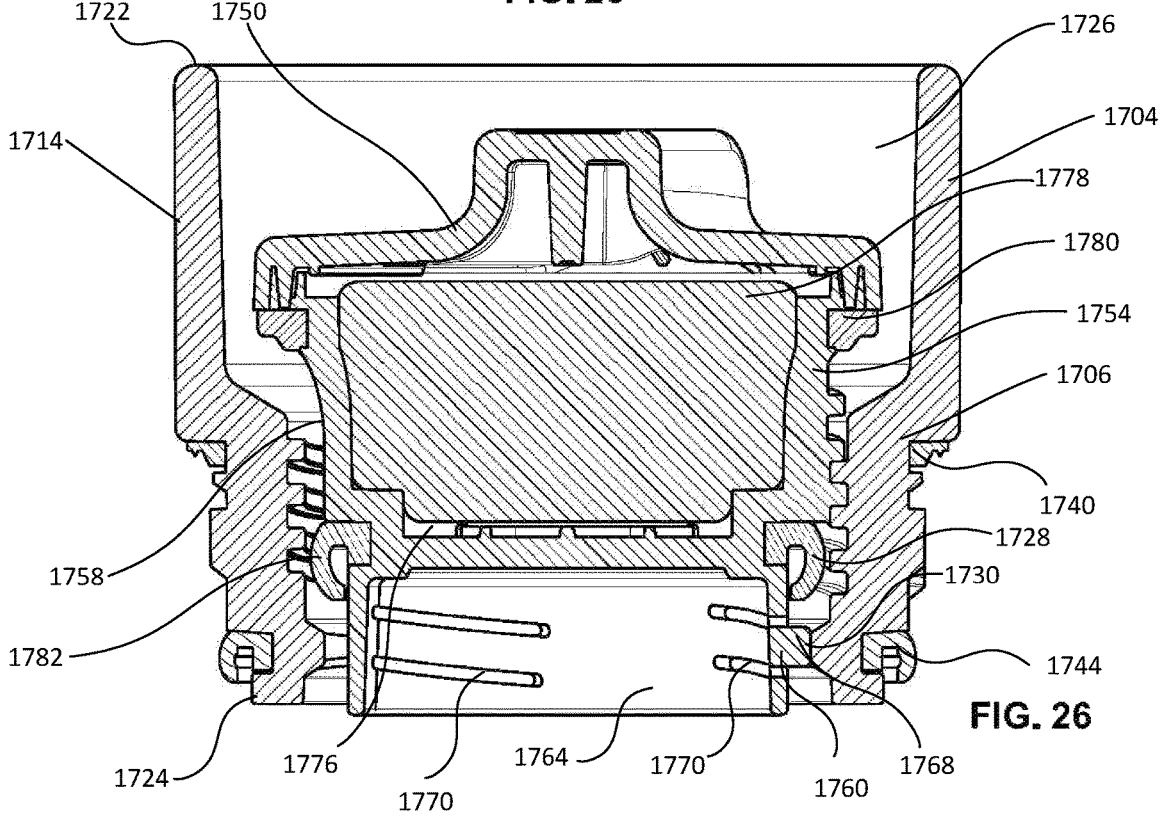
FIG. 26 depicts a cross-sectional view of the alternate opening adapter assembly of FIG. 23 in an open orientation.
Figure 27:
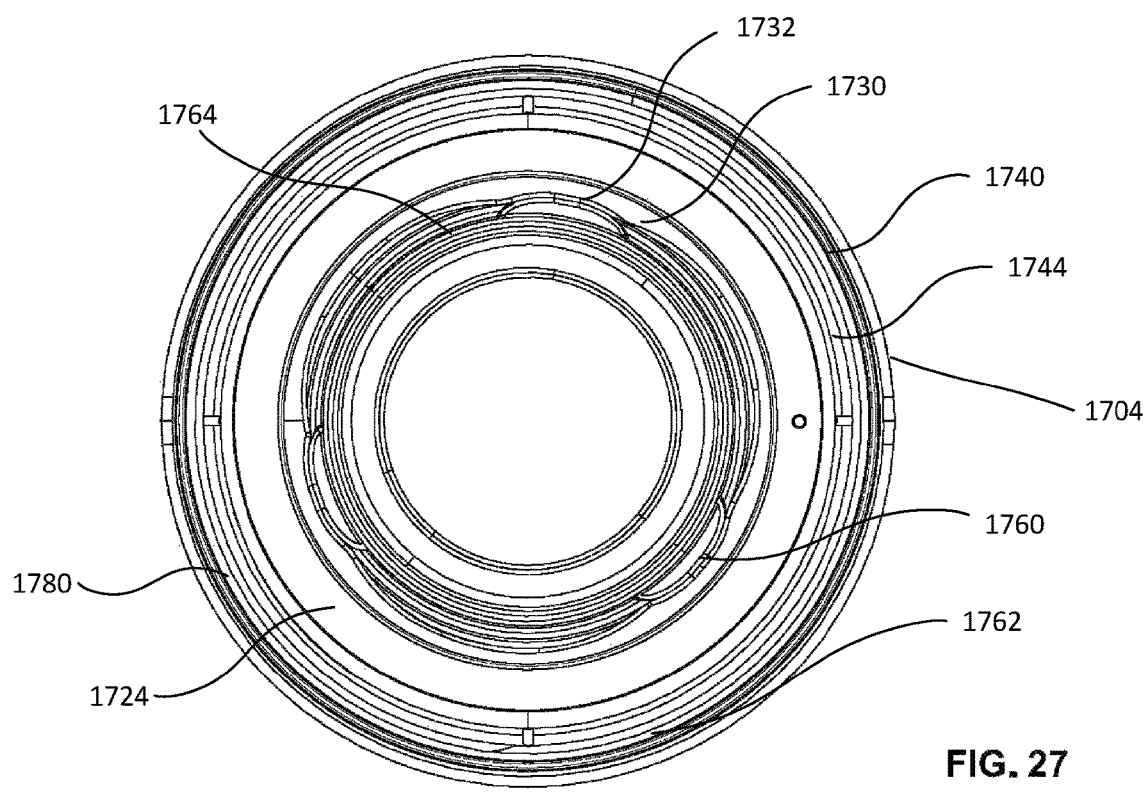
FIG. 27 depicts a bottom view of the alternate opening adapter assembly of FIG. 23.

FIG. 26 illustrates a cross-sectional view of the adapter assembly 1700 in an open orientation. As shown, the plug structure 1750 is partially unscrewed from the adapter 1704 such that the lower plug gasket 1782 may be released from contacting the projection 1730 of the adapter 1704 to allow fluid to flow from the container. As discussed above, as the plug structure 1750 is unscrewed, the elongated tabs 1760 may engage projection 1730 and move into pockets 1732 positioned within the projection 1730 to provide tactile feedback to a user that the plug structure 1750 is in an optimal pouring position. FIG. 27 illustrates a bottom view of the adapter assembly 1700 in an optimal pouring position, where each of the elongated tabs 1760 are arranged in a corresponding pocket 1732 of the projection 1730 of the adapter 1704.

Figure 28:
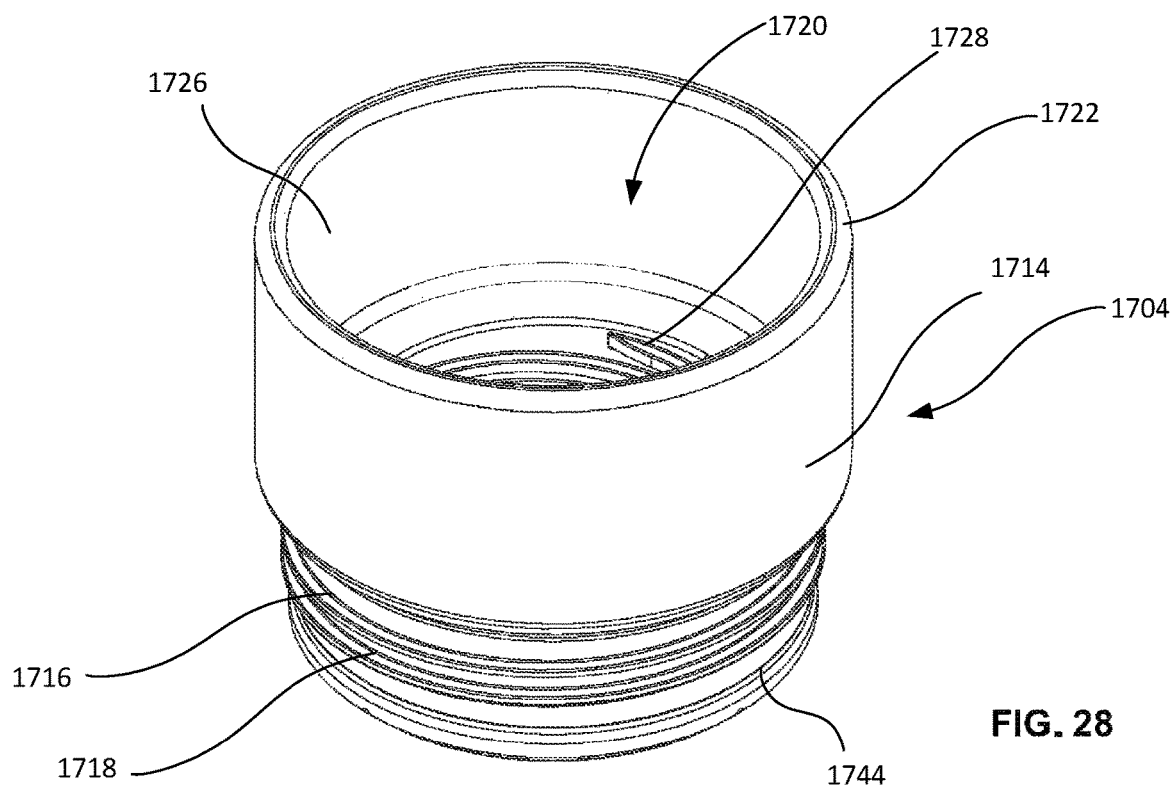
FIG. 28 depicts a top front isometric view of the adapter of the alternate opening adapter assembly of FIG. 23.
Figure 29A:
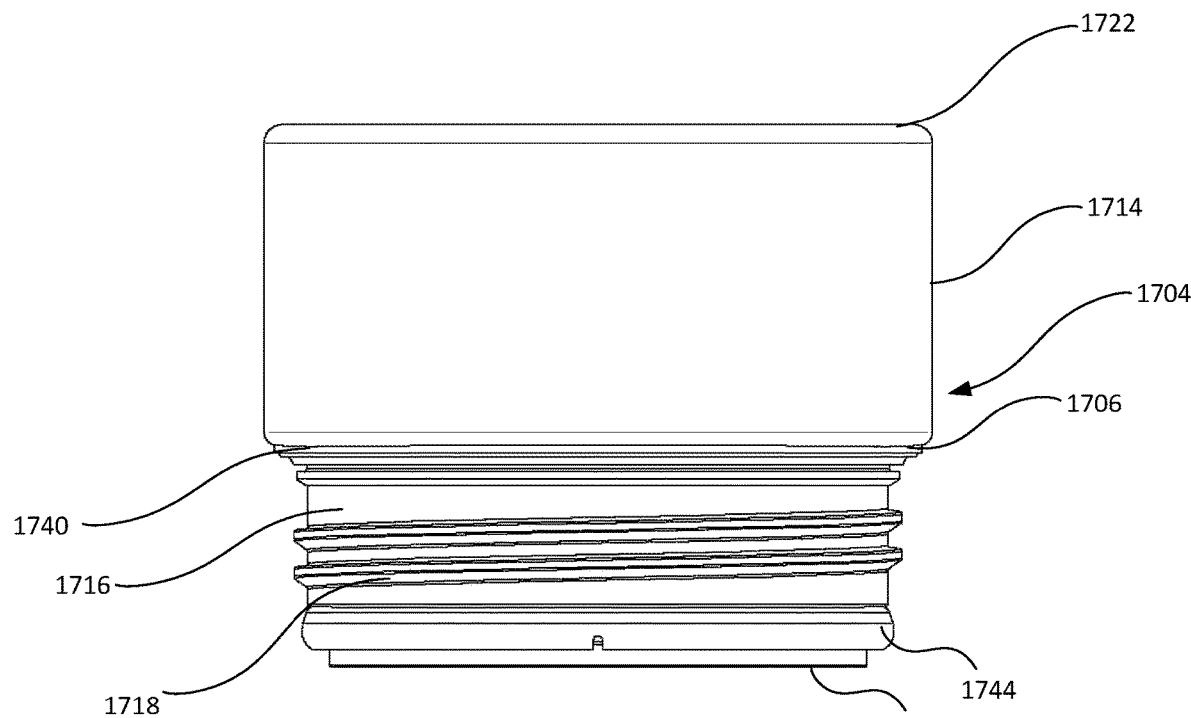
FIG. 29A depicts a front view of the adapter of the alternate opening adapter assembly of FIG. 23.
Figure 29B:
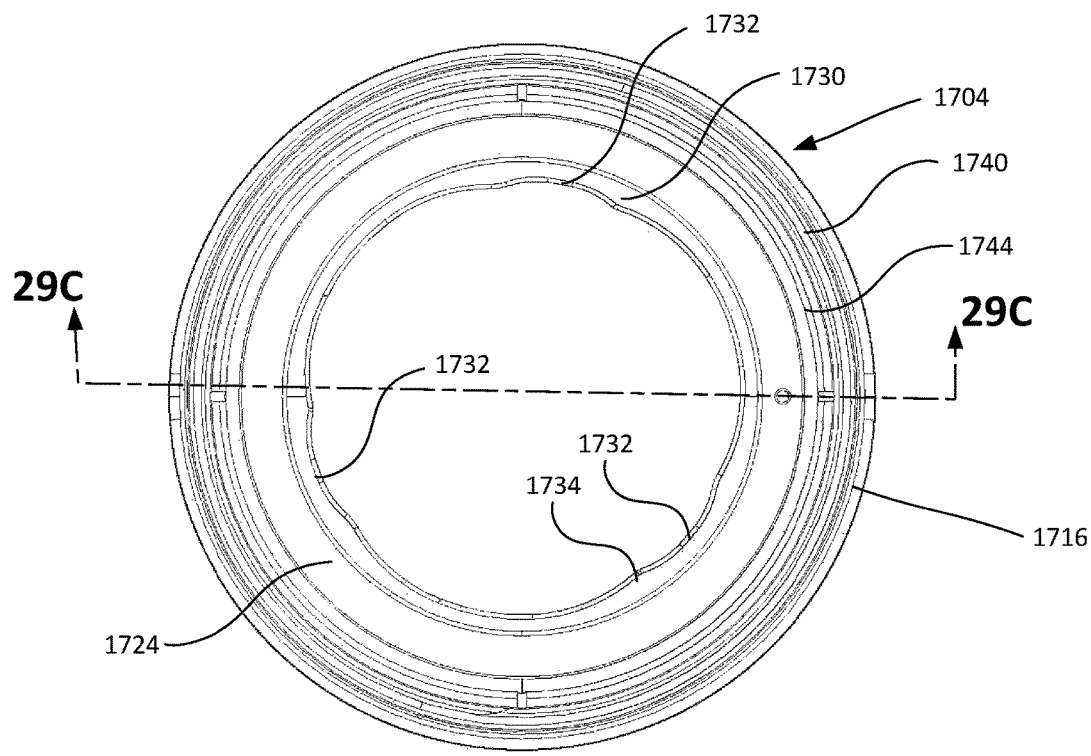
FIG. 29B depicts a bottom view of the adapter of the alternate opening adapter assembly of FIG. 23.
Figure 29C:
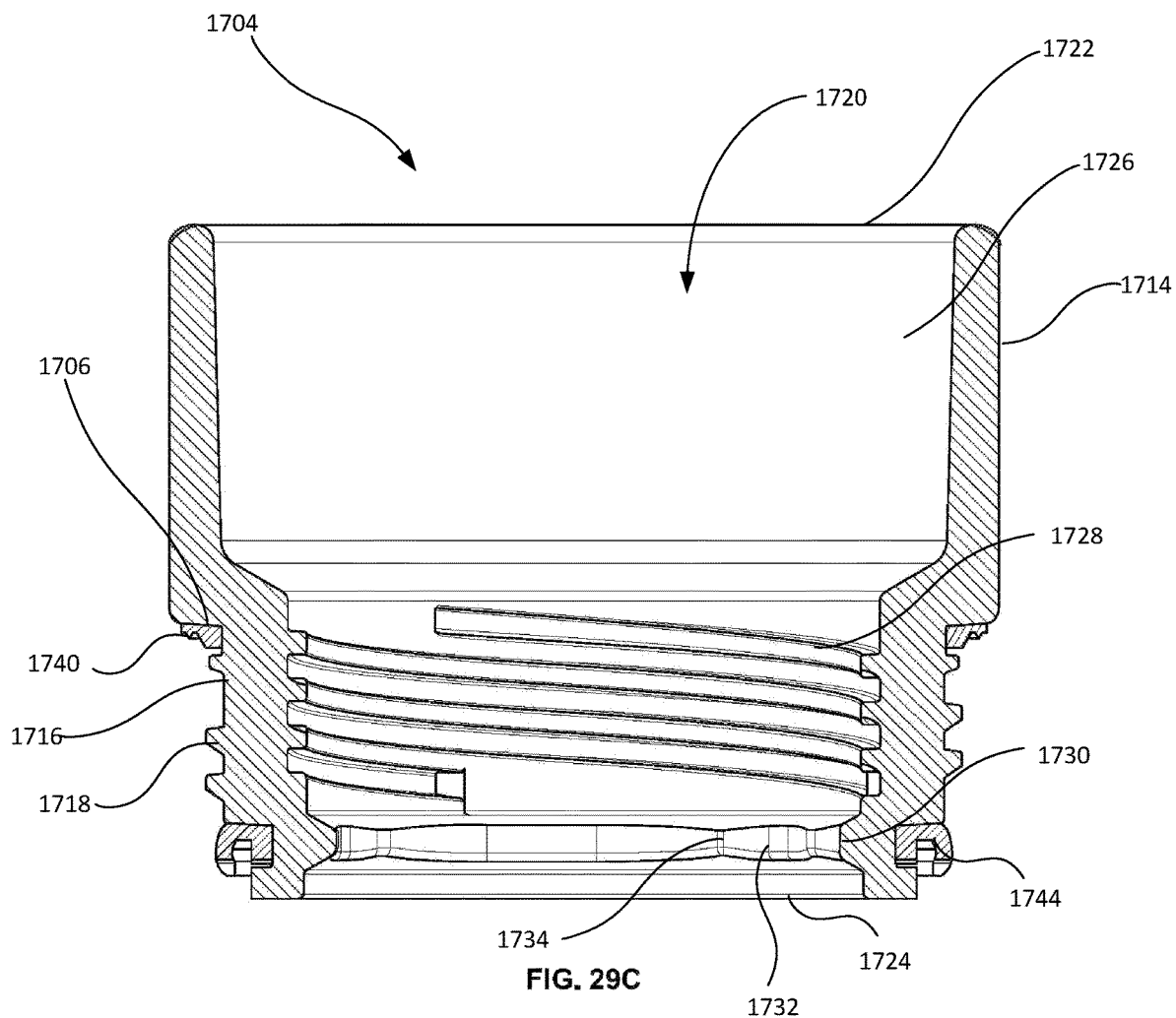
FIG. 29C depicts a cross-sectional view of the adapter of the alternate opening adapter assembly of FIG. 23.

FIGS. 28-29C illustrate the adapter 1604 with the adapter gaskets 1740 and 1744. As discussed above, the adapter 1604 includes a shelf member 1706 with an upper cylindrical member 1714 which further includes a top surface 1722 that may serve as the lip of the cup portion for a user to drink. The lower cylindrical member 1716 that includes an external threaded portion 1718 that engages the canister/bottle 102. The adapter 1704 may include a projection 1730 that extends from the interior surface 1726. As shown in FIGS. 29B and 29C, the projection 1730 may include a plurality of pockets 1732, where each pocket 1732 is configured to receive one of the plurality of elongated tabs 1760. Further, the projection 1730 may have a varying width such that a maximum width of the projection 1730 occurs at a peak 1734 that is adjacent the beginning of each pocket 1732. This peak 1734 may increase the resistance felt by the user when unscrewing the plug structure 1750 from the adapter 1704 until the elongated tabs 1760 move into the pockets 1732.

Figure 30:
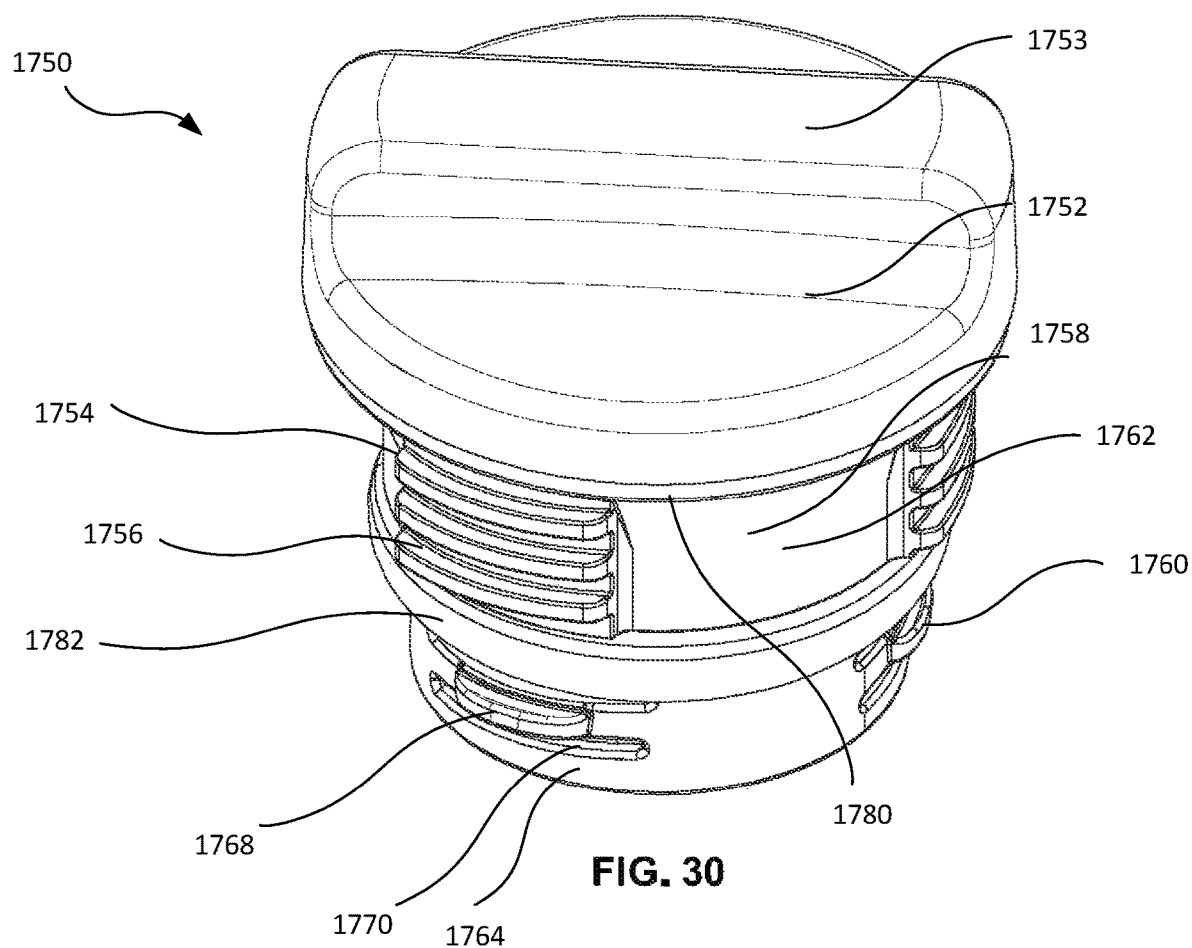
FIG. 30 depicts a top front isometric view of the plug of the alternate opening adapter assembly of FIG. 23.
Figure 31A:
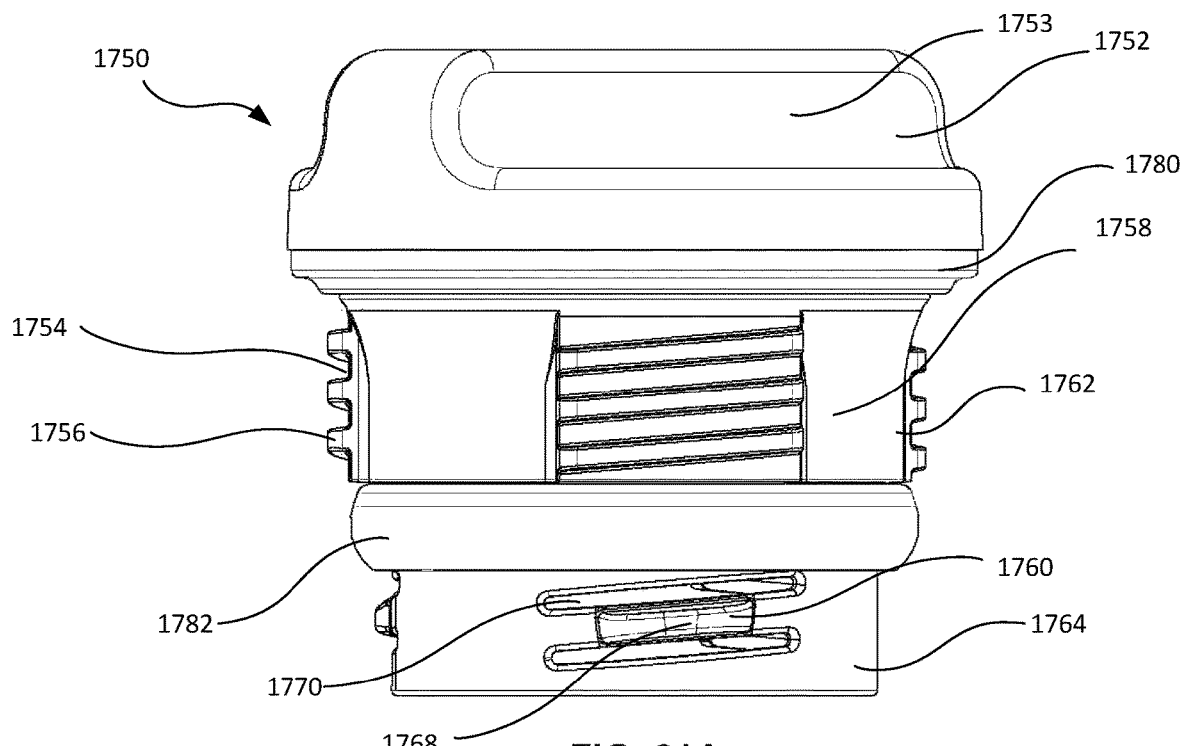
FIG. 31A depicts a front view of the plug of the alternate opening adapter assembly of FIG. 23.
Figure 31B:
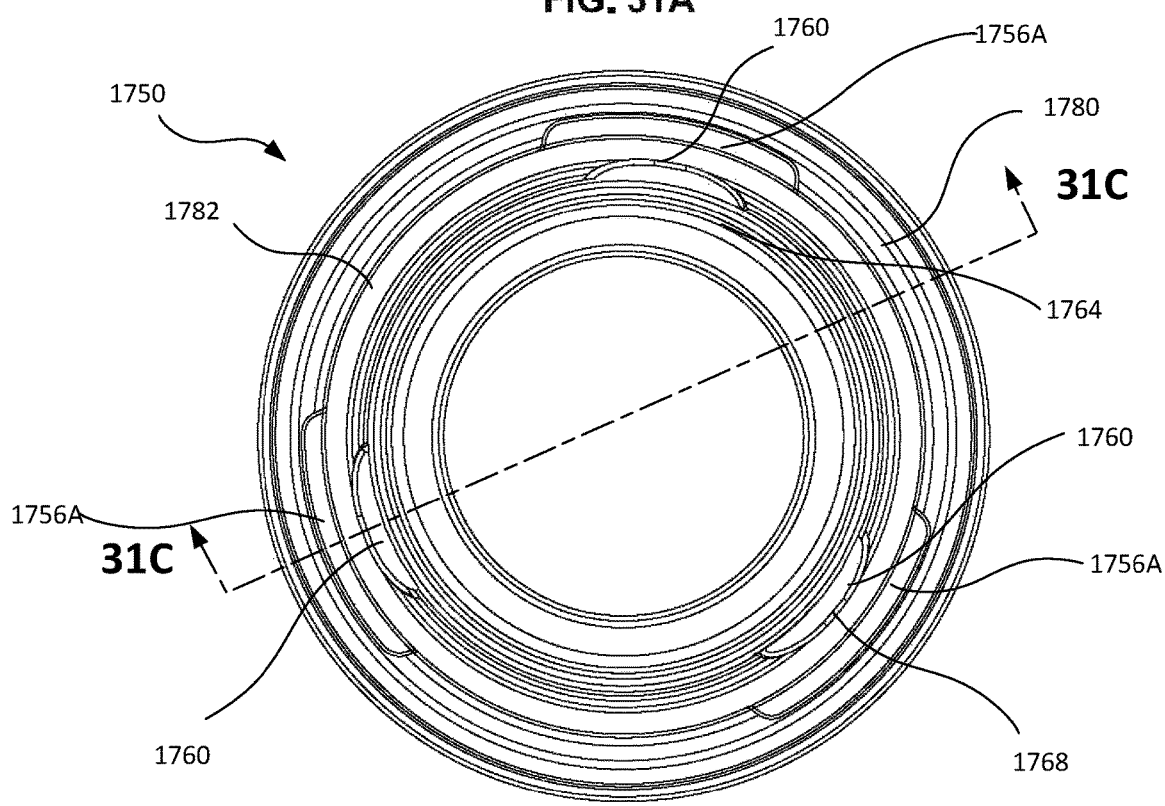
FIG. 31B depicts a bottom view of the plug of the alternate opening adapter assembly of FIG. 23.
Figure 31C:
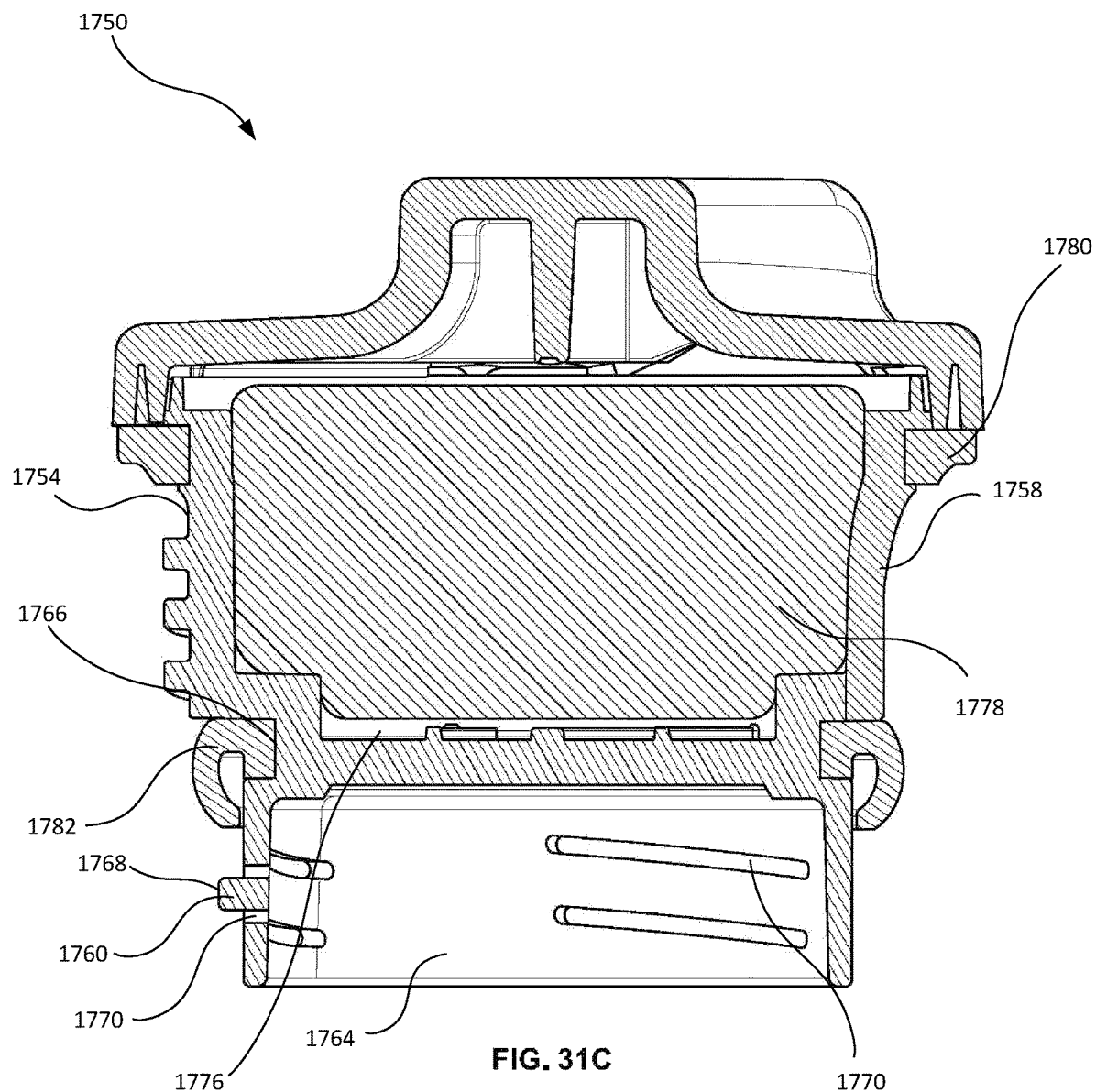
FIG. 31C depicts a cross-sectional view of the plug of the alternate opening adapter assembly of FIG. 23.

The plug structure 1750 with the gaskets 1780 and 1782 installed is shown in FIGS. 30-31C. The handle portion 1752 may include a protrusion 1753 that extends across a diameter of the handle portion 1752, and may be configured for manual actuation of the threaded coupling between the plug structure 1750 and the opening adapter 1704, as well as for manual insertion/removal of the plug structure 1750. The handle portion 1752 may be configured to extend, in a radial direction, beyond the diameter of the substantially cylindrical lower portion 1754 such that the bottom surface of the handle portion 1752 may form a sealing surface that abuts a top surface 1722 of the opening adapter 1704. Alternatively, as shown in the exemplary embodiment the upper plug gasket 1780 may be arranged adjacent bottom surface of the handle portion 1752. Similar to the plug structures 1212, 1650, the plug structure 1750 may also include one or more external channels 1758, which may be similar and have characteristics of the external channels 1308, 1658 described above. The channels 1758 may interrupt the externally threaded portion 1756 forming a plurality of threaded portions 1756A. The channels 1758 may provide a flow path for the fluid to flow when the adapter assembly 1700 is in an open orientation. While the exemplary embodiment illustrates the plug structure 1750 having three external channels 1658 that are equally spaced apart around a circumference of the lower portion 1654, the plug structure 1750 may comprise any number of external channels 1758. In addition, the plug structure 1750 may include an internal cavity 1776 that is partially or wholly filled with an insulating material 1778 similar to plug structures 1212 and 1650 described above, where this insulating material may be a foam material such as an expanding polystyrene foam or similar material.

The lower portion 1754 of the plug structure 1750 may include an upper cylindrical portion 1762 and a lower cylindrical portion 1764 with a groove 1766 positioned between the upper cylindrical portion 1762 and the lower cylindrical portion 1764, where the lower plug gasket 1782 is arranged within the groove 1766. The plurality of elongated tabs 1760 may protrude from the cylindrical lower portion 1764. Each elongated tab 1760 may have tapered ends and a thicker center region. Additionally, each of the plurality of elongated tabs 1760 may have an outboard surface 1768 that may engage the projection 1730 of the spout adapter 1704 when the plug structure 1750 is in an open orientation. Each of the plurality of elongated tabs 1760 may be substantially parallel with each thread of the threaded portion and also may be centered along the length of each of the interrupted threaded portions 1756A. In addition, a plurality of elongated aperture 1770 may be arranged adjacent each elongated tab 1760, such that an elongated aperture 1770 is above each elongated tab 1760 and an elongated aperture 1770 is below each elongated tab 1760. The apertures 1770 may have a length that equal to or longer than the length of the elongated tabs 1760. The apertures 1770 help to adjust the localized stiffness around the elongated tab 1760 to allow for the elongated tab 1760 to deform as it engages the projection 1730 of the adapter 1704. As depicted, the plug structure 1750 may include three elongated tabs 1760 equally spaced around a circumference of lower cylindrical portion 1764. However, it is contemplated that any number of elongated tabs 1760 may be utilized, without departing from the scope of these disclosures.

It is contemplated that the structures of the opening adapter assembly 1100 may be constructed from any materials. For example, one or more of the described elements may be constructed from one or more polymers, metals, alloys, composites, ceramics or woods, without departing from the scope of these disclosures. In particular, the opening adapter assembly 1100 may utilize one or more of steel, titanium, iron, nickel, cobalt, high impact polystyrene, acrylonitrile butadiene styrene, nylon, polyvinylchloride, polyethylene, and/or polypropylene, among others. It is further contemplated that any manufacturing methodologies may be utilized to construct the described elements of the opening adapter assembly 1100, without departing from the scope of these disclosures. In certain examples, injection molding, blow molding, casting, rotational molding, compression molding, gas assist molding, thermoforming, or foam molding, welding (e.g. spin welding), gluing, or use of fasteners (e.g. rivets, staples, screws etc.) among others, may be utilized, without departing from the scope of these disclosures. Additionally, it is contemplated that the depicted and described elements of the opening adapter assembly 1100 may be constructed with any dimensional values, without departing from the scope of these disclosures. As such, for example, the described threads (e.g. of threaded outer surface 1302, 1618, internal threaded surface 1218, 1628, 1728, external top threaded surface 1220, and/or external bottom threaded surfaces 1222, 1656, 1756) may be constructed with any thread geometries, without departing from the scope of these disclosures.

In one example, an insulating container formed of a material can include a canister that has a first inner wall that has a first end with a threaded sidewall and an opening extending into an internal reservoir for receiving liquid, and a second outer wall forming an outer shell of the canister. The second outer wall can include a second end configured to support the canister on a surface. The canister can also include a sealed vacuum cavity forming an insulated double wall structure between the first inner wall and the second outer wall. The insulating container can also include a spout adapter having a spout channel extending through a height of the spout adapter between a bottom surface and a spout opening on a top surface of the spout adapter. The spout opening is sealed with a cap having a magnetic top surface configured to magnetically couple to a docking surface on a grip ring extending around a circumference of the spout adapter between a top threaded surface and a bottom threaded surface. The bottom threaded surface configured to resealably seal the spout adapter to the opening of the canister, and the top threaded surface configured to removably couple the spout adapter to a lid.

In another example, an insulating container may include a canister that has a first inner wall having a first end having a threaded sidewall and an opening extending into an internal reservoir for receiving liquid, and a second outer wall forming an outer shell of the canister. The second outer wall can include a second end configured to support the canister on a surface. The canister can also include a sealed vacuum cavity forming an insulated double wall structure between the first inner wall and the second outer wall. The insulating container can also include an opening adapter that has an external bottom threaded surface to removably couple to and seal the opening of the canister. The opening adapter may also have an internal threaded surface, an external top threaded surface, and a grip ring positioned between the external top threaded surface and the external bottom threaded surface. The insulating container may also include a plug structure that has a substantially cylindrical top portion and a substantially cylindrical bottom portion. The plug structure may also include a threaded outer surface that is configured to removably couple to the internal threaded surface of the opening adapter. The plug structure may also have a handle that is rigidly coupled to a top portion, and a retention tab that is rigidly/flexibly coupled to a bottom portion of the plug structure. Further, an external channel may extend between a channel top edge and a channel bottom edge of the plug structure. Additionally, the insulating container may include a lid that is configured to be removably coupled to the external top threaded surface of the opening adapter.

Still other examples may disclose an opening adapter assembly comprising an opening adapter, comprising: a grip ring having an upper surface, a lower surface opposite the upper surface, and a side surface extending from the upper surface to the lower surface; an upper substantially cylindrical member extending from the upper surface, where the upper cylindrical member includes an upper external threaded portion; and a lower substantially cylindrical member extending from the lower surface, where the lower cylindrical member includes a lower externally threaded portion. The open adapter may further include an opening extending from a top surface of the upper substantially cylindrical member through a bottom surface of the lower substantially cylindrical member forming an interior surface, wherein the interior surface includes an internally threaded portion. The open adapter assembly may further include a plug structure having a handle portion, a substantially cylindrical lower portion, where a plurality of elongated tabs extend from the substantially cylindrical lower portion. The plug structure may be partially received within the opening adapter and movable from an open orientation to a closed orientation. Each elongated tab of the plurality of elongated tabs may have an outboard surface that frictionally engages a projection extending from the interior surface of the opening adapter when the plug structure is in the open orientation to provide tactile feedback to a user that the opening adapter assembly is in an optimal pouring position. The plug structure may further comprise an externally threaded portion along the substantially cylindrical lower portion that engages the internally threaded portion on the interior surface of the opening adapter. When the opening adapter assembly is in the open orientation, at least one of the plurality of the elongated tabs may frictionally engage a projection extending from the interior surface of the opening adapter. The elongated tabs may have a base extending from the cylindrical lower portion and an end portion opposite where the base extends from the cylindrical lower portion, where the base has a thickness that is less than a maximum thickness of the end portion. In addition, each elongated tab of the plurality of elongated tabs may extend at an acute angle from the cylindrical lower portion. The plurality of elongated tabs may comprise three elongated tabs.

In some embodiments, the opening adapter may releasably attach to a container body, where a lower gasket and an upper gasket positioned on the opening adapter engage with the container body to seal an opening of the container body. The plug structure may further includes a lower gasket positioned between an externally threaded portion and the plurality of elongated tabs. As another option, a threaded portion of the plug structure may comprise a plurality of interrupted threaded portions, and wherein at least one of the elongated tabs are centered along one of the interrupted threaded portions. The opening adapter assembly may also include a lid that releasably engages with the upper cylindrical member.

Further embodiments may relate to an opening adapter assembly comprising an opening adapter, comprising: a shelf member having an upper substantially cylindrical member extending upward from the shelf member, and a lower substantially cylindrical member extending downward from the shelf member, where the lower substantially cylindrical member includes an external threaded portion. The opening adapter may further include an opening through a top surface of the upper substantially cylindrical member through a bottom surface of the lower substantially cylindrical member forming an interior surface, where the interior surface includes an internally threaded portion. The opening adapter assembly may also include a plug structure having a handle portion, a substantially cylindrical lower portion, where a plurality of elongated tabs extend from the substantially cylindrical lower portion. The plug structure may be received within the opening adapter and is movable from an open orientation to a closed orientation. Each of the plurality of elongated tabs may have an outboard surface that frictionally engages a projection extending from the interior surface of the opening adapter when the plug structure is in the open orientation. The projection on the opening adapter may include a plurality of pockets.

Further examples relate to a plug structure that include a plurality of threaded portions, where at least one of the plurality of elongated tabs are centered along one of the plurality of interrupted threaded portions. Each elongated tab of the plurality of elongated tabs may be oriented substantially parallel to each thread of an externally threaded portion on the substantially cylindrical lower portion. Furthermore, an aperture may be arranged adjacent to each elongated tab of the plurality of elongated tabs, or additionally a first aperture may be arranged adjacent and above a first elongated tab of the plurality of elongated tabs, and a second aperture is arranged adjacent and below the first elongated tab of the plurality of elongated tabs. When in the open orientation, each elongated tab is located within a corresponding pocket arranged along a projection on the interior surface of the opening adapter.

The present disclosure is disclosed above and in the accompanying drawings with reference to a variety of examples. The purpose served by the disclosure, however, is to provide examples of the various features and concepts related to the disclosure, not to limit the scope of the disclosure. One skilled in the relevant art will recognize that numerous variations and modifications may be made to the examples described above without departing from the scope of the present disclosure.

What is claimed is:

1. An opening adapter assembly comprising:
    an opening adapter, comprising:
        a grip ring having an upper surface, a lower surface opposite the upper surface, and a side surface extending from the upper surface to the lower surface;
        an upper substantially cylindrical member extending from the upper surface, wherein the upper substantially cylindrical member includes an upper external threaded portion;
        a lower substantially cylindrical member extending from the lower surface, wherein the lower substantially cylindrical member includes a lower externally threaded portion;
        an opening extending from a top surface of the upper substantially cylindrical member through a bottom surface of the lower substantially cylindrical member forming an interior surface, wherein the interior surface includes an internally threaded portion; and
    a plug structure having a handle portion and a substantially cylindrical lower portion, wherein the substantially cylindrical lower portion includes an upper cylindrical portion and a lower cylindrical portion that includes a plurality of elongated tabs that extend outwardly from the lower cylindrical portion;
    the plug structure including a lower gasket positioned between the upper cylindrical portion and the lower cylindrical portion, wherein the upper cylindrical portion includes an externally threaded portion, and the plug structure further including a cavity located on a bottom of the plug structure surrounded by the lower cylindrical portion, and wherein the cavity has a bottom surface that is exposed; and
    wherein the plug structure is partially received within the opening adapter and movable from an open orientation to a closed orientation.

2. The opening adapter assembly of claim 1, wherein each elongated tab of the plurality of elongated tabs have an outboard surface that frictionally engages a projection extending from the interior surface of the opening adapter when the plug structure is in the open orientation to provide tactile feedback to a user that the opening adapter assembly is in an optimal pouring position.

3. The opening adapter assembly of claim 1, wherein the plug structure further comprises an externally threaded portion along the substantially cylindrical lower portion that engages the internally threaded portion of the interior surface of the opening adapter.

4. The opening adapter assembly of claim 1, wherein when the opening adapter assembly is in the open orientation, at least one elongated tab of the plurality of elongated tabs frictionally engages a projection extending from the interior surface of the opening adapter.

5. The opening adapter assembly of claim 1, wherein each elongated tab of the plurality of elongated tabs has a base member extending outwardly from the substantially cylindrical lower portion and an end portion opposite the base member, wherein the base member has a thickness that is less than a maximum thickness of the end portion.

6. The opening adapter assembly of claim 5, wherein each elongated tab of the plurality of elongated tabs has a top surface that extends at an obtuse angle from the side surface of the substantially cylindrical lower portion.

7. The opening adapter assembly of claim 1, wherein the opening adapter releasably attaches to a container body, and wherein a lower gasket and an upper gasket positioned on the opening adapter engage with the container body to seal an opening of the container body.

8. The opening adapter assembly of claim 1, further comprising a lid that releasably engages with the upper substantially cylindrical member.

9. The opening adapter assembly of claim 1, wherein the plurality of elongated tabs comprises three elongated tabs.

10. The opening adapter assembly of claim 1, wherein an externally threaded portion of the plug structure comprises a plurality of interrupted threaded portions, and wherein at least one of the elongated tabs are centered along one of the plurality of interrupted threaded portions.

11. An opening adapter assembly comprising:
    an opening adapter, comprising:
        a grip ring having an upper surface, a lower surface opposite the upper surface, and a side surface extending from the upper surface to the lower surface;
        an upper substantially cylindrical member extending from the upper surface, wherein the upper substantially cylindrical member includes an upper external threaded portion;
        a lower substantially cylindrical member extending from the lower surface, wherein the lower substantially cylindrical member includes a lower externally threaded portion;
        an opening extending from a top surface of the upper substantially cylindrical member through a bottom surface of the lower substantially cylindrical member forming an interior surface, wherein the interior surface includes an internally threaded portion; and
    a plug structure having a handle portion and a substantially cylindrical lower portion, wherein the substantially cylindrical lower portion includes an upper cylindrical portion that includes an externally threaded portion and a lower cylindrical portion that includes a plurality of elongated tabs, wherein the plurality of elongated tabs extend outwardly from the lower cylindrical portion;
    the plug structure including a groove positioned between the upper cylindrical portion and the lower cylindrical portion, wherein a lower gasket is arranged within the groove, and the plug structure further including a cavity located on a bottom of the plug structure surrounded the lower cylindrical portion, and wherein the cavity has a bottom surface that is exposed; and wherein the plug structure is partially received within the opening adapter and movable from an open orientation to a closed orientation.

12. The opening adapter assembly of claim 11, wherein when the opening adapter assembly is in the open orientation, at least one of the plurality of the elongated tabs frictionally engages a projection extending from the interior surface of the opening adapter.

13. The opening adapter assembly of claim 12, wherein when the opening adapter is in the closed orientation, the lower gasket of the plug structure contacts an upper surface of the projection extending from the interior surface.

14. The opening adapter assembly of claim 11, wherein each elongated tab of the plurality of elongated tabs have an outboard surface that frictionally engages a projection extending from the interior surface of the opening adapter when the plug structure is in the open orientation to provide tactile feedback to a user that the opening adapter assembly is in an optimal pouring position.

15. The opening adapter assembly of claim 11, wherein each elongated tab of the plurality of elongated tabs has a base member extending from the substantially cylindrical lower portion and an end portion opposite the base member, wherein the base member has a thickness that is less than a maximum thickness of the end portion.

16. The opening adapter assembly of claim 15, wherein each elongated tab of the plurality of elongated tabs has a top surface that extends at an obtuse angle from the side surface of the substantially cylindrical lower portion.

17. The opening adapter assembly of claim 11, wherein the externally threaded portion of the plug structure comprises a plurality of interrupted threaded portions, and wherein at least one of the elongated tabs of the plurality of elongated tabs are centered along one of the plurality of interrupted threaded portions.

18. The opening adapter assembly of claim 11, wherein the opening adapter releasably attaches to a container body, and wherein a lower gasket and an upper gasket positioned on the opening adapter engage with the container body to seal an opening of the container body.

19. The opening adapter assembly of claim 11, further comprising a lid that releasably engages with the upper substantially cylindrical member.

* * * * *